United States Patent
Altonen et al.

(10) Patent No.: US 9,124,130 B2
(45) Date of Patent: Sep. 1, 2015

(54) WALL-MOUNTABLE TEMPERATURE CONTROL DEVICE FOR A LOAD CONTROL SYSTEM HAVING AN ENERGY SAVINGS MODE

(75) Inventors: Gregory Altonen, Easton, PA (US); Nikhil Vithal Bhate, East Norriton, PA (US); Elliot G. Jacoby, Glenside, PA (US); Michael W. Pessina, Allentown, PA (US); Walter S. Zaharchuk, Macungie, PA (US); Joel S. Spira, Coopersburg, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 884 days.

(21) Appl. No.: 13/234,440

(22) Filed: Sep. 16, 2011

(65) Prior Publication Data

US 2012/0091213 A1 Apr. 19, 2012

Related U.S. Application Data

(63) Continuation-in-part of application No. 12/845,016, filed on Jul. 28, 2010.

(60) Provisional application No. 61/384,073, filed on Sep. 17, 2010, provisional application No. 61/230,001, filed on Jul. 30, 2009, provisional application No. 61/239,988, filed on Sep. 4, 2009.

(51) Int. Cl.
*H02J 3/00* (2006.01)
*H02J 1/00* (2006.01)
(Continued)

(52) U.S. Cl.
CPC . *H02J 3/12* (2013.01); *H05B 37/02* (2013.01); *H05B 37/0227* (2013.01); *E06B 9/68* (2013.01);
(Continued)

(58) Field of Classification Search
CPC .............................. H02J 3/12; H02J 2003/143
USPC ................................................ 307/31, 32, 125
See application file for complete search history.

(56) References Cited

U.S. PATENT DOCUMENTS

| 3,962,600 A | 6/1976 | Pittman |
| 4,075,699 A | 2/1978 | Schneider et al. |

(Continued)

FOREIGN PATENT DOCUMENTS

| CN | 101377275 A | 3/2009 |
| WO | 02/21231 | 3/2002 |

(Continued)

OTHER PUBLICATIONS

Lawrence Berkeley National Laboratory, "An Inexpensive Wireless Lighting Control System to Improve Energy Efficiency", Environmental Energy Technologies Division (EETD) News, vol. 7, No. 2, Winter-Spring 2007, pp. 9-10, 16.

(Continued)

*Primary Examiner* — Carlos Amaya
(74) *Attorney, Agent, or Firm* — Ostrolenk Faber LLP

(57) ABSTRACT

A wall-mountable temperature control device having a vertically-arranged temperature adjustment actuator for adjusting a setpoint temperature of a temperature control system to thus control a present temperature in a building, a room temperature visual display for displaying a visual representation of the present temperature of the building, and a setpoint temperature visual display for displaying a visual representation of the setpoint temperature. The room and setpoint temperature visual displays each comprising a linear array of light-emitting diodes arranged parallel to the temperature adjustment actuator and controlled such that one of the light-emitting diodes of the setpoint temperature visual display is illuminated to display the setpoint temperature in response to the actuations of the temperature adjustment actuator and one of the light-emitting diodes of the room temperature visual display is illuminated to display the present temperature.

21 Claims, 41 Drawing Sheets

(51) Int. Cl.
*H02J 3/14* (2006.01)
*H02J 3/12* (2006.01)
*H05B 37/02* (2006.01)
*E06B 9/68* (2006.01)
*F24F 11/00* (2006.01)
*H04L 12/14* (2006.01)
*H04L 12/28* (2006.01)

(52) U.S. Cl.
CPC ......... *F24F 11/0012* (2013.01); *F24F 11/0034* (2013.01); *F24F 2011/0049* (2013.01); *F24F 2011/0075* (2013.01); *H02J 2003/143* (2013.01); *H04L 12/14* (2013.01); *H04L 12/2827* (2013.01); *Y02B 20/40* (2013.01)

(56) References Cited

U.S. PATENT DOCUMENTS

| | | |
|---|---|---|
| 4,236,101 A | 11/1980 | Luchaco |
| 4,336,902 A | 6/1982 | Neal |
| 4,341,345 A | 7/1982 | Hammer et al. |
| 4,345,162 A | 8/1982 | Hammer et al. |
| 4,347,575 A | 8/1982 | Gurr et al. |
| 4,538,218 A | 8/1985 | Watson |
| 4,742,956 A | 5/1988 | Zelczer |
| 4,847,781 A | 7/1989 | Brown, III et al. |
| 5,168,170 A | 12/1992 | Hartig |
| 5,237,169 A | 8/1993 | Grehant |
| 5,248,919 A | 9/1993 | Hanna et al. |
| 5,357,170 A | 10/1994 | Luchaco et al. |
| 5,406,173 A | 4/1995 | Mix et al. |
| 5,413,161 A | 5/1995 | Corazzini |
| 5,436,510 A | 7/1995 | Gilbert |
| 5,532,560 A | 7/1996 | Element et al. |
| 5,566,084 A | 10/1996 | Cmar |
| 5,648,656 A | 7/1997 | Begemann et al. |
| 5,663,621 A | 9/1997 | Popat |
| 5,734,230 A | 3/1998 | Edwards et al. |
| 5,839,654 A | 11/1998 | Weber |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,029,092 A | 2/2000 | Stein |
| 6,064,949 A | 5/2000 | Werner et al. |
| 6,066,843 A | 5/2000 | Scheremeta |
| 6,084,231 A | 7/2000 | Popat |
| 6,225,760 B1 | 5/2001 | Moan |
| 6,260,765 B1 | 7/2001 | Natale et al. |
| 6,349,883 B1 | 2/2002 | Simmons et al. |
| 6,380,696 B1 | 4/2002 | Sembhi et al. |
| 6,480,803 B1 | 11/2002 | Pierret et al. |
| 6,528,957 B1 | 3/2003 | Luchaco |
| 6,583,573 B2 | 6/2003 | Bierman |
| 6,674,225 B2 | 1/2004 | Jung |
| 6,700,224 B2 | 3/2004 | Biskup, Sr. et al. |
| 6,726,112 B1 † | 4/2004 | Ho |
| 6,803,728 B2 | 10/2004 | Balasubramaniam et al. |
| 6,816,811 B2 | 11/2004 | Seem |
| 6,842,668 B2 | 1/2005 | Carson et al. |
| 6,862,498 B2 | 3/2005 | Davis et al. |
| 6,891,478 B2 | 5/2005 | Gardner |
| 6,961,642 B2 | 11/2005 | Horst |
| 6,980,080 B2 | 12/2005 | Christensen et al. |
| 6,983,783 B2 | 1/2006 | Carmen, Jr. et al. |
| 6,993,417 B2 | 1/2006 | Osann, Jr. |
| 7,010,363 B2 | 3/2006 | Donnelly et al. |
| 7,019,276 B2 | 3/2006 | Cloutier et al. |
| 7,024,336 B2 | 4/2006 | Salsbury et al. |
| 7,031,880 B1 | 4/2006 | Seem et al. |
| 7,035,719 B2 | 4/2006 | Howard et al. |
| 7,085,627 B2 | 8/2006 | Bamberger et al. |
| 7,089,066 B2 | 8/2006 | Hesse et al. |
| 7,111,952 B2 | 9/2006 | Veskovic |
| 7,155,296 B2 | 12/2006 | Klasson et al. |
| 7,193,201 B2 | 3/2007 | Motte |
| 7,211,968 B2 | 5/2007 | Adamson et al. |
| 7,243,044 B2 | 7/2007 | McCalla |
| 7,289,936 B2 | 10/2007 | Singhal et al. |
| 7,369,060 B2 | 5/2008 | Veskovic et al. |
| 7,379,997 B2 | 5/2008 | Ehlers et al. |
| 7,389,806 B2 | 6/2008 | Kates |
| 7,417,397 B2 | 8/2008 | Berman et al. |
| 7,451,606 B2 | 11/2008 | Harrod |
| 7,496,472 B2 | 2/2009 | Seem |
| 7,542,876 B2 | 6/2009 | Singhal et al. |
| 7,566,137 B2 | 7/2009 | Veskovic |
| 7,619,539 B2 | 11/2009 | Veskovic et al. |
| 7,747,357 B2 | 6/2010 | Murdoch |
| 7,865,252 B2 | 1/2011 | Clayton |
| 7,950,827 B2 | 5/2011 | Veskovic |
| 7,963,675 B2 | 6/2011 | Veskovic |
| 2002/0093297 A1 | 7/2002 | Schnebly et al. |
| 2003/0040813 A1 | 2/2003 | Gonzales et al. |
| 2004/0002792 A1 | 1/2004 | Hoffknecht |
| 2005/0043907 A1 † | 2/2005 | Eckel |
| 2005/0110416 A1 | 5/2005 | Veskovic |
| 2006/0185799 A1 | 8/2006 | Kates |
| 2006/0207730 A1 | 9/2006 | Berman et al. |
| 2007/0045431 A1 | 3/2007 | Chapman, Jr. et al. |
| 2007/0061050 A1 | 3/2007 | Hoffknecht |
| 2007/0271006 A1 | 11/2007 | Golden et al. |
| 2007/0273307 A1 | 11/2007 | Westrick et al. |
| 2008/0083834 A1 | 4/2008 | Krebs et al. |
| 2008/0088180 A1 | 4/2008 | Cash et al. |
| 2008/0092075 A1 | 4/2008 | Jacob et al. |
| 2008/0151458 A1 | 6/2008 | Beland et al. |
| 2008/0183307 A1 | 7/2008 | Clayton et al. |
| 2008/0229226 A1 | 9/2008 | Rowbottom et al. |
| 2008/0236763 A1 | 10/2008 | Kates |
| 2008/0283621 A1 | 11/2008 | Quirino et al. |
| 2009/0065598 A1 | 3/2009 | Quirino et al. |
| 2009/0184840 A1 | 7/2009 | Veskovic et al. |
| 2009/0222137 A1 | 9/2009 | Berman et al. |
| 2009/0240381 A1 | 9/2009 | Lane |
| 2009/0256483 A1 | 10/2009 | Gehman et al. |
| 2009/0308543 A1 | 12/2009 | Kates |
| 2009/0315400 A1 | 12/2009 | Howe et al. |
| 2010/0071856 A1 | 3/2010 | Zaharchuk et al. |
| 2010/0127626 A1 | 5/2010 | Altonen et al. |
| 2010/0235008 A1 | 9/2010 | Forbes, Jr. et al. |
| 2011/0029136 A1 | 2/2011 | Altonen et al. |
| 2011/0029139 A1 | 2/2011 | Altonen et al. |
| 2011/0031806 A1 | 2/2011 | Altonen et al. |
| 2011/0035061 A1 | 2/2011 | Altonen et al. |
| 2012/0001487 A1 | 1/2012 | Pessina |
| 2012/0091804 A1 | 4/2012 | Altonen et al. |
| 2012/0095601 A1 | 4/2012 | Abraham et al. |

FOREIGN PATENT DOCUMENTS

| | | |
|---|---|---|
| WO | 03/043385 | 5/2003 |
| WO | 2008/092082 | 7/2008 |
| WO | WO-2008/092082 A2 | 7/2008 |

OTHER PUBLICATIONS

Lagotek Corporation, Home Intelligence Platform User Manual, May 10, 2009, pp. 1-8, 61-75.

Leviton Manufacturing Co., Inc., Centura Fluorescent Dimming & Energy Management System Installation Manual, 2001, 46 pages.

Crestron Electronics, Inc., The Crestron Difference Brochure, Mar. 2009, 2 pages.

Lee, E.S. et al, Integrated Performance of an Automated Venetian Blind/Electric Lighting System in a Full-Scale Private Office, Proceedings of the ASHRAE/DOE/BTECC Conference, LBNL-41443, Sep. 1998, 26 pages, Lawrence Berkeley National Laboratory, Berkeley, California.

Lee, E.S. et al, Low-Cost Networking for Dynamic Window Systems, Energy and Buildings 36, LBNL-52198, 2004, 13 pages, Lawrence Berkeley National Laboratory, Berkeley, California.

(56) References Cited

OTHER PUBLICATIONS

International Search Report and Written Opinion dated Feb. 13, 2014 in related International Application No. PCT/US2012/048963.

Chinese Office Action and Search Report issued in Chinese Patent Application No. 2010800441409 dated Dec. 9, 2013 and English translation of the Search Report and text of the Office Action.

† cited by third party

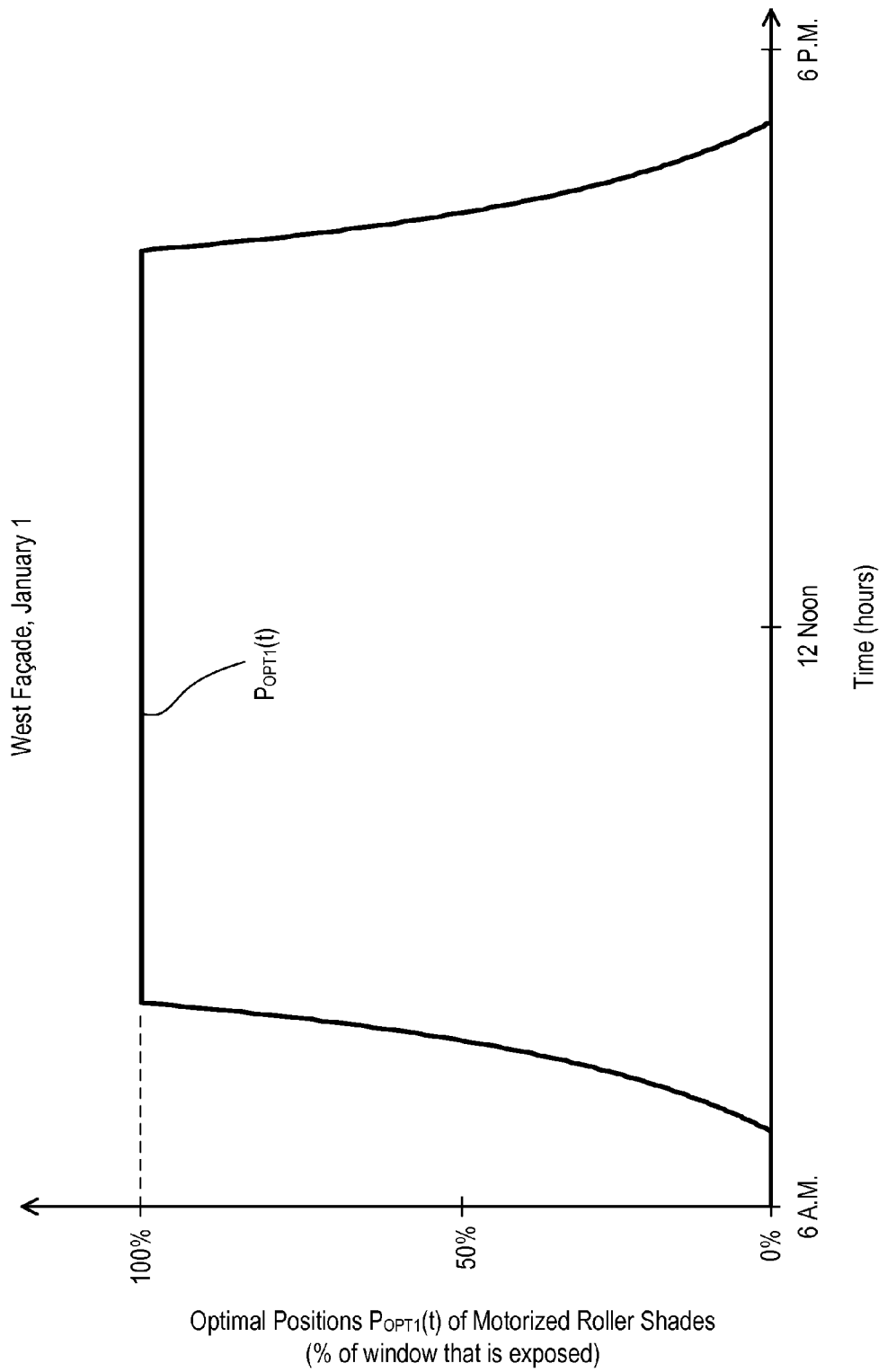

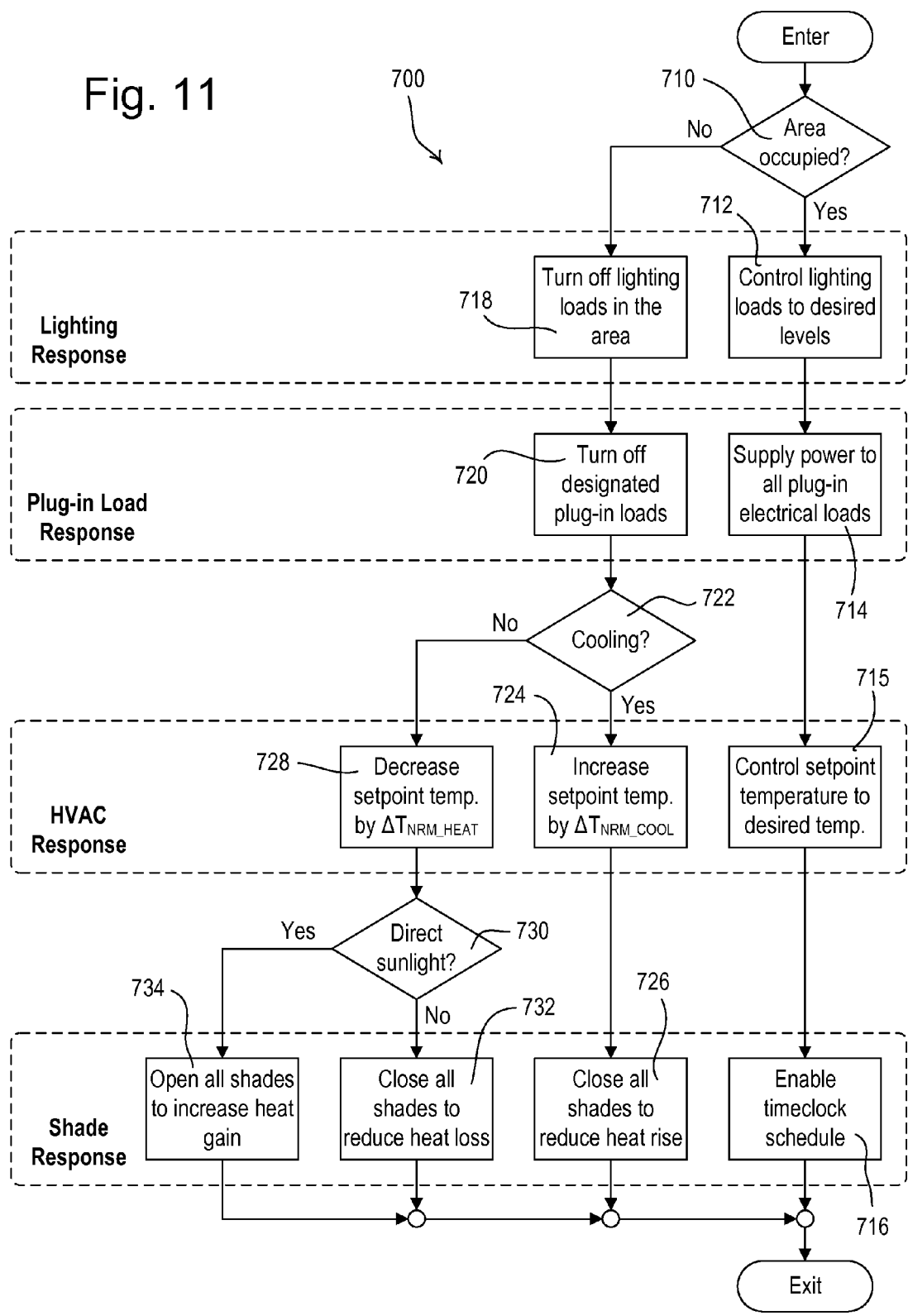

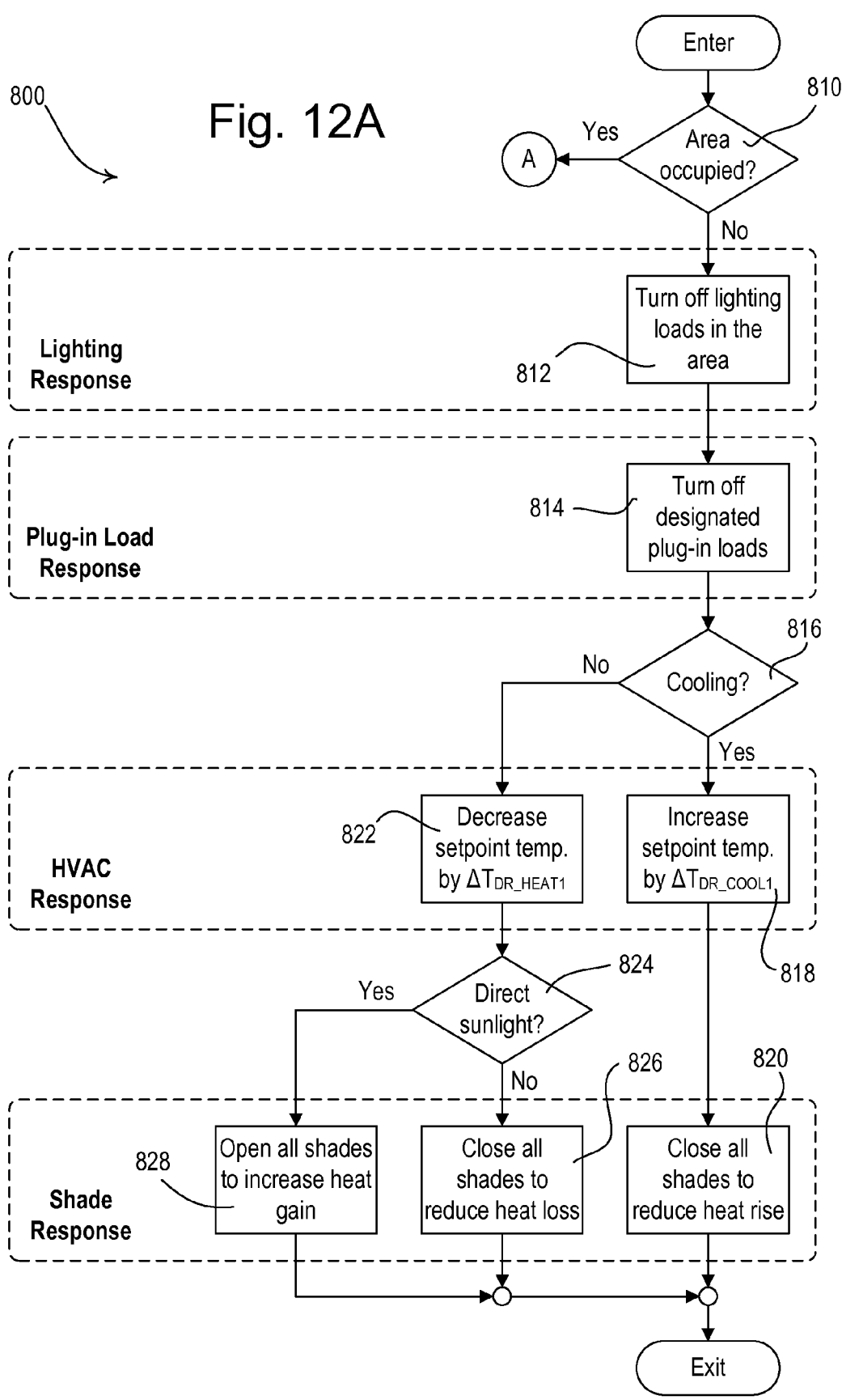

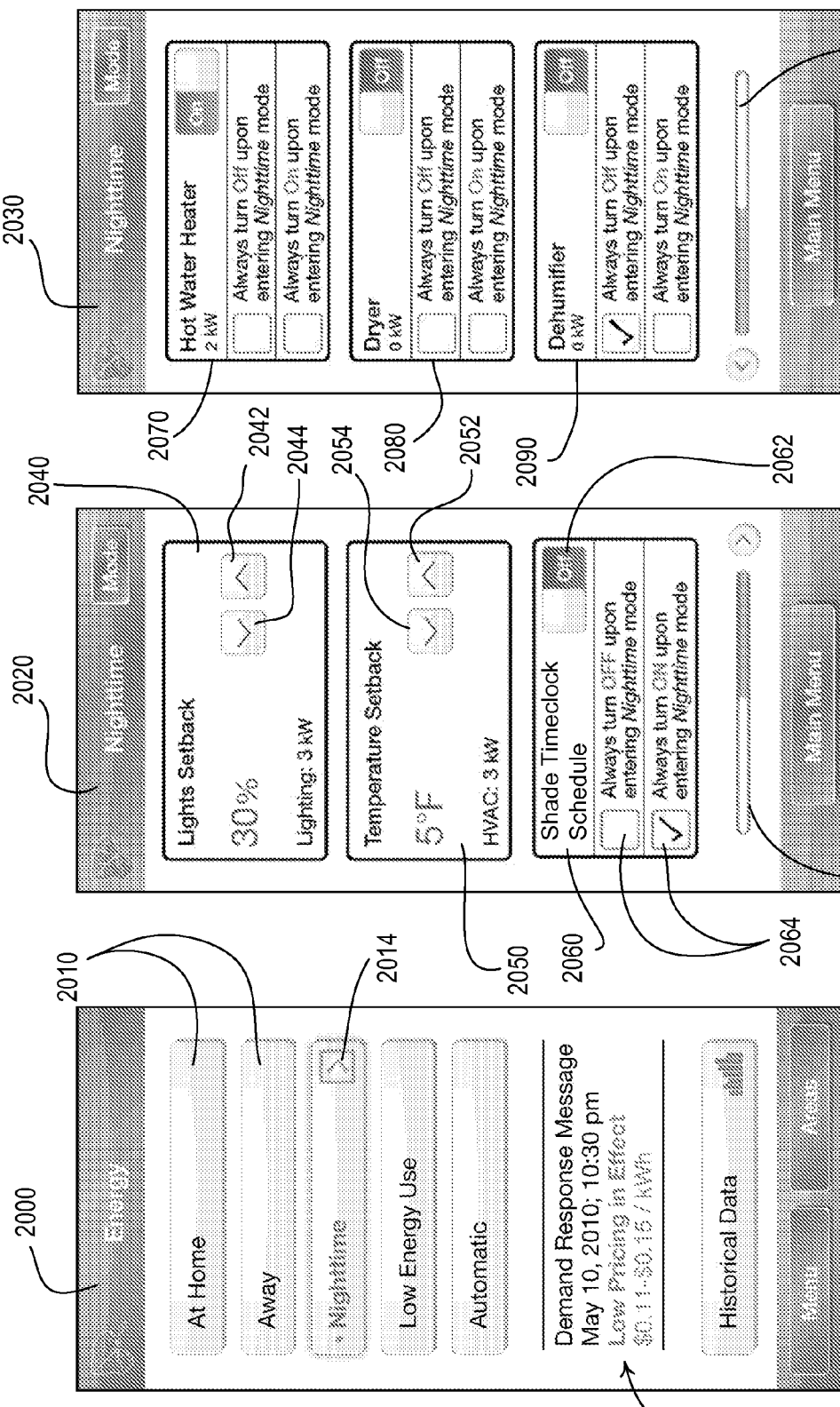

WALL-MOUNTABLE TEMPERATURE CONTROL DEVICE FOR A LOAD CONTROL SYSTEM HAVING AN ENERGY SAVINGS MODE

CROSS REFERENCE TO RELATED APPLICATIONS

This is a continuation-in-part application of commonly-assigned, co-pending U.S. patent application Ser. No. 12/845,016, filed Jul. 28, 2010, entitled LOAD CONTROL SYSTEM HAVING AN ENERGY SAVINGS MODE, which claims priority from U.S. Provisional Patent Application No. 61/230,001, filed Jul. 30, 2009, and U.S. Provisional Application No. 61/239,988, filed Sep. 4, 2009, both entitled LOAD CONTROL SYSTEM HAVING AN ENERGY SAVINGS MODE, and also claims priority from U.S. Provisional Patent Application No. 61/384,073, filed Sep. 17, 2010, entitled DYNAMIC KEYPAD FOR CONTROLLING ENERGY-SAVINGS SETTINGS OF A LOAD CONTROL SYSTEM. The entire disclosures of all of these applications are hereby incorporated by reference.

BACKGROUND OF THE INVENTION

1. Field of the Invention

The present invention relates to a load control system for a plurality of electrical loads in a building, and more particularly, to a load control system for controlling the lighting intensities of lighting loads, the positions of motorized window treatments, and the temperature of the building in order to reduce the total power consumption of the load control system.

2. Description of the Related Art

Reducing the total cost of electrical energy is an important goal for many electricity consumers. The customers of an electrical utility company are typically charged for the total amount of energy consumed during a billing period. However, since the electrical utility company must spend money to ensure that its equipment (e.g., an electrical substation) is able to provide energy in all situations, including peak demand periods, many electrical utility companies charge their electricity consumers at rates that are based on the peak power consumption during the billing period, rather than the average power consumption during the billing period. Thus, if an electricity consumer consumes power at a very high rate for only a short period of time, the electricity consumer will face a significant increase in its total power costs.

Therefore, many electricity consumers use a "load shedding" technique to closely monitor and adjust (i.e., reduce) the amount of power presently being consumed by the electrical system. Additionally, the electricity consumers "shed loads", i.e., turn off some electrical loads, if the total power consumption nears a peak power billing threshold established by the electrical utility. Prior art electrical systems of electricity consumers have included power meters that measure the instantaneous total power being consumed by the system. Accordingly, a building manager of such an electrical system is able to visually monitor the total power being consumed. If the total power consumption nears a billing threshold, the building manager is able to turn off electrical loads to reduce the total power consumption of the electrical system.

Many electrical utility companies offer a "demand response" program to help reduce energy costs for their customers. With a demand response program, the electricity consumers agree to shed loads during peak demand periods in exchange for incentives, such as reduced billing rates or other means of compensation. For example, the electricity utility company may request that a participant in the demand response program shed loads during the afternoon hours of the summer months when demand for power is great. Examples of lighting control systems that are responsive to demand response commands are described in greater detail in commonly-assigned U.S. patent application Ser. No. 11/870,889, filed Oct. 11, 2007, entitled METHOD OF LOAD SHEDDING TO REDUCE THE TOTAL POWER CONSUMPTION OF A LOAD CONTROL SYSTEM, and U.S. Pat. No. 7,747,357, issued Jun. 29, 2010, entitled METHOD OF COMMUNICATING A COMMAND FOR LOAD SHEDDING OF A LOAD CONTROL SYSTEM, the entire disclosures of which are hereby incorporated by reference.

Some prior art lighting control systems have offered a load shedding capability in which the intensities of all lighting loads are reduced by a fixed percentage, e.g., by 25%, in response to an input provided to the system. The input may comprise an actuation of a button on a system keypad by a building manager. Such a lighting control system is described in commonly-assigned U.S. Pat. No. 6,225,760, issued May 1, 2001, entitled FLUORESCENT LAMP DIMMER SYSTEM, the entire disclosure of which is hereby incorporated by reference.

Some prior art load control systems have provided for control of both electrical lighting loads (to control the amount of artificial light in a space) and motorized window treatments (to control the amount of daylight entering the space). Such load control systems have operated to achieve a desired lighting intensity on task surfaces in the space, to maximize the contribution of the daylight provided to the total light illumination in the space (i.e., to provide energy savings), and/or to minimize sun glare in the space. An example of a load control system for control of both electrical lighting loads and motorized window treatments is described in greater detail in commonly-assigned U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, the entire disclosure of which is hereby incorporated by reference.

In addition, prior art heating, ventilation, and air-conditioning (HVAC) control systems for control of the temperature in a building and may operate to minimize energy consumption. However, there exists a need for a single load control system that controls the lighting intensities of lighting loads, the positions of motorized window treatments, and the temperature of the building in order to reduce the total power consumption of the load control system.

SUMMARY OF THE INVENTION

According to an embodiment of the present invention, a temperature control system for controlling a present temperature of a building having a heating and cooling system comprises a wall-mountable temperature control device for adjusting a system setpoint temperature of the temperature control system to thus control the present temperature in the building, the temperature control device having a vertically-arranged temperature adjustment actuator for adjusting a base setpoint temperature, a room temperature visual display for displaying a visual representation of the present temperature of the building, and a setpoint temperature visual display for displaying a visual representation of the system setpoint temperature. The room temperature visual display and the setpoint temperature visual display each comprise a linear array of light-emitting diodes arranged parallel to the temperature adjustment actuator and controlled such that one of the light-emitting diodes of the setpoint temperature visual display is illuminated to display the system setpoint temperature and one of the light-emitting diodes of the room temperature visual display is illuminated to display the present temperature of the building.

The system further comprises a controller operable to determine the present temperature of the building. The controller is operable to receive a digital message including an energy-savings preset and to determine a setback temperature in response to the energy-savings preset, the controller operable, in response to receiving the digital message, to increase the system setpoint temperature to be equal to the base setpoint temperature plus the setback temperature when cooling the building and decrease the system setpoint temperature to be equal to the base setpoint temperature minus the setback temperature when heating the building so as to decrease the power consumption of the heating and cooling system, wherein the controller does not adjust the setback temperature in response to adjustments of the base setpoint temperature. The one of the light-emitting diodes of the room temperature visual display that is illuminated to display the present temperature is adjusted in response to changes in the present temperature of the building determined by the controller, and the one of the light-emitting diodes of the setpoint temperature visual display that is illuminated to display the system setpoint temperature is adjusted in response to the setback temperature of the energy-savings preset.

According to another embodiment of the present invention, a temperature control system for controlling a present temperature of a building having a heating and cooling system comprises a wall-mountable temperature control device, a wireless temperature sensor, and a heating and cooling controller. The wall-mountable temperature control device adjusts a system setpoint temperature of the temperature control system to thus control the present temperature in the building, the temperature control device having a temperature adjustment actuator for adjusting a base setpoint temperature, a room temperature visual display for displaying a visual representation of the present temperature of the building, and a setpoint temperature visual display for displaying a visual representation of the system setpoint temperature. The room temperature visual display and the setpoint temperature visual display each comprise a linear array of light-emitting diodes arranged parallel to the temperature adjustment actuator. The temperature control device transmits digital messages in response to actuations of the temperature adjustment actuator and receives digital messages regarding the present temperature of the building and the base setpoint temperature.

The wireless temperature sensor is adapted to be mounted remotely from the temperature control device and is operable to transmit wireless digital messages regarding the present temperature of the building. The heating and cooling controller receives the wireless digital messages from the wireless temperature sensor and determines the present temperature of the building in response to the wireless digital message received from the wireless temperature sensor. The controller adjusts the one of the light-emitting diodes of the room temperature visual display that is illuminated to display the present temperature of the building in response to the received wireless digital message from the wireless temperature sensor. The heating and cooling controller is adapted to be coupled in communication with the heating and cooling system for controlling the present temperature of the building in response to the present temperature and the system setpoint temperature. The heating and cooling controller adjusts the base setpoint temperature in response to the actuations of the temperature adjustment actuator, and adjusts the one of the light-emitting diodes of the setpoint temperature visual display that is illuminated to display the system setpoint temperature. The heating and cooling controller is operable to receive a digital message including an energy-savings preset and to determine a setback temperature in response to the energy-savings preset. The heating and cooling controller, in response to receiving the digital message, increases the setpoint temperature to be equal to the base setpoint temperature plus the setback temperature when cooling the building and decreases the system setpoint temperature to be equal to the base setpoint temperature minus the setback temperature when heating the building so as to decrease the power consumption of the heating and cooling system. The heating and cooling controller adjusts the one of the light-emitting diodes of the setpoint temperature visual display that is illuminated to display the system setpoint temperature, wherein the heating and cooling controller does not adjust the setback temperature in response to adjustments of the base setback temperature.

Other features and advantages of the present invention will become apparent from the following description of the invention that refers to the accompanying drawings.

BRIEF DESCRIPTION OF THE DRAWINGS

FIGS. 6A-6C show example plots of optimal shade positions of the motorized roller shades of the load control system of FIG. 1 on different facades of the building during different days of the year according to the first embodiment of the present invention;

FIG. 11 is a simplified flowchart of a normal control procedure executed by the controller of the load control system of FIG. 1 according to the first embodiment of the present invention;

FIGS. 12A and 12B are simplified flowcharts of a demand response control procedure executed by the controller of the load control system of FIG. 1 according to the first embodiment of the present invention;

FIG. 37 shows an example screenshot of an energy-savings preset screen of the dynamic keypad of FIG. 29; and FIGS. 38 and 39 show example screenshots of first and second energy-savings adjustment screens of the dynamic keypad of FIG. 29.

DETAILED DESCRIPTION OF THE INVENTION

Figure 1:
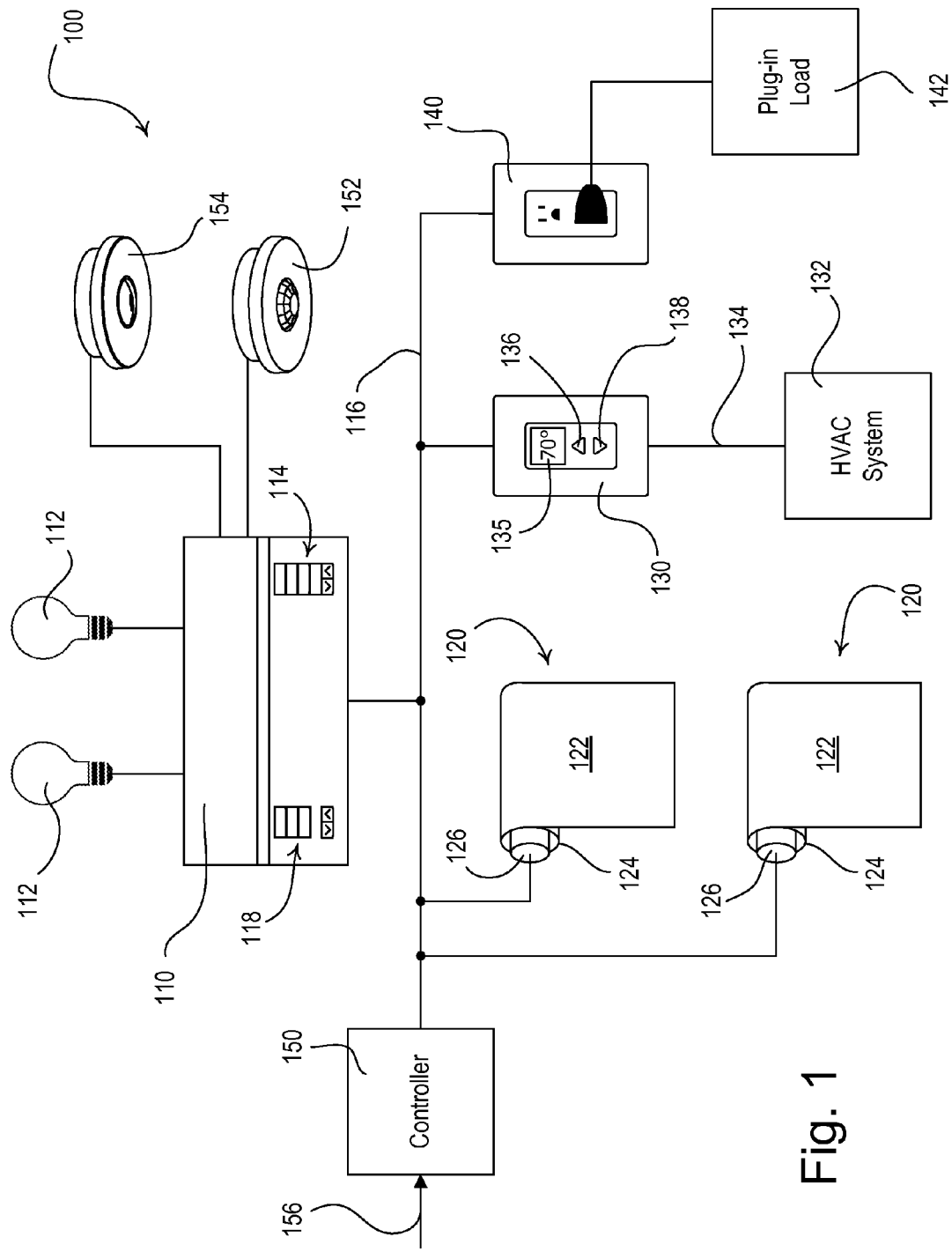
FIG. 1 is a simplified block diagram of a centralized load control system according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a centralized load control system 100 that may be installed in a building (such as a commercial building) according to a first embodiment of the present invention. The load control system 100 comprises a multi-zone lighting control device 110 that is operable to control the amount of power delivered from an alternating-current (AC) power source (not shown) to one or more lighting loads 112 for adjusting the intensities of the lighting loads. The lighting load 112 may be located in a space 160 (FIG. 2) of the building to thus control the amount of electric light (i.e., artificial light) in the space. The lighting loads 112 may comprise, for example, incandescent lamps, halogen lamps, gas discharge lamps, fluorescent lamps, compact fluorescent lamps, high-intensity discharge (HID) lamps, magnetic low-voltage (MLV) lighting loads, electronic low-voltage (ELV) lighting loads, light-emitting diode (LED) light sources, hybrid light sources comprising two or more different types of lamps, and any other electrical light sources, or combination thereof, that provide illumination. In addition, the load control system 100 may comprise additional multi-zone lighting control devices 110 as well as single-zone lighting control devices, such as, electronic dimming ballasts, LED drivers, and dimmer switches.

The lighting control device 110 is operable to control a present lighting intensity $L_{PRES}$ of each of the lighting loads 112 from a minimum lighting intensity $L_{MIN}$ to a maximum lighting intensity $L_{MAX}$. The lighting control device 110 is operable to "fade" the present lighting intensity $L_{PRES}$, i.e., control the present lighting intensity from a first lighting intensity to a second lighting intensity over a period of time. Fade rates of a lighting control device are described in greater detail in commonly-assigned U.S. Pat. No. 5,248,919, issued Sep. 29, 1993, entitled LIGHTING CONTROL DEVICE, the entire disclosure of which is hereby incorporated by reference.

The lighting control device 110 comprises a first set of buttons 114, which may be actuated by a user to allow for manual control of the intensities of the lighting loads 112, i.e., to allow an occupant to control the intensities of the lighting load 112 to desired intensity levels $L_{DES}$. Actuations of the buttons 114 may cause the lighting control device 110 to select one or more lighting presets (i.e., "scenes"). The first set of buttons 114 may also comprise raise and lower buttons for respectively raising and lowering the intensities of all (or a subset) of the lighting loads 112 in unison. The lighting control device 110 is connected to a wired communication link 116 and is operable to transmit and receive digital messages via the communication link. Alternatively, the communication link could comprise a wireless communication link, such as, for example, a radio-frequency (RF) communication link or an infrared (IR) communication link.

The load control system 100 also comprises one or more daylight control devices, for example, motorized window treatments, such as motorized roller shades 120. The motorized roller shades 120 of the load control system 100 may be positioned in front of one or more windows for controlling the amount of daylight (i.e., natural light) entering the building. The motorized roller shades 120 each comprise a flexible shade fabric 122 rotatably supported by a roller tube 124. Each motorized roller shade 120 is controlled by an electronic drive unit (EDU) 126, which may be located inside the roller tube 124. The electronic drive unit 126 may be powered directly from the AC power source or from an external direct-current (DC) power supply (not shown). The electronic drive unit 126 is operable to rotate the respective roller tube 124 to move the bottom edge of the shade fabric 122 to a fully-open position and a fully-closed position, and to any position between the fully-open position and the fully-closed position (e.g., a preset position). Specifically, the motorized roller shades 120 may be opened to allow more daylight to enter the building and may be closed to allow less daylight to enter the building. In addition, the motorized roller shades 120 may be controlled to provide additional insulation for the building, e.g., by moving to the fully-closed position to keep the building cool in the summer and warm in the winter. Examples of electronic drive units for motorized roller shades are described in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 6,983,783, issued Jan. 10, 2006, entitled MOTORIZED SHADE CONTROL SYSTEM, the entire disclosures of which are hereby incorporated by reference.

Alternatively, the motorized roller shades 120 could comprise tensioned roller shade systems, such that the motorized roller shades 120 may be mounted in a non-vertical manner, for example, horizontally in a skylight. An example of a tensioned roller shade system that is able to be mounted in a skylights is described in commonly-assigned U.S. patent application Ser. No. 12/061,802, filed Apr. 3, 2008, entitled SELF-CONTAINED TENSIONED ROLLER SHADE SYSTEM, the entire disclosure of which is hereby incorporated by reference. In addition, the daylight control devices of the load control system 100 could alternatively comprise controllable window glazings (e.g., electrochromic windows), controllable exterior shades, controllable shutters or louvers, or other types of motorized window treatments, such as motorized draperies, roman shades, or blinds. An example of a motorized drapery system is described in commonly-assigned U.S. Pat. No. 6,935,403, issued Aug. 30, 2005, entitled MOTORIZED DRAPERY PULL SYSTEM, the entire disclosure of which in hereby incorporated by reference.

Each of the electronic drive units 126 is coupled to the communication link 116, such that the electronic drive unit may control the position of the respective shade fabric 122 in response to digital messages received via the communication link. The lighting control device 110 may comprise a second set of buttons 118 that provides for control of the motorized roller shades 120. The lighting control device 110 is operable to transmit a digital message to the electronic drive units 126 in response to actuations of any of the second set of buttons 118. The user is able to use the second set of buttons 118 to open or close the motorized roller shades 120, adjust the position of the shade fabric 122 of the roller shades, or set the roller shades to preset shade positions between the fully open position and the fully closed position.

The load control system 100 comprise one or more temperature control devices 130, which are also coupled to the communication link 116, and may be powered, for example, from the AC power source, an external DC power supply, or an internal battery. The temperature control devices 130 are also coupled to a heating, ventilation, and air-conditioning (HVAC) control system 132 (i.e., a "heating and cooling" system) via an HVAC communication link 134, which may comprise, for example, a network communication link such as an Ethernet link or a BACnet® link. Each temperature is operable to control the HVAC system 132 to a cooling mode in which the HVAC system is cooling the building, and to a heating mode in which the HVAC system is heating the building. The temperature control devices 130 each measure a present temperature $T_{PRES}$ in the building and transmit appropriate digital messages to the HVAC system to thus control the present temperature in the building towards a setpoint temperature $T_{SET}$. Each temperature control device 130 may comprise a visual display 135 for displaying the present temperature $T_{PRES}$ in the building or the setpoint temperature $T_{SET}$. In addition, each temperature control device 130 may comprise raise and lower temperature buttons 136, 138 for respectively raising and lowering the setpoint temperature $T_{SET}$ to a desired temperature $T_{DES}$ as specified by the occupant in the building. Each temperature control device 130 is also operable to adjust the setpoint temperature $T_{SET}$ in response to digital messages received via the communication link 116.

The load control system 100 further comprises one or more controllable electrical receptacles 140 for control of one or more plug-in electrical loads 142, such as, for example, table lamps, floor lamps, printers, fax machines, display monitors, televisions, coffee makers, and water coolers. Each controllable electrical receptacle 140 receives power from the AC power source and has an electrical output to which a plug of the plug-in electrical load 142 may be inserted for thus powering the plug-in load. Each controllable electrical receptacle 140 is operable to turn on and off the connected plug-in electrical load 142 in response to digital messages received via the communication link. In addition, the controllable electrical receptacles 140 may be able to control the amount of power delivered to the plug-in electrical load 142, e.g., to dim a plug-in lighting load. Additionally, the load control system 100 could comprise one or more controllable circuit breakers (not shown) for control of electrical loads that are not plugged into electrical receptacles, such as a water heater.

The load control system 100 may also comprise a controller 150, which may be coupled to the communication link 116 for facilitating control of the lighting control devices 110, the motorized roller shades 120, the temperature control devices 130, and the controllable electrical receptacles 140 of the load control system 100. The controller 150 is operable to control the lighting control devices 110 and the motorized roller shades 120 to control a total light level in the space 160 (i.e., the sum of the artificial and natural light in the space). The controller 150 is further operable to control the load control system 100 to operate in an energy savings mode. Specifically, the controller 150 is operable to transmit individual digital messages to each of the lighting control devices 110, the motorized roller shades 120, the temperature control devices 130, and the controllable electrical receptacles 140 to control the intensities of the lighting loads 112, the positions of the shade fabrics 122, the temperature of the building, and the state of the plug-in electrical loads 142, respectively, so as to reduce the total power consumption of the load control system 100 (as will be described in greater detail below). The controller 150 may be further operable to monitor the total power consumption of the load control system 100.

The load control system 100 may further comprise an occupancy sensor 152 for detecting an occupancy condition or a vacancy condition in the space in which the occupancy sensor in mounted, and a daylight sensor 154 for measuring an ambient light intensity $L_{AMB}$ in the space in which the daylight sensor in mounted. The occupancy sensor 152 and the daylight sensor 154 may be coupled to the lighting control device 110 (as shown in FIG. 1). Alternatively, the occupancy sensor 152 and the daylight sensor 154 may be coupled to the communication link 116 or directly to the controller 150.

The controller 150 is operable to control the lighting control device 110, the motorized roller shades 120, the temperature control devices 130, and the controllable electrical receptacles 140 in response to an occupancy condition or a vacancy condition detected by the occupancy sensor 152, and/or in response to the ambient light intensity $L_{AMB}$ measured by the daylight sensor 154. For example, the controller 150 may be operable to turn on the lighting loads 112 in response to detecting the presence of an occupant in the vicinity of the occupancy sensor 152 (i.e., an occupancy condition), and to turn off the lighting loads in response to detecting the absence of the occupant (i.e., a vacancy condition). In addition, the controller 150 may be operable to increase the intensities of the lighting loads 112 if the ambient light intensity $L_{AMB}$ detected by the daylight sensor 154 is less than a setpoint light intensity $L_{SET}$, and to decrease the intensities of the lighting load if the ambient light intensity $L_{AMB}$ is greater than the setpoint light intensity $L_{SET}$.

Examples of occupancy sensors are described in greater detail in co-pending, commonly-assigned U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference. Examples of daylight sensors are described in greater detail in commonly-assigned U.S. patent application Ser. No. 12/727,923, filed Mar. 19, 2010, entitled METHOD OF CALIBRATING A DAYLIGHT SENSOR; and U.S. patent application Ser. No. 12/727,956, filed Mar. 19, 2010, entitled WIRELESS BATTERY-POWERED DAYLIGHT SENSOR, the entire disclosures of which are hereby incorporated by reference.

The controller 150 may also be connected to a network communication link 156, e.g., an Ethernet link, which may be coupled to a local area network (LAN), such as an intranet, or a wide area network (WAN), such as the Internet. The network communication link 156 may also comprise a wireless communication link allowing for communication on a wireless LAN. For example, the controller 150 may be operable to receive a demand response (DR) command (e.g., an "immediate" demand response command) from an electrical utility company as part of a demand response program. In response to receiving an immediate demand response command, the controller 150 will immediately control the load control system 100 to reduce the total power consumption of the load control system.

According to alternative embodiments of the present invention, the demand response command may also comprise one of a plurality of demand response levels or a planned demand response command indicating an upcoming planned demand response event as will be describe in greater detail below. While the present invention is described with the controller 150 connected to the network communication link 156 for receipt of the demand response commands, the one or more of the lighting control devices 110 could alternatively be coupled to the network communication link 156 for control of the lighting loads 112, the motorized roller shades 120, the temperature control devices 130, and the controllable electrical receptacles 140 in response to the demand response commands.

The controller 150 may comprise an astronomical time clock for determining the present time of day and year. Alternatively, the controller 150 could retrieve the present time of the year or day from the Internet via the network communication link 156.

To maximize the reduction in the total power consumption of the load control system 100, the controller 150 is operable to control the load control system 100 differently depending upon whether the HVAC system 132 is presently heating or cooling. For example, the controller 150 may increase the setpoint temperatures $T_{SET}$ of each of the temperature control devices 130 when the HVAC system 132 is presently cooling and may decrease the setpoint temperatures $T_{SET}$ when the HVAC system is presently heating in order to save energy. Alternatively, the controller 150 could control the setpoint temperature $T_{SET}$ of the temperature control device 130 differently depending on whether the present time of the year is during a first portion of the year, e.g., the "summer" (i.e., the warmer months of the year), or during a second portion of the year, e.g., the "winter" (i.e., the colder months of the year). As used herein, the "summer" refers to the warmer half of the year, for example, from approximately May 1 to approximately October 31, and the "winter" refers to the colder half of the year, for example, from approximately November 1 to approximately April 30. In addition, the controller 150 could alternatively control the setpoint temperature $T_{SET}$ of the temperature control device 130 differently depending on the temperature external to the building.

The controller 150 may be operable to operate in an "out-of-box" mode of operation immediately after being installed and powered for the first time. Specifically, the controller 150 may be operable to control the lighting control devices 110, the motorized roller shades 120, the temperature control devices 130, and the controllable electrical receptacles 140 according to pre-programmed out-of-box settings in response to receiving a demand response command via the network communication link 156. For example, in response to receiving the demand response command when in the out-of-box mode, the controller 150 may dim the lighting loads 112 by a predetermined percentage $\Delta L_{OOB}$, e.g., by approximately 20% of the present lighting intensity $L_{PRES}$ (such that the lighting loads 112 consume less power). In addition, the controller 150 may close all of the motorized roller shades 120 to provide additional insulation for the building (such that the HVAC system 132 will consume less power) in response to receiving the demand response command when in the out-of-box mode. Further, the controller 150 may adjust the setpoint temperatures $T_{SET}$ of the temperature control devices 130 in response in response to receiving the demand response command when in the out-of-box mode, for example, by increasing the setpoint temperatures $T_{SET}$ of each of the temperature control devices by a predetermined setback temperature $T_{OOB}$ (e.g., approximately 2° F.) when the HVAC system 132 is presently cooling the building, and decreasing the setpoint temperatures $T_{SET}$ of each of the temperature control devices by the predetermined setback temperature $T_{OOB}$ when the HVAC system is presently heating the building, such that the HVAC system will consume less power.

To maximize the reduction in the total power consumption of the load control system 100, the controller 150 may be configured using an advanced programming procedure, such that the controller 150 operates in a programmed mode (rather than the out-of-box mode). For example, the controller 150 may be programmed to control the load control system 100 differently depending upon whether one or more of the windows of the building are receiving direct sunlight as will be described in greater detail below. The load control system 100 and the controller 150 may be programmed using, for example, a personal computer (PC) (not shown), having a graphical user interface (GUI) software. The programming information may be stored in a memory in the controller 150.

In addition, the controller 150 or one of the other control devices of the load control system 100 may be able to provide a visual indication that load control system is operating in the energy savings mode (i.e., in response to a demand response command). For example, the lighting control device 110 could comprise a visual indicator, such as a light-emitting diode (LED), which may be illuminated when the load control system 100 is operating in the energy savings mode. An example of a lighting control device for providing a visual indication of an energy savings mode is described in greater detail in commonly-assigned U.S. patent application Ser. No. 12/474,950, filed May 29, 2009, entitled LOAD CONTROL DEVICE HAVING A VISUAL INDICATION OF AN ENERGY SAVINGS MODE, the entire disclosure of which is hereby incorporated by reference.

Figure 29:
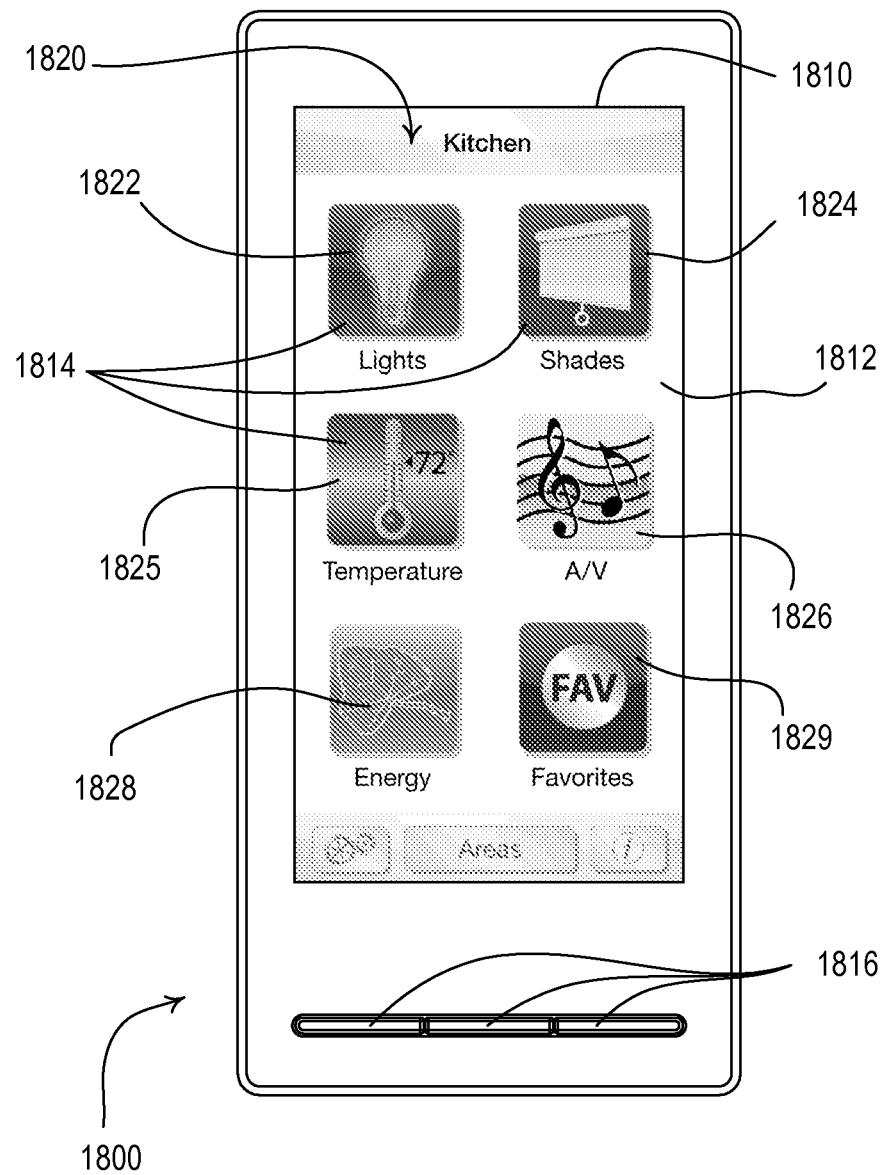
FIG. 29 is a front view of a dynamic keypad of the load control system of FIG. 20.

Alternatively, the load control system 100 could comprises a visual display, such as an liquid-crystal display (LCD) screen, for providing a visual indication in the load control system 100 is operating in the energy savings mode and for providing information regarding the total power consumption of the load control system and the amount of energy savings. An example of a visual display for providing energy savings information is described in greater detail in commonly-assigned U.S. patent application Ser. No. 12/044,672, filed Mar. 7, 2008, SYSTEM AND METHOD FOR GRAPHICALLY DISPLAYING ENERGY CONSUMPTION AND SAVINGS, the entire disclosure of which is hereby incorporated by reference. In addition, the load control system 100 could comprise a dynamic keypad for receiving user inputs (e.g., dynamic keypad 1800 of the fourth embodiment as shown in FIG. 29 and described in greater detail below).

The controller 150 is operable to transmit digital messages to the motorized roller shades 120 to control the amount of sunlight entering the space 160 of the building to limit a sunlight penetration distance $d_{PEN}$ in the space. The controller 150 comprises an astronomical timeclock and is able to determine a sunrise time $t_{SUNRISE}$ and a sunset time $t_{SUNSET}$ for a specific day of the year. The controller 150 transmits commands to the electronic drive units 126 to automatically control the motorized roller shades 120 in response to a shade timeclock schedule as will be described in greater detail below. An example of a method of limiting the sunlight penetration distance $d_{PEN}$ is a space is described in greater detail in commonly-assigned commonly-assigned U.S. patent application Ser. No. 12/563,786, filed Sep. 21, 2009, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

Figure 2:
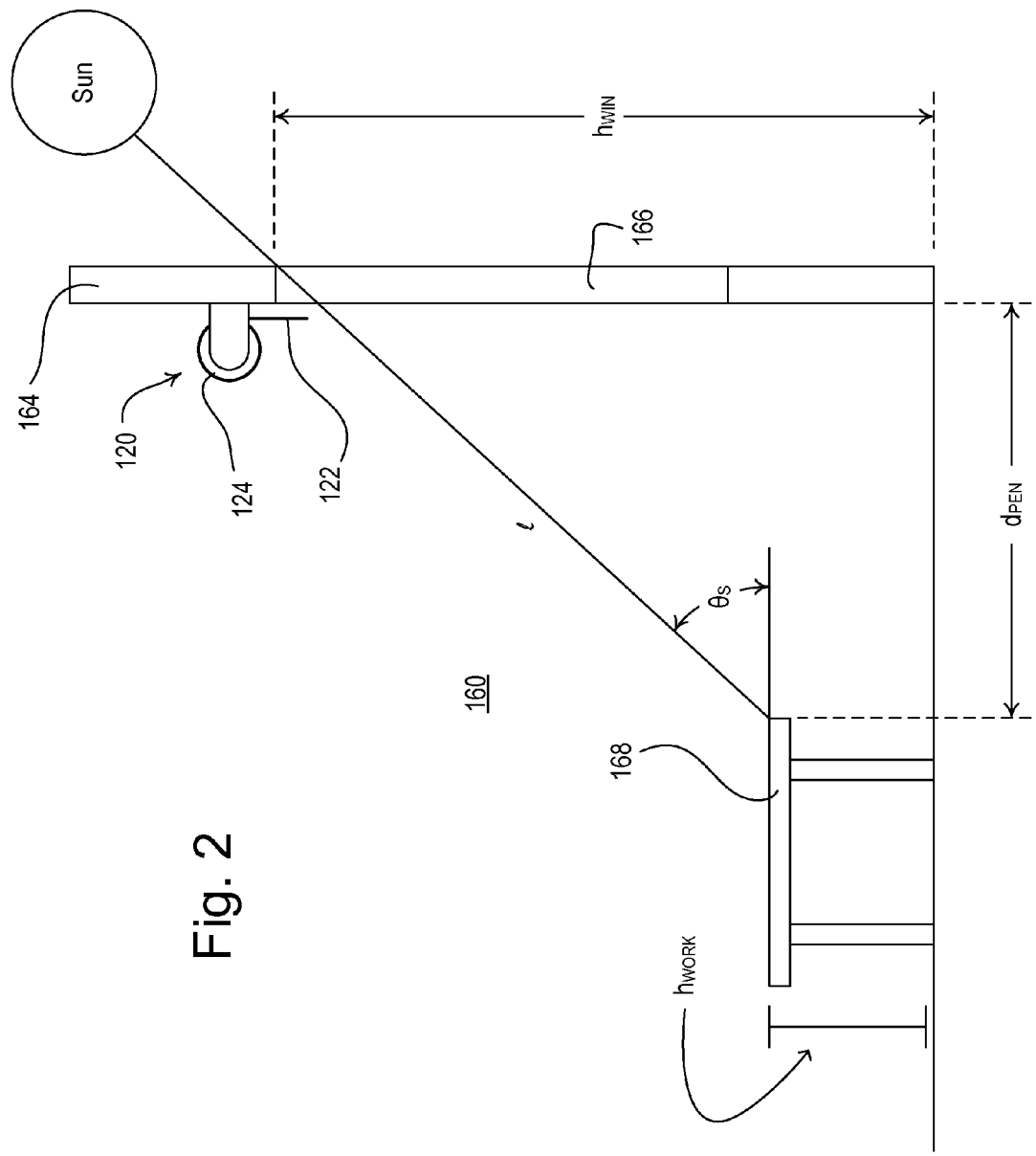
FIG. 2 is a simplified side view of an example of a space of a building having a window covered by one of the motorized roller shades of the load control system of FIG. 1.

FIG. 2 is a simplified side view of an example of the space 160 illustrating the sunlight penetration distance $d_{PEN}$, which is controlled by one of the motorized roller shades 120. As shown in FIG. 2, the building comprises a façade 164 (e.g., one side of a four-sided rectangular building) having a window 166 for allowing sunlight to enter the space. The space 160 also comprises a work surface, e.g., a table 168, which has a height $h_{WORK}$. The motorized roller shade 120 is mounted above the window 166, such that the shade fabric 122 hangs in front of the window, so as to control the amount of daylight (i.e., natural light) that is admitted through the window. The electronic drive unit 126 rotates the roller tube 124 to move the shade fabric 122 between a fully open position (in which the window 166 is not covered) and a fully closed position (in which the window 166 is fully covered). Further, the electronic drive unit 126 may control the position of the shade fabric 122 to one of a plurality of preset positions between the fully open position and the fully closed position.

The sunlight penetration distance $d_{PEN}$ is the distance from the window 166 and the façade 164 at which direct sunlight shines into the room. The sunlight penetration distance $d_{PEN}$ is a function of a height $h_{WIN}$ of the window 166 and an angle $\phi_F$ of the façade 164 with respect to true north, as well as a solar elevation angle $\theta_S$ and a solar azimuth angle $\theta_S$, which define the position of the sun in the sky. The solar elevation angle $\theta_S$ and the solar azimuth angle $\phi_S$ are functions of the present date and time, as well as the position (i.e., the longitude and latitude) of the building in which the space 160 is located. The solar elevation angle $\theta_S$ is essentially the angle between a line directed towards the sun and a line directed towards the horizon at the position of the building. The solar elevation angle $\theta_S$ can also be thought of as the angle of incidence of the sun's rays on a horizontal surface. The solar azimuth angle $\phi_S$ is the angle formed by the line from the observer to true north and the line from the observer to the sun projected on the ground.

Figure 3A:
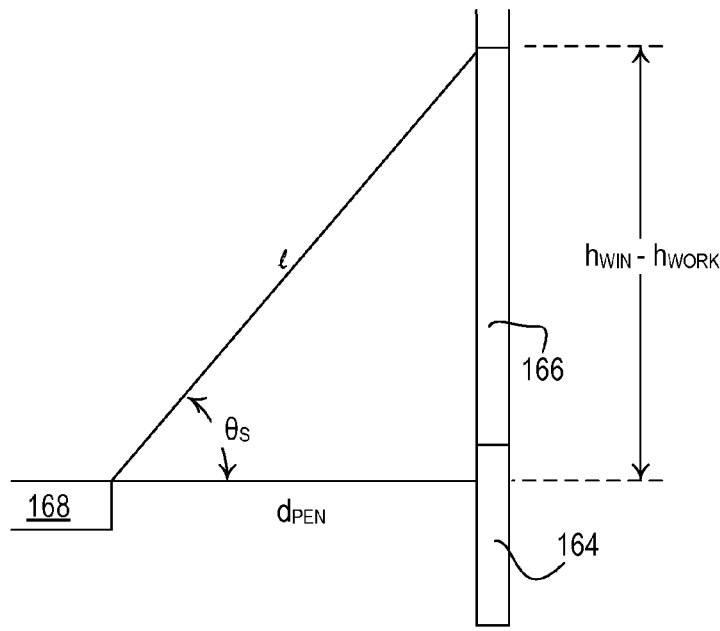
FIG. 3A is a side view of the window of FIG. 2 illustrating a sunlight penetration depth.

The sunlight penetration distance $d_{PEN}$ of direct sunlight onto the table 168 of the space 160 (which is measured normal to the surface of the window 166) can be determined by considering a triangle formed by the length l of the deepest penetrating ray of light (which is parallel to the path of the ray), the difference between the height $h_{WIN}$ of the window 166 and the height $h_{WORK}$ of the table 168, and distance between the table and the wall of the façade 164 (i.e., the sunlight penetration distance $d_{PEN}$) as shown in the side view of the window 166 in FIG. 3A, i.e., $$\tan(\theta_S) = (h_{WIN} - h_{WORK})/l, \quad \text{(Equation 1)}$$

where $\theta_S$ is the solar elevation angle of the sun at a given date and time for a given location (i.e., longitude and latitude) of the building.

Figure 3B:
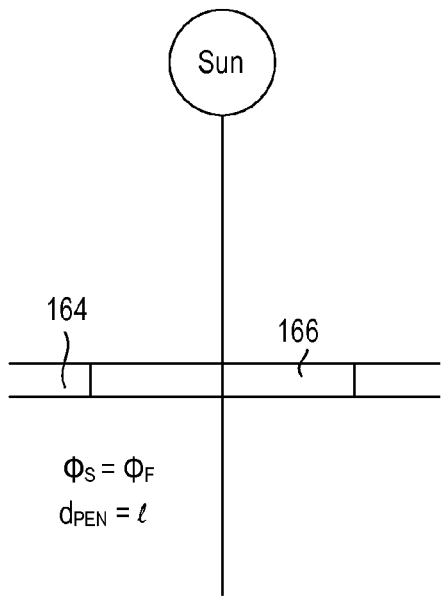
FIG. 3B is a top view of the window of FIG. 2 when the sun is directly incident upon the window.
Figure 3C:
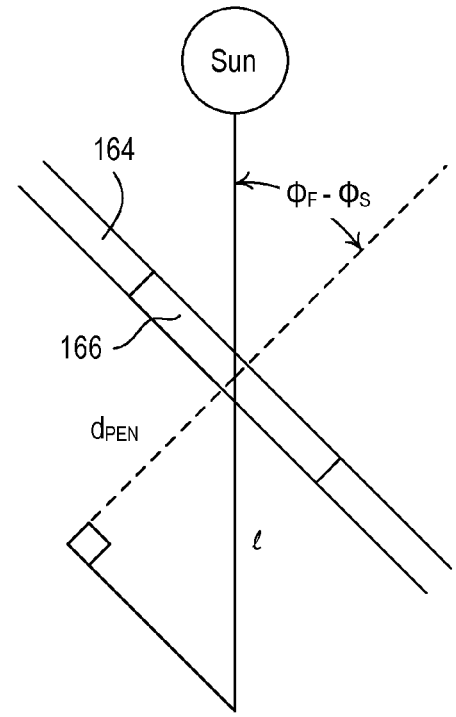
FIG. 3C is a top view of the window of FIG. 2 when the sun is not directly incident upon the window.

If the sun is directly incident upon the window 166, a solar azimuth angle $\phi_S$ and the façade angle $\phi_F$ (i.e., with respect to true north) are equal as shown by the top view of the window 166 in FIG. 3B. Accordingly, the sunlight penetration distance $d_{PEN}$ equals the length l of the deepest penetrating ray of light. However, if the façade angle $\phi_F$ is not equal to the solar azimuth angle $\phi_S$, the sunlight penetration distance $d_{PEN}$ is a function of the cosine of the difference between the façade angle $\phi_F$ and the solar azimuth angle $\phi_S$, i.e., $$d_{PEN}=l\cdot\cos(|\phi_F-\phi_S|), \quad \text{(Equation 2)}$$

as shown by the top view of the window 166 in FIG. 3C.

As previously mentioned, the solar elevation angle $\theta_S$ and the solar azimuth angle $\phi_S$ define the position of the sun in the sky and are functions of the position (i.e., the longitude and latitude) of the building in which the space 160 is located and the present date and time. The following equations are necessary to approximate the solar elevation angle $\theta_S$ and the solar azimuth angle $\phi_S$. The equation of time defines essentially the difference in a time as given by a sundial and a time as given by a clock. This difference is due to the obliquity of the Earth's axis of rotation. The equation of time can be approximated by $$E=9.87\cdot\sin(2B)-7.53\cdot\cos(B)-1.5\cdot\sin(B), \quad \text{(Equation 3)}$$

where $B=[360°\cdot(N_{DAY}-81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta=23.45°\cdot\sin[360°/365\cdot(N_{DAY}+284)]. \quad \text{(Equation 4)}$$

The solar hour angle H is the angle between the meridian plane and the plane formed by the Earth's axis and current location of the sun, i.e., $$H(t)=\{¼\cdot[t+E-(4\cdot\lambda)+(60\cdot t_{TZ})]\}-180°, \quad \text{(Equation 5)}$$

where t is the present local time of the day, $\lambda$ is the local longitude, and $t_{TZ}$ is the time zone difference (in unit of hours) between the local time t and Greenwich Mean Time (GMT). For example, the time zone difference $t_{TZ}$ for the Eastern Standard Time (EST) zone is −5. The time zone difference $t_{TZ}$ can be determined from the local longitude $\lambda$ and latitude $\phi$ of the building. For a given solar hour angle H, the local time can be determined by solving Equation 5 for the time t, i.e., $$t=720+4\cdot(H+\lambda)-(60\cdot t_{TZ})-E. \quad \text{(Equation 6)}$$

When the solar hour angle H equals zero, the sun is at the highest point in the sky, which is referred to as "solar noon" time $t_{SN}$, i.e., $$t_{SN}=720+(4\cdot\lambda)-(60\cdot t_{TZ})-E. \quad \text{(Equation 7)}$$

A negative solar hour angle H indicates that the sun is east of the meridian plane (i.e., morning), while a positive solar hour angle H indicates that the sun is west of the meridian plane (i.e., afternoon or evening).

The solar elevation angle $\theta_S$ as a function of the present local time t can be calculated using the equation:

$$\theta_S(t)=\sin^{-1}[\cos(H(t))\cdot\cos(\delta)\cdot\cos(\Phi)+\sin(\delta)\cdot\sin(\Phi)], \quad \text{(Equation 8)}$$

wherein $\Phi$ is the local latitude. The solar azimuth angle $\phi_S$ as a function of the present local time t can be calculated using the equation:

$$\phi_S=180°\cdot C(t)\cdot\cos^{-1}[X(t)/\cos(\theta_S(t))], \quad \text{(Equation 9)}$$

where $$X(t)=[\cos(H(t))\cdot\cos(\delta)\cdot\sin(\Phi)-\sin(\delta)\cdot\cos(\Phi)], \quad \text{(Equation 10)}$$

and C(t) equals negative one if the present local time t is less than or equal to the solar noon time $t_{SN}$ or one if the present local time t is greater than the solar noon time $t_{SN}$. The solar azimuth angle $\phi_S$ can also be expressed in terms independent of the solar elevation angle $\theta_S$, i.e., $$\phi_S(t)=\tan^{-1}[-\sin(H(t))\cdot\cos(\delta)/Y(t)], \quad \text{(Equation 11)}$$

where $$Y(t)=[\sin(\delta)\cdot\cos(\Phi)-\cos(\delta)\cdot\sin(\Phi)\cdot\cos(H(t))]. \quad \text{(Equation 12)}$$

Thus, the solar elevation angle $\theta_S$ and the solar azimuth angle $\phi_S$ are functions of the local longitude $\lambda$ and latitude $\Phi$ and the present local time t and date (i.e., the present day-number $N_{DAY}$). Using Equations 1 and 2, the sunlight penetration distance can be expressed in terms of the height $h_{WIN}$ of the window 166, the height $h_{WORK}$ of the table 168, the solar elevation angle $\theta_S$, and the solar solar azimuth angle $\phi_S$.

According to the first embodiment of the present invention, the motorized roller shades 120 are controlled such that the sunlight penetration distance $d_{PEN}$ is limited to less than a desired maximum sunlight penetration distance $d_{MAX}$ during all times of the day. For example, the sunlight penetration distance $d_{PEN}$ may be limited such that the sunlight does not shine directly on the table 168 to prevent sun glare on the table. The desired maximum sunlight penetration distance $d_{MAX}$ may be entered, for example, using the GUI software of the PC, and may be stored in the memory in the controller 150. In addition, the user may also use the GUI software of the computer to enter the local longitude $\lambda$ and latitude $\Phi$ of the building, the façade angle $\phi_F$ for each façade 164 of the building, and other related programming information, which may also be stored in the memory of each controller 150.

In order to minimize distractions to an occupant of the space 160 (i.e., due to movements of the motorized roller shades), the controller 150 controls the motorized roller shades 120 to ensure that at least a minimum time period $T_{MIN}$ exists between any two consecutive movements of the motorized roller shades. The minimum time period $T_{MIN}$ that may exist between any two consecutive movements of the motorized roller shades may be entered using the GUI software of the computer and may be also stored in the memory in the controller 150. The user may select different values for the desired maximum sunlight penetration distance $d_{MAX}$ and the minimum time period $T_{MIN}$ between shade movements for different areas and different groups of motorized roller shades 120 in the building.

Figure 4:
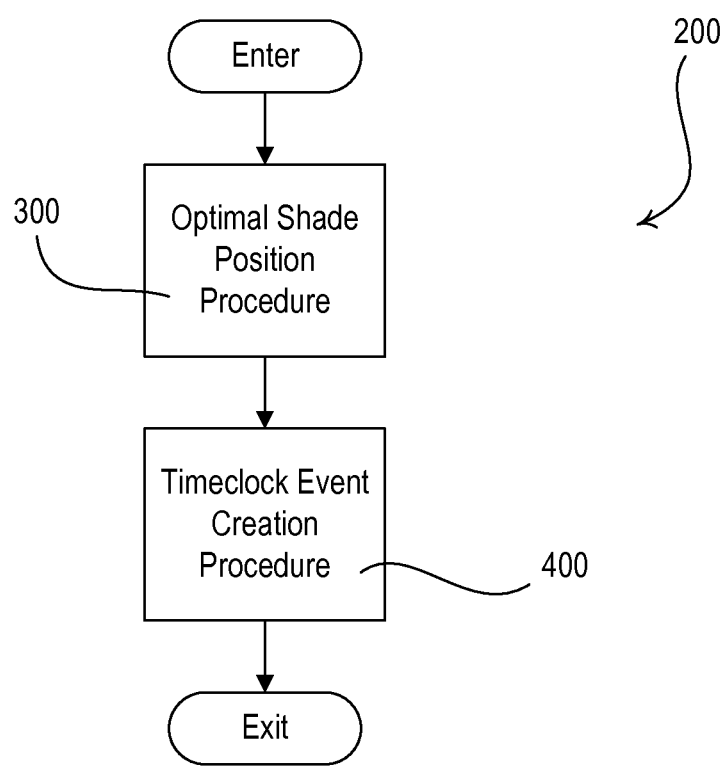
FIG. 4 is a simplified flowchart of a timeclock configuration procedure executed periodically by a controller of the load control system of FIG. 1 according to the first embodiment of the present invention.

FIG. 4 is a simplified flowchart of a timeclock configuration procedure 200 executed periodically by the controller 150 of the load control system 100 to generate a shade timeclock schedule defining the desired operation of the motorized roller shades 120 of each of the façades 164 of the building according to the first embodiment of the present invention. For example, the timeclock configuration procedure 200 may be executed once each day at midnight to generate a new shade timeclock schedule for one or more areas in the building. The shade timeclock schedule is executed between a start time $t_{START}$ and an end time $t_{END}$ of the present day. During the timeclock configuration procedure 200, the controller 150 first performs an optimal shade position procedure 300 for determining optimal shade positions $P_{OPT}(t)$ of the motorized roller shades 120 in response to the desired maximum sunlight penetration distance $d_{MAX}$ for each minute between the start time $t_{START}$ and the end time $t_{END}$ of the present day. The controller 150 then executes a timeclock event creation procedure 400 to generate the events of the shade timeclock schedule in response to the optimal shade positions $P_{OPT}(t)$ and the user-selected minimum time period $T_{MIN}$ between shade movements. The events times of the shade timeclock schedule are spaced apart by multiples of the user-specified minimum time period $T_{MIN}$ between shade movements. Since the user may select different values for the desired maximum sunlight penetration distance $d_{MAX}$ and the minimum time period $T_{MIN}$ between shade movements for different areas and different groups of motorized roller shades 120 in the building, a different shade timeclock schedule may be created and executed for the different areas and different groups of motorized roller shades in the building (i.e., the different façades 164 of the building).

The shade timeclock schedule is split up into a number of consecutive time intervals, each having a length equal to the minimum time period $T_{MIN}$ between shade movements. The controller 150 considers each time interval and determines a position to which the motorized roller shades 120 should be controlled in order to prevent the sunlight penetration distance $d_{PEN}$ from exceeding the desired maximum sunlight penetration distance $d_{MAX}$ during the respective time interval. The controller 150 creates events in the shade timeclock schedule, each having an event time equal to beginning of respective time interval and a corresponding position equal to the position to which the motorized roller shades 120 should be controlled in order to prevent the sunlight penetration distance $d_{PEN}$ from exceeding the desired maximum sunlight penetration distance $d_{MAX}$. However, the controller 150 will not create a timeclock event when the determined position of a specific time interval is equal to the determined position of a preceding time interval (as will be described in greater detail below). Therefore, the event times of the shade timeclock schedule are spaced apart by multiples of the user-specified minimum time period $T_{MIN}$ between shade movements.

Figure 5:
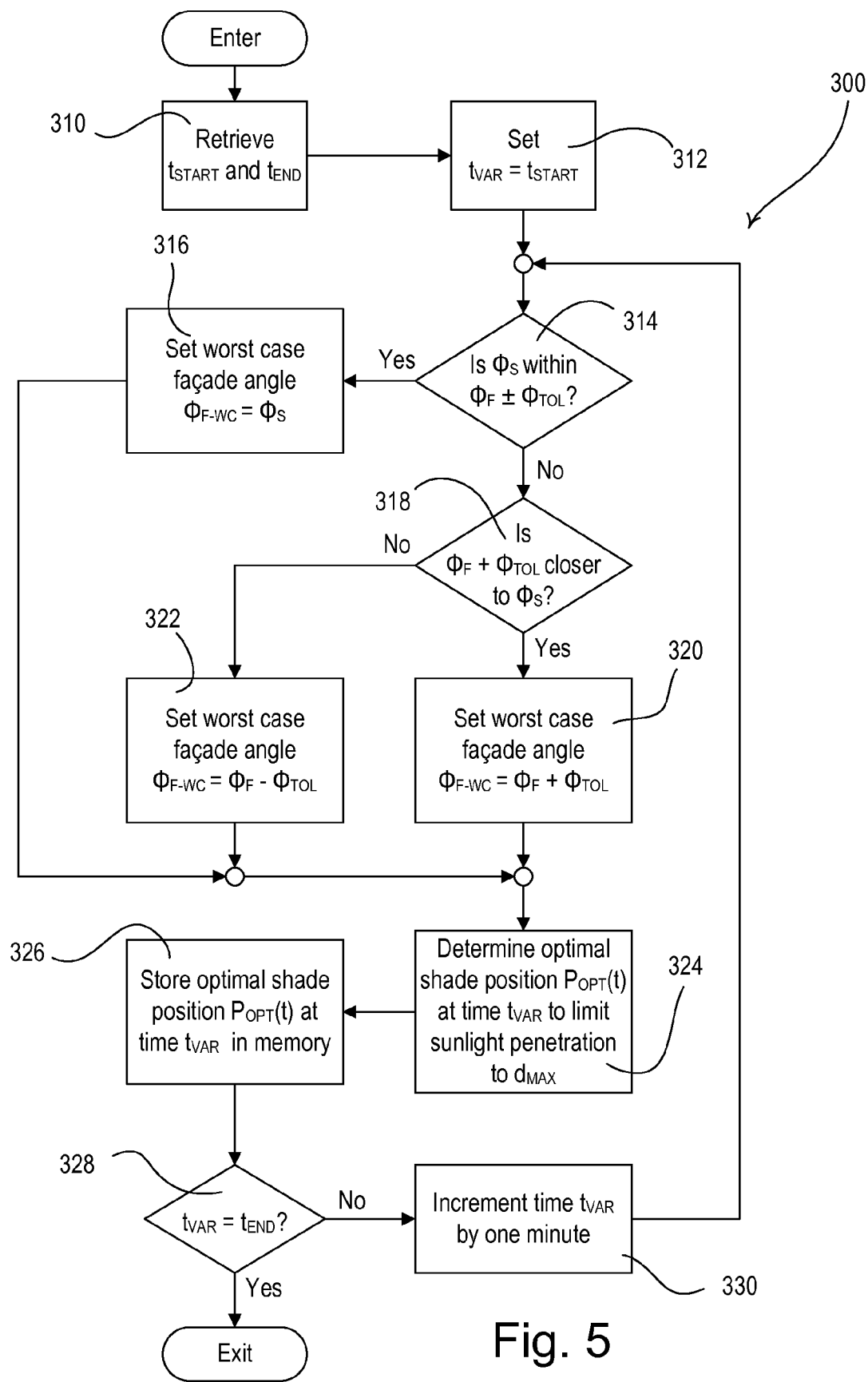
FIG. 5 is a simplified flowchart of an optimal shade position procedure executed by the controller of the load control system of FIG. 1 according to the first embodiment of the present invention.

FIG. 5 is a simplified flowchart of the optimal shade position procedure 300, which is executed by the controller 150 to generate the optimal shade positions $P_{OPT}(t)$ for each minute between the start time $t_{START}$ and the end time $t_{END}$ of the shade timeclock schedule such that the sunlight penetration distance $d_{PEN}$ will not exceed the desired maximum sunlight penetration distance $d_{MAX}$. The controller 150 first retrieves the start time $t_{START}$ and the end time $t_{END}$ of the shade timeclock schedule for the present day at step 310. For example, the controller 150 could use the astronomical timeclock to set the start time $t_{START}$ equal to the sunrise time $t_{SUNRISE}$ for the present day, and the end time $t_{END}$ equal to the sunset time $t_{SUNSET}$ for the present day. Alternatively, the start and end times $t_{START}$, $t_{END}$ could be set to arbitrary times, e.g., 6 A.M. and 6 P.M, respectively.

Next, the controller 150 sets a variable time $t_{VAR}$ equal to the start time $t_{START}$ at step 312 and determines a worst case façade angle $\phi_{F-WC}$ at the variable time $t_{VAR}$ to use when calculating the optimal shade position $P_{OPT}(t)$ at the variable time $t_{VAR}$. Specifically, if the solar azimuth angle $\phi_S$ is within a façade angle tolerance $\phi_{TOL}$ (e.g., approximately 3°) of the fixed façade angle $\phi_F$ at step 314 (i.e., if $\phi_F - \phi_{TOL} \leq \phi_S \leq \phi_F + \phi_{TOL}$), the controller 150 sets the worst case façade angle $\phi_{F-WC}$ equal to the solar azimuth angle $\phi_S$ of the façade 164 at step 315. If the solar azimuth angle $\phi_S$ is not within the façade angle tolerance $\phi_{TOL}$ of the façade angle $\phi_F$ at step 314, the controller 150 then determines if the façade angle $\phi_F$ plus the façade angle tolerance $\phi_{TOL}$ is closer to the solar azimuth angle $\phi_S$ than the façade angle $\phi_F$ minus the façade angle tolerance $\phi_{TOL}$ at step 318. If so, the controller 150 sets the worst case façade angle $\phi_{F-WC}$ equal to the façade angle $\phi_F$ plus the façade angle tolerance $\phi_{TOL}$ at step 320. If the façade angle $\phi_F$ plus the façade angle tolerance $\phi_{TOL}$ is not closer to the solar azimuth angle $\phi_S$ than the façade angle $\phi_F$ minus the façade angle tolerance $\phi_{TOL}$ at step 318, the controller 150 sets the worst case façade angle $\phi_{F-WC}$ equal to the façade angle $\phi_F$ minus the façade angle tolerance $\phi_{TOL}$ at step 322.

At step 324, the controller 150 uses Equations 1-12 shown above and the worst case façade angle $\phi_{F-WC}$ to calculate the optimal shade position $P_{OPT}(t_{VAR})$ that is required in order to limit the sunlight penetration distance $d_{PEN}$ to the desired maximum sunlight penetration distance $d_{MAX}$ at the variable time $t_{VAR}$. At step 326, the controller 150 stores in the memory the optimal shade position $P_{OPT}(t_{VAR})$ determined in step 324. If the variable time $t_{VAR}$ is not equal to the end time $t_{END}$ at step 328, the controller 150 increments the variable time $t_{VAR}$ by one minute at step 330 and determines the worst case façade angle $\phi_{F-WC}$ and the optimal shade position $P_{OPT}(t_{VAR})$ for the new variable time $t_{VAR}$ at step 324. When the variable time $t_{VAR}$ is equal to the end time $t_{END}$ at step 328, the optimal shade position procedure 300 exits.

Figure 6B:
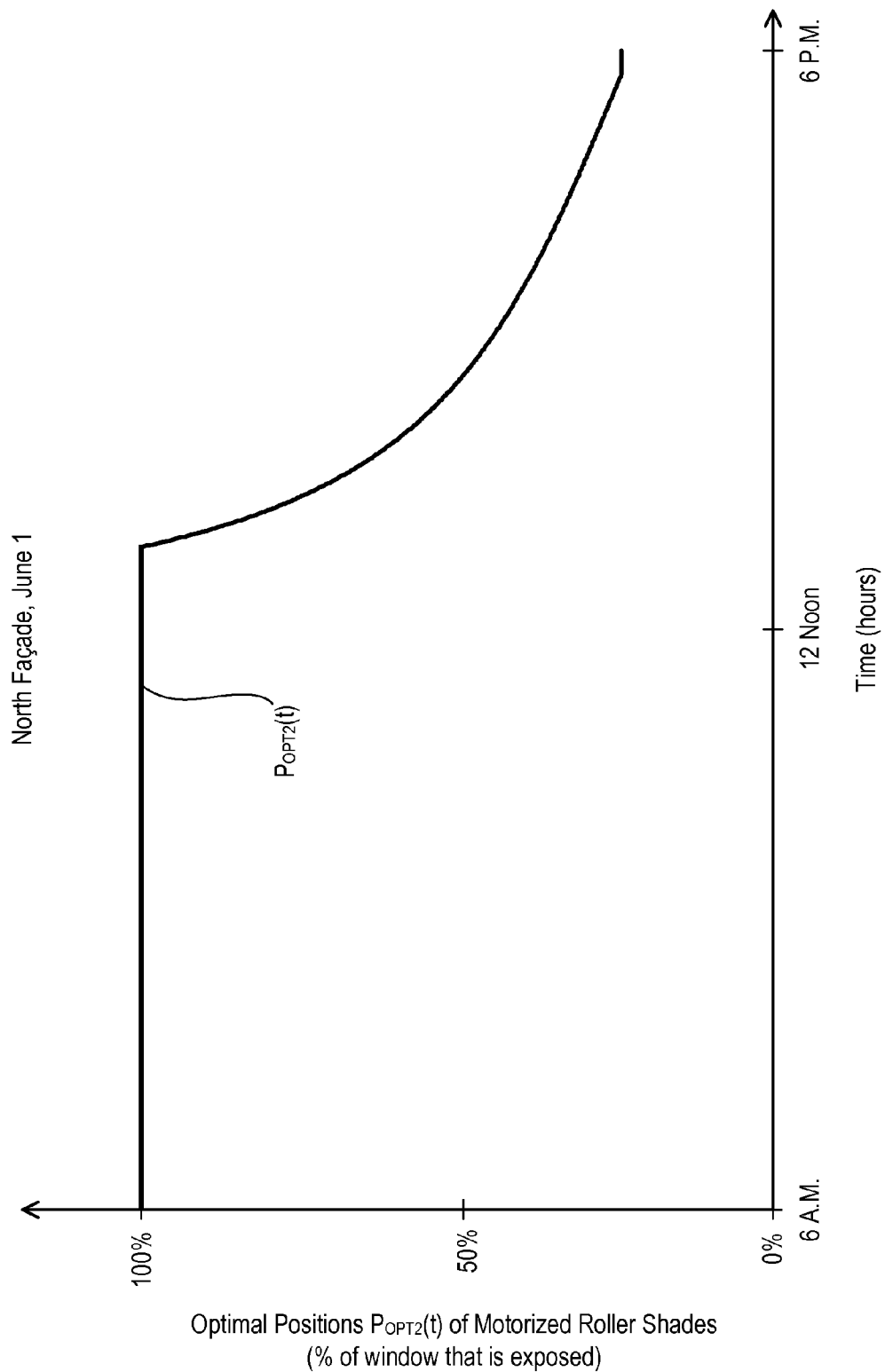
Figure 6C:
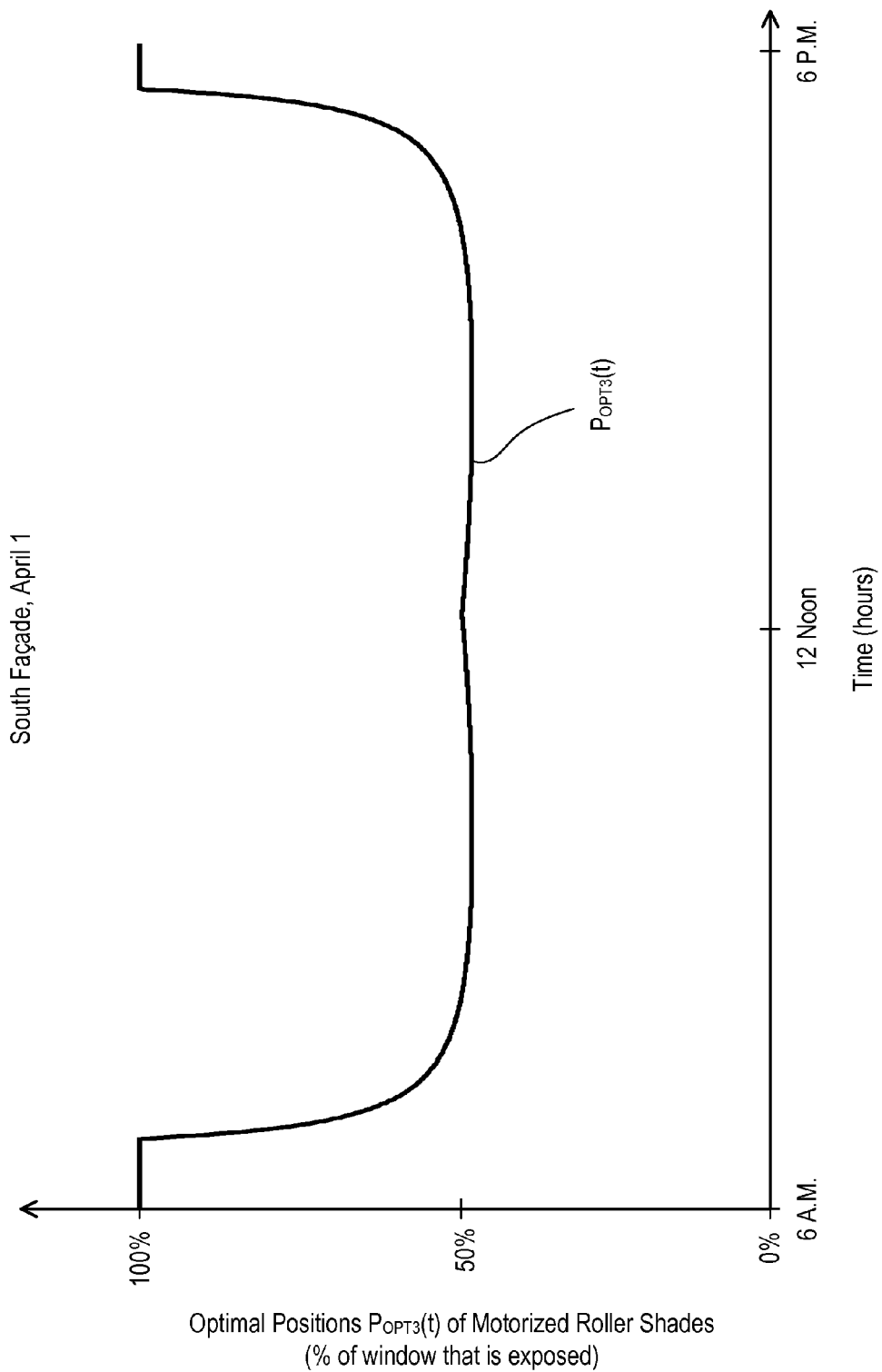

Thus, the controller 150 generates the optimal shade positions $P_{OPT}(t)$ between the start time $t_{START}$ and the end time $t_{END}$ of the shade timeclock schedule using the optimal shade position procedure 300. FIG. 6A shows an example plot of optimal shade positions $P_{OPT1}(t)$ of the motorized roller shades 120 on the west façade of the building on January 1, where the building is located at a longitude $\lambda$ of approximately 75° W and a latitude $\Phi$ of approximately 40° N. FIG. 6B shows an example plot of optimal shade positions $P_{OPT2}(t)$ of the motorized roller shades 120 on the north façade of the building on June 1. FIG. 6C shows an example plot of optimal shade positions $P_{OPT3}(t)$ of the motorized roller shades 120 on the south façade of the building on April 1.

Figure 7:
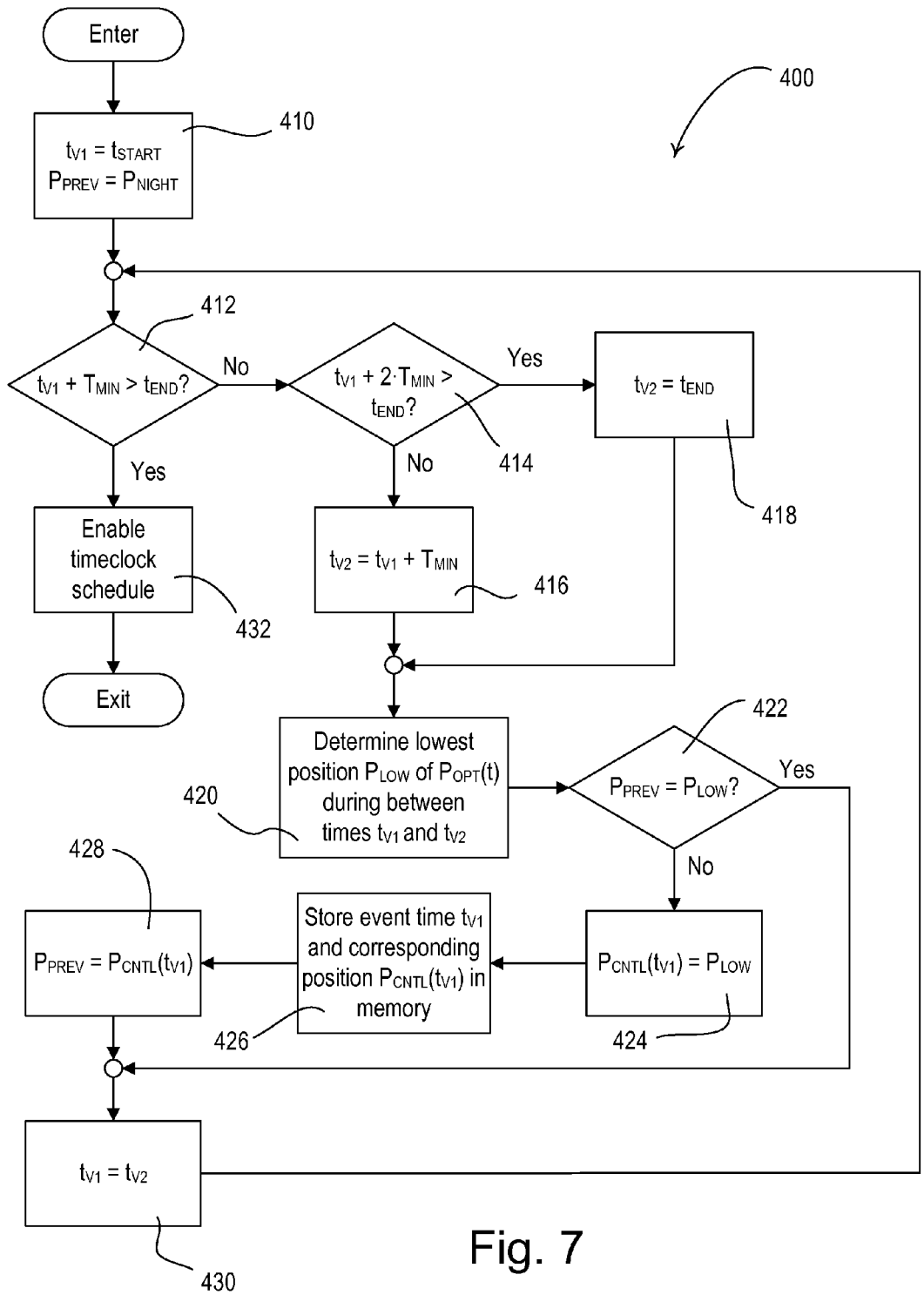
FIG. 7 is a simplified flowchart of a timeclock event creation procedure executed by the controller of the load control system of FIG. 1 according to the first embodiment of the present invention.

FIG. 7 is a simplified flowchart of the timeclock event creation procedure 400, which is executed by the controller 150 in order to generate the events of the shade timeclock schedule according to the first embodiment of the present invention. Since the shade timeclock schedule is split up into a number of consecutive time intervals, the timeclock events of the timeclock schedule are spaced between the start time $t_{START}$ and the end time $t_{END}$ by multiples of the minimum time period $T_{MIN}$ between shade movements, which is selected by the user. During the timeclock event creation procedure 400, the controller 150 generates controlled shade positions $P_{CNTL}(t)$, which comprise a number of discrete events, i.e., step changes in the position of the motorized roller shades at the specific event times. The controller 150 uses the controlled shade positions $P_{CNTL}(t)$ to adjust the position of the motorized roller shades during execution of the shade timeclock schedule. The resulting timeclock schedule includes a number of events, which are each characterized by an event time and a corresponding preset shade position.

The controller 150 uses the controlled shade positions $P_{CNTL}(t)$ to adjust the position of the motorized roller shades 120 during execution of a timeclock execution procedure 900, which will be described in greater detail below with reference to FIG. 13. The timeclock execution procedure 900 is executed by the controller 150 periodically (e.g., once every minute) between the start time $t_{START}$ and the end time $t_{END}$ when the shade timeclock schedule is enabled. The shade timeclock schedule may be disabled, such that the timeclock execution procedure 900 is not executed periodically, when the space 160 is unoccupied or when the controller 150 receives an immediate demand command via the network communication link 156. At the end of the shade timeclock schedule (i.e., at the end time $t_{END}$), the controller 150 controls the position of the motorized roller shades 120 to a nighttime position $P_{NIGHT}$ (e.g., the fully-closed position $P_{FC}$) as will be described in greater detail below with reference to FIG. 13.

Figure 8A:
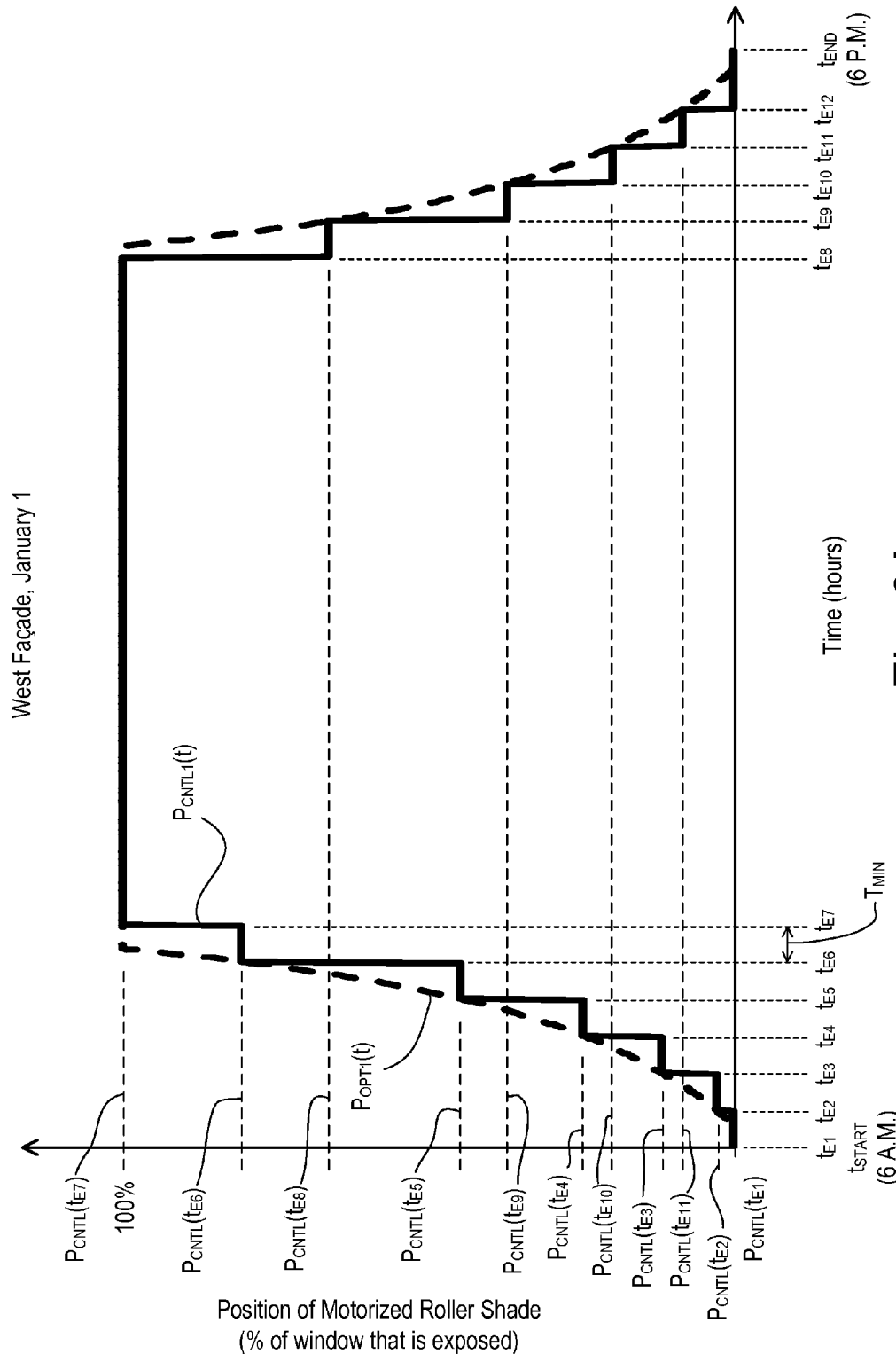
FIGS. 8A-8C show example plots of controlled shade positions of the motorized roller shades of the load control system of FIG. 1 on different facades of the building during different days of the year according to the first embodiment of the present invention.
Figure 8B:
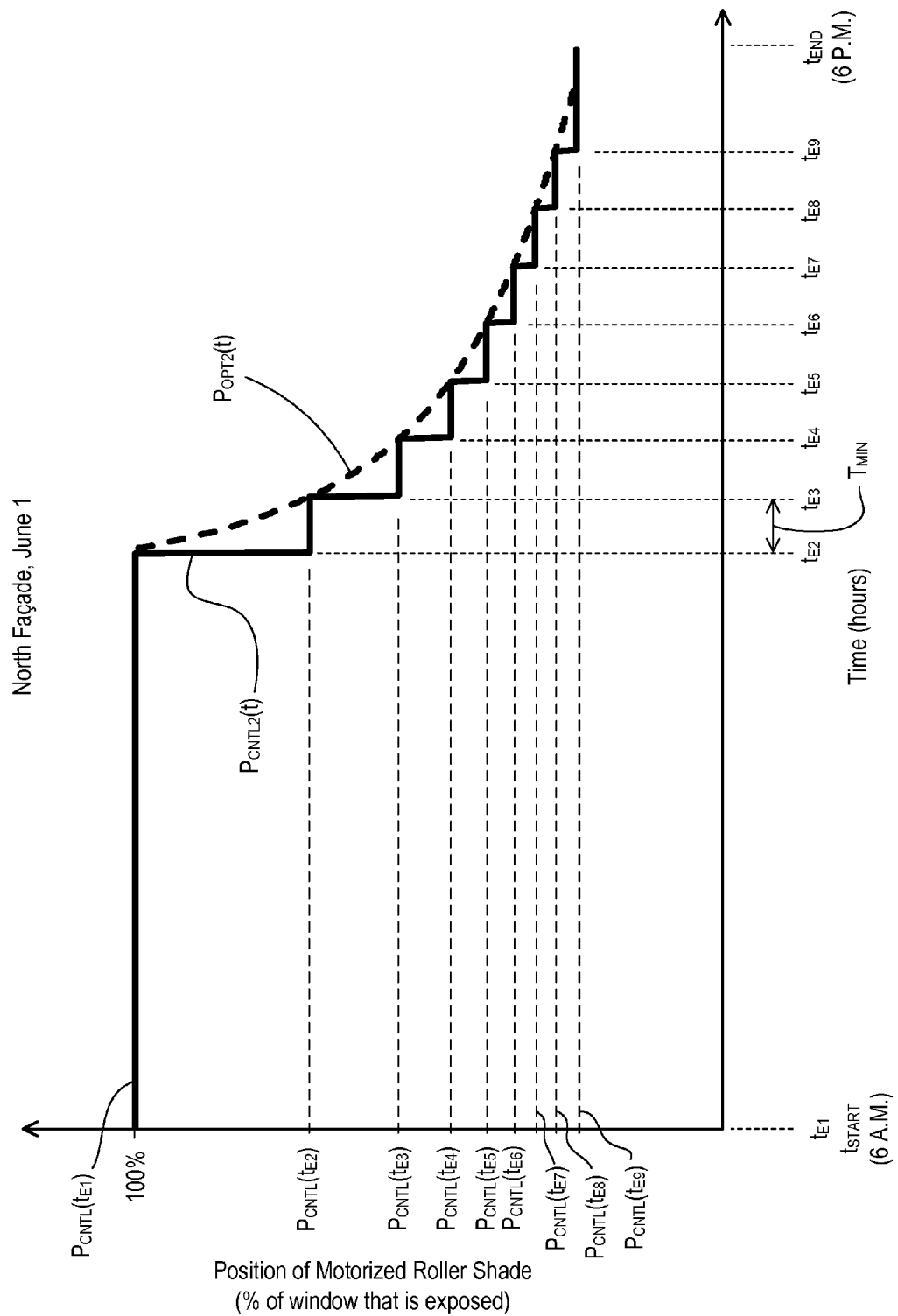
Figure 8C:
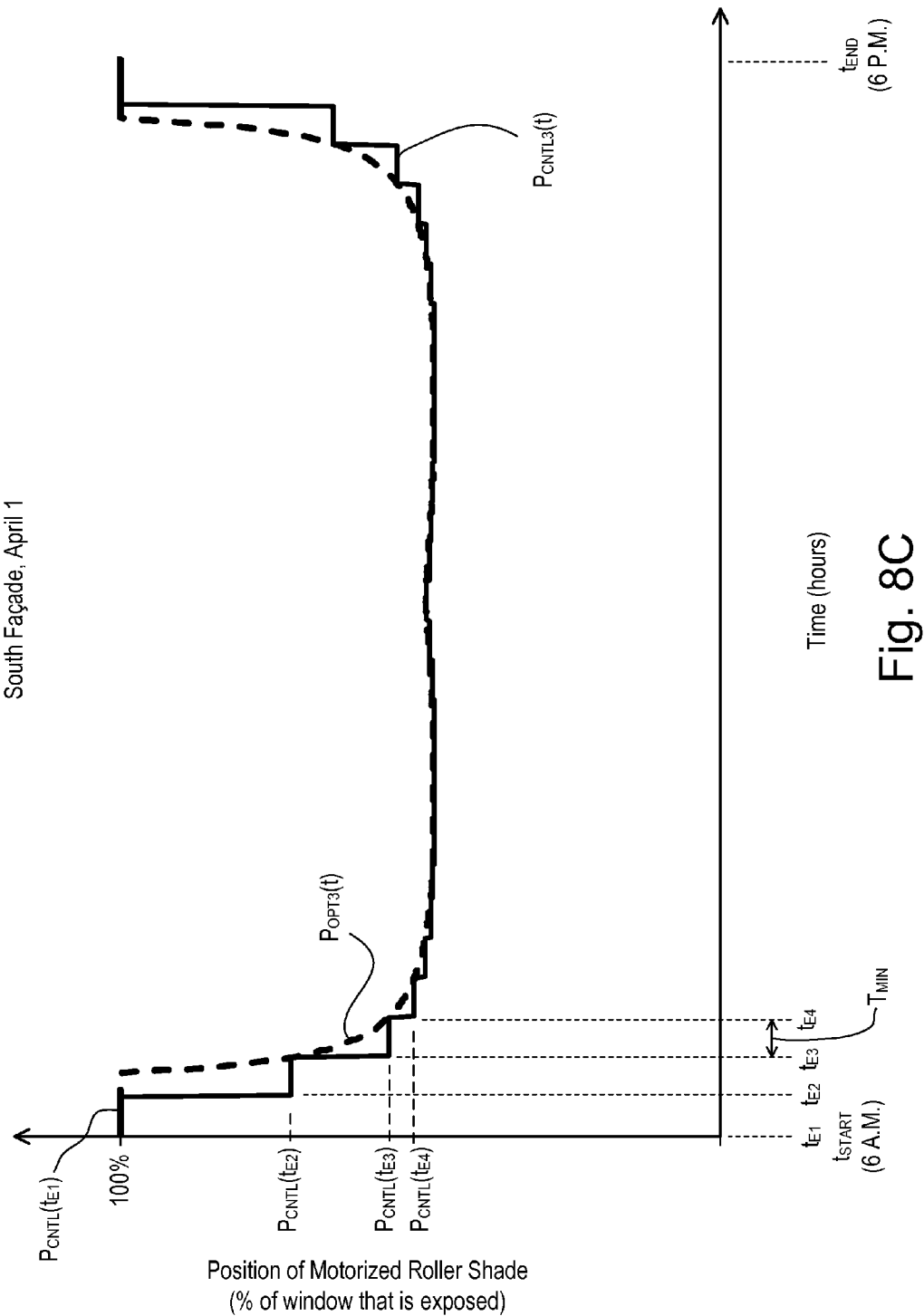

FIG. 8A shows an example plot of controlled shade positions $P_{CNTL1}(t)$ of the motorized roller shades 120 on the west façade of the building on January 1 according to the first embodiment of the present invention. FIG. 8B shows an example plot of controlled shade positions $P_{CNTL2}(t)$ of the motorized roller shades 120 on the north façade of the building on June 1 according to the first embodiment of the present invention. FIG. 8C shows an example plot of controlled shade positions $P_{CNTL3}(t)$ of the motorized roller shades 120 on the south façade of the building on April 1 according to the first embodiment of the present invention.

The controller 150 examines the values of the optimal shade positions $P_{OPT}(t)$ during each of the time intervals of the shade timeclock schedule (i.e., the time periods between two consecutive timeclock events) to determine a lowest shade position $P_{LOW}$ during each of the time intervals. During the timeclock event creation procedure 400, the controller 150 uses two variable times $t_{V1}$, $t_{V2}$ to define the endpoints of the time interval that the controller is presently examining. The controller 150 uses the variable times $t_{V1}$, $t_{V2}$ to sequentially step through the events of the shade timeclock schedule, which are spaced apart by the minimum time period $T_{MIN}$ according to the first embodiment of the present invention. The lowest shade positions $P_{LOW}$ during the respective time intervals becomes the controlled shade positions $P_{CNTL}(t)$ of the timeclock events, which have event times equal to the beginning of the respective time interval (i.e., the first variable time $t_{V1}$).

Referring to FIG. 7, the controller 150 sets the first variable time $t_{V1}$ equal to the start time $t_{START}$ of the shade timeclock schedule at step 410. The controller 150 also initializes a previous shade position $P_{PREV}$ to the nighttime position $P_{NIGHT}$ at step 610. If there is enough time left before the end time $t_{END}$ for the present timeclock event (i.e., if the first variable time $t_{V1}$ plus the minimum time period $T_{MIN}$ is not greater than the end time $t_{END}$) at step 412, the controller 150 determines at step 414 if there is enough time for another timeclock event in the shade timeclock schedule after the present timeclock event. If the first variable time $t_{V1}$ plus two times the minimum time period $T_{MIN}$ is not greater than the end time $t_{END}$ at step 414, the controller 150 sets the second variable time $t_{V2}$ equal to the first variable time $t_{V1}$ plus the minimum time period $T_{MIN}$ at step 416, such that the controller 150 will then examine the time interval between the first and second variable times $t_{V1}$, $t_{V2}$. If the first variable time $t_{V1}$ plus two times the minimum time period $T_{MIN}$ is greater than the end time $t_{END}$ at step 414, the controller 150 sets the second variable time $t_{V2}$ equal to the end time $t_{END}$ at step 418, such that the controller 150 will then examine the time interval between the first variable time $t_{V1}$ and the end time $t_{END}$.

At step 420, the controller 150 determines the lowest shade position $P_{LOW}$ of the optimal shade positions $P_{OPT}(t)$ during the present time interval (i.e., between the first variable time $t_{V1}$ and the second variable time $t_{V2}$ determined at steps 416 and 418). If, at step 422, the previous shade position $P_{PREV}$ is not equal to the lowest shade position $P_{LOW}$ during the present time interval (as determined at step 420), the controller 150 sets the controlled shade position $P_{CNTL}(t_{V1})$ at the first variable time $t_{V1}$ to be equal to the lowest shade position $P_{LOW}$ of the optimal shade positions $P_{OPT}(t)$ during the present time interval at step 424. The controller 150 then stores in memory a timeclock event having the event time $t_{V1}$ and the corresponding controlled position $P_{CNTL}(t_{V1})$ at step 426 and sets the previous shade position $P_{PREV}$ equal to the new controlled position $P_{CNTL}(t_{V1})$ at step 428. If, at step 422, the previous shade position $P_{PREV}$ is equal to the lowest shade position $P_{LOW}$ during the present time interval, the controller 150 does not create a timeclock event at the first variable time $t_{V1}$. The controller 150 then begins to examine the next time interval by setting the first variable time $t_{V1}$ equal to the second variable time $t_{V2}$ at step 430. The timeclock event creation procedure 400 loops around such that the controller 150 determines if there is enough time left before the end time $t_{END}$ for the present timeclock event at step 412. If the first variable time $t_{V1}$ plus the minimum time period $T_{MIN}$ is greater than the end time $t_{END}$ at step 412, the controller enables the shade timeclock schedule at step 432 and the timeclock event creation procedure 400 exits.

Figure 9:
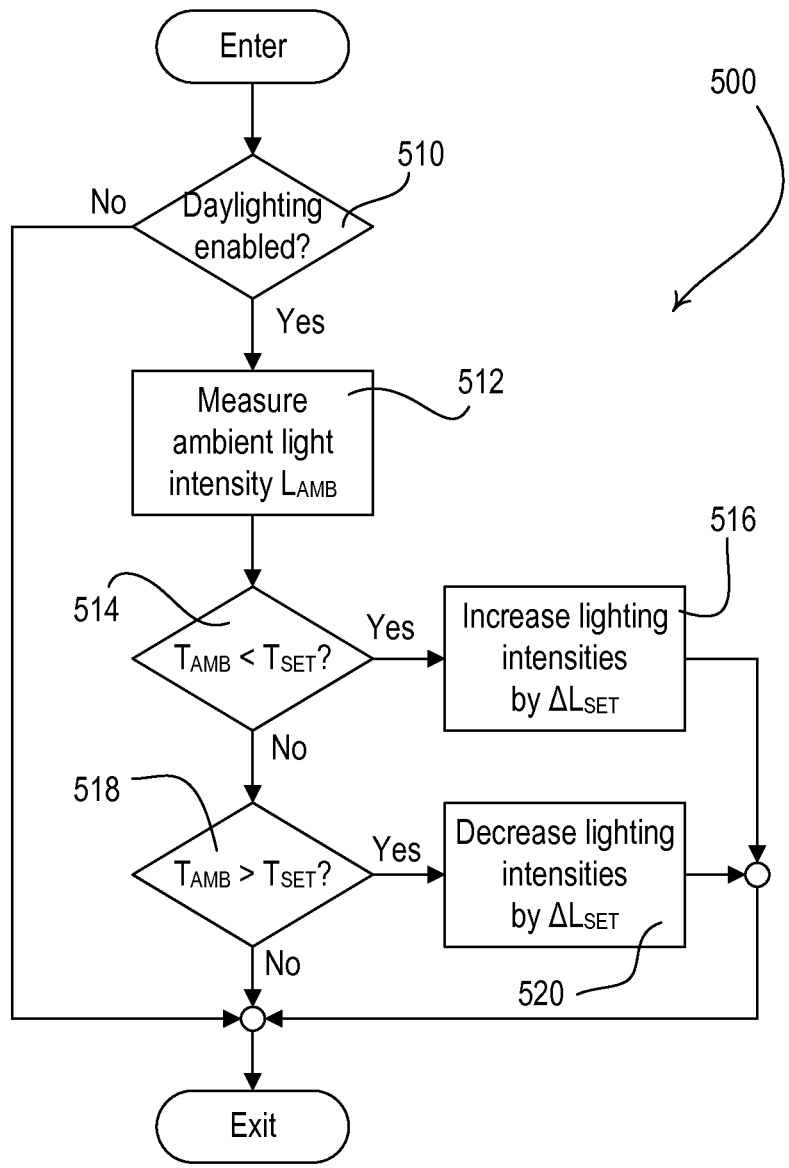
FIG. 9 is a simplified flowchart of a daylighting procedure executed periodically by the controller of the load control system of FIG. 1 when daylighting is enabled.

FIG. 9 is a simplified flowchart of a daylighting procedure 500, which is executed periodically by the controller 150 (e.g., once every second) when daylighting (i.e., control of the lighting loads 112 in response to the ambient light intensity $L_{AMB}$ measured by the daylight sensor 154) is enabled at step 510. When daylighting is not enabled at step 510, the daylighting procedure 500 simply exits. When daylighting is enabled at step 510, the controller 150 causes the daylight sensor 154 to measure the ambient light intensity $L_{AMB}$ at step 512. If the measured ambient light intensity $L_{AMB}$ is less than a setpoint (i.e., target) intensity $L_{SET}$ at step 514, the controller 150 controls the lighting control device 110 to increase the present lighting intensity $L_{PRES}$ of each of the lighting loads 112 by a predetermined percentage $\Delta L_{SET}$ (e.g., approximately 1%) at step 516 and the daylighting procedure 500 exits. If the measured ambient light intensity $L_{AMB}$ is greater than the setpoint intensity $L_{SET}$ at step 518, the controller 150 decreases the present lighting intensity $L_{PRES}$ of each of the lighting loads 112 by the predetermined percentage $\Delta L_{SET}$ at step 520 and the daylighting procedure 500 exits. If the measured ambient light intensity $L_{AMB}$ is not less than the setpoint intensity $L_{SET}$ at step 514 and is not greater than the setpoint intensity $L_{SET}$ at step 518 (i.e., the ambient light intensity $L_{AMB}$ is equal to the setpoint intensity $L_{SET}$), the daylighting procedure 500 simply exits without adjusting the present lighting intensity $L_{PRES}$ of each of the lighting loads 112.

Figure 10A:
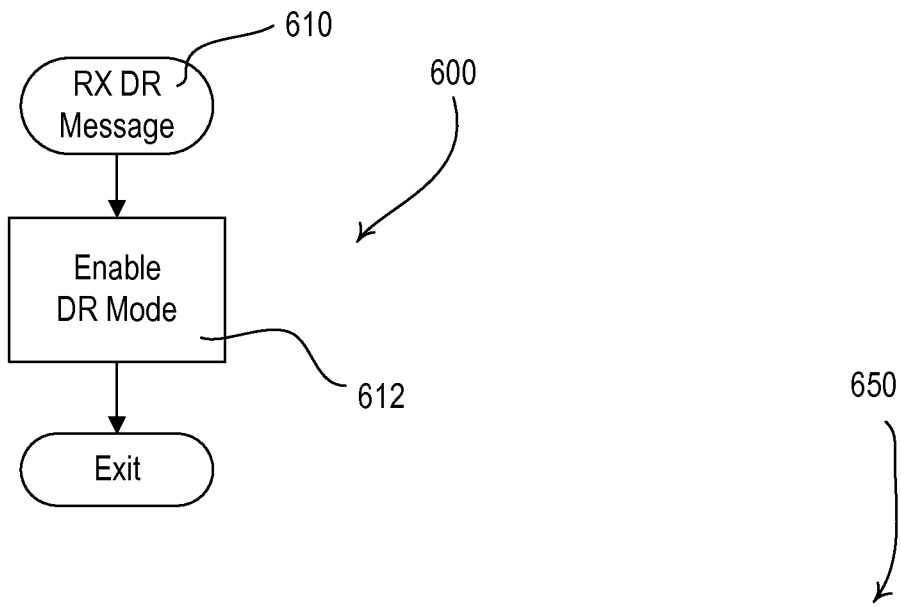
FIG. 10A is a simplified flowchart of a demand response message procedure executed by the controller of the load control system of FIG. 1 according to the first embodiment of the present invention.

FIG. 10A is a simplified flowchart of a demand response message procedure 600, which is executed by the controller 150 in response to receiving an immediate demand response command via the network communication link 156 at step 610. Whenever an immediate demand response command is received at step 610, the controller 150 simply enables a demand response (DR) mode at step 612, before the demand response message procedure 600 exits.

Figure 10B:
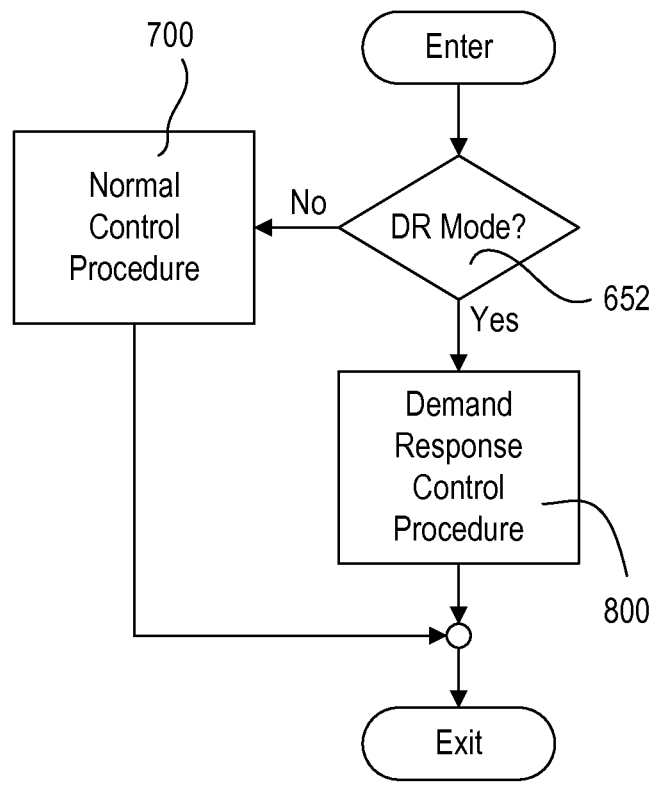
FIG. 10B is a simplified flowchart of a load control procedure executed periodically by the controller of the load control system of FIG. 1 according to the first embodiment of the present invention.

FIG. 10B is a simplified flowchart of a load control procedure 650, which is executed by the controller 150 periodically, e.g., every minute. If the demand response mode is not enabled at step 652, the controller 150 executes a normal control procedure 700 for controlling the lighting control devices 110, the motorized roller shades 120, the temperature control devices 130, and the controllable electrical receptacles 140 during a normal mode of operation, e.g., to maximize the comfort of the occupants of the spaces 160 of the building. On the other hand, if the demand response mode is enabled at step 652 (i.e., in response to receiving an immediate demand response command during the demand response message procedure 600), the controller 150 executes a demand response control procedure 800 for controlling the lighting control devices 110, the motorized roller shades 120, the temperature control devices 130, and the controllable electrical receptacles 140 to decrease the energy consumption of the load control system 100, while maintaining the comfort of the occupants of the spaces 160 of the building at acceptable levels. During the normal control procedure 700 and the demand response command procedure 800, the controller 150 controls the lighting control devices 110, the motorized roller shades 120, the temperature control devices 130, and the controllable electrical receptacles 140 in the different spaces 160 (or areas) of the building on an area-by-area basis. For example, the controller 150 may control the lighting control devices 110, the motorized roller shades 120, the temperature control device 130, and the controllable electrical receptacles 140 in a specific area differently depending upon whether the area is occupied or not.

FIG. 11 is a simplified flowchart of the normal control procedure 700 executed periodically by the controller 150 when the controller is operating in the normal mode of operation (i.e., every minute). If the area is occupied at step 710, the controller 150 transmits at step 712 one or more digital messages to the lighting control devices 110 so as to adjust the intensities of the lighting loads 112 to the user-specified desired lighting intensity levels $L_{DES}$ (e.g., as determined in response to actuations of the first set of buttons 114 of the lighting control devices 110). At step 714, the controller 150 transmits digital messages to the controllable electrical receptacles 140 to supply power to all of the plug-in electrical loads 142 in the area. Next, the controller 150 transmits a digital message to the temperature control device 130 at step 715 to control the setpoint temperature $T_{SET}$ to the user-specified desired temperature $T_{DES}$ (e.g., as determined in response to actuations of the raise and lower temperature buttons 136, 138 of the temperature control device 130). Finally, the controller 150 enables the shade timeclock schedule (as created during the timeclock event creation procedure 400) at step 716, and the normal control procedure 700 exits. Accordingly, shortly after the normal control procedure 700 exits, the timeclock execution procedure 900 will be executed in order to adjust the positions of the motorized roller shades 120 to the controlled positions $P_{CNTL}(t)$ determined in the timeclock event creation procedure 400. In addition, the timeclock execution procedure 900 will be executed periodically until the shade timeclock schedule is disabled.

If the area is unoccupied at step 710, the controller 150 turns off the lighting load 112 in the area at step 718 and turns off designated (i.e., some) plug-in electrical loads 142 at step 720. For example, the designated plug-in electrical loads 142 that are turned off in step 720 may comprise table lamps, floor lamps, printers, fax machines, water heaters, water coolers, and coffee makers. However, other non-designated plug-in electrical loads 142 are not turned off in step 720, such as, personal computers, which remain powered even when the area is unoccupied. If the HVAC system 132 is presently cooling the building at step 722, the controller 150 increases the setpoint temperature $T_{SET}$ of the temperature control device 130 by a predetermined setback temperature $T_{NRM\_COOL}$ (e.g., approximately 2° F.) at step 724, such that the setpoint temperature $T_{SET}$ is controlled to a new setpoint temperature $T_{NEW}$, i.e., $$T_{NEW}=T_{SET}+T_{NRM\_COOL}. \quad \text{(Equation 13)}$$

The HVAC system 132 thus consumes less power when the area is unoccupied and the setpoint temperature $T_{SET}$ is increased to the new setpoint temperature $T_{NEW}$.

The controller 150 then transmits digital messages to the electronic drive units 126 of the motorized roller shades 120 to move all of the shade fabrics 122 to the fully-closed positions at step 726. The controller 150 also disables the shade timeclock schedule at step 726, before the normal control procedure 700 exits. Since the shade fabrics 122 will be completely covering the windows, the shade fabrics will block daylight from entering the building and thus the shade fabrics prevent daylight from heating the building. Accordingly, the HVAC system 132 will consume less power when the motorized roller shades 120 are closed.

If the HVAC system 132 is presently heating the building at step 722, the controller 150 decreases the setpoint temperature $T_{SET}$ of the temperature control device 130 by a predetermined setback temperature $T_{NRM\_HEAT}$ (e.g., approximately 2° F.) at step 728, such that the setpoint temperature $T_{SET}$ is controlled to the new setpoint temperature $T_{NEW}$, i.e., $$T_{NEW}=T_{SET}-T_{NRM\_HEAT}. \quad \text{(Equation 14)}$$

Thus, the HVAC system 132 consumes less power when the area is unoccupied and the setpoint temperature $T_{SET}$ is decreased to the new setpoint temperature $T_{NEW}$ during the winter months.

Before adjusting the positions of the motorized roller shades 120, the controller 150 first determines at step 730 if the façade 164 of the windows in the area may be receiving direct sunlight, e.g., using the Equations 1-12 shown above. If the façade 164 of the area is not receiving direct sunlight at step 730, the controller 150 causes the electronic drive units 126 of the motorized roller shades 120 to move all of the shade fabrics 122 to the fully-closed positions and disables the shade timeclock schedule at step 732, such that the shade fabrics provide additional insulation for the building. Accordingly, the shade fabrics 122 will prevent some heat loss leaving the building and the HVAC system 132 may consume less power. However, if the façade 164 of the area may be receiving direct sunlight at step 730, the controller 150 controls the motorized roller shade 120 to the fully-open positions disables the shade timeclock schedule at step 734 in order to take advantage of the potential heat gain through the windows due to the direct sunlight. Rather than using the Equations 1-12 shown above to calculate whether the window may or may not be receiving direct sunlight, the load control system 100 may alternatively comprise one or more photosensors mounted adjacent the windows in the space to determine if the window is receiving direct sunlight.

Figure 12B:
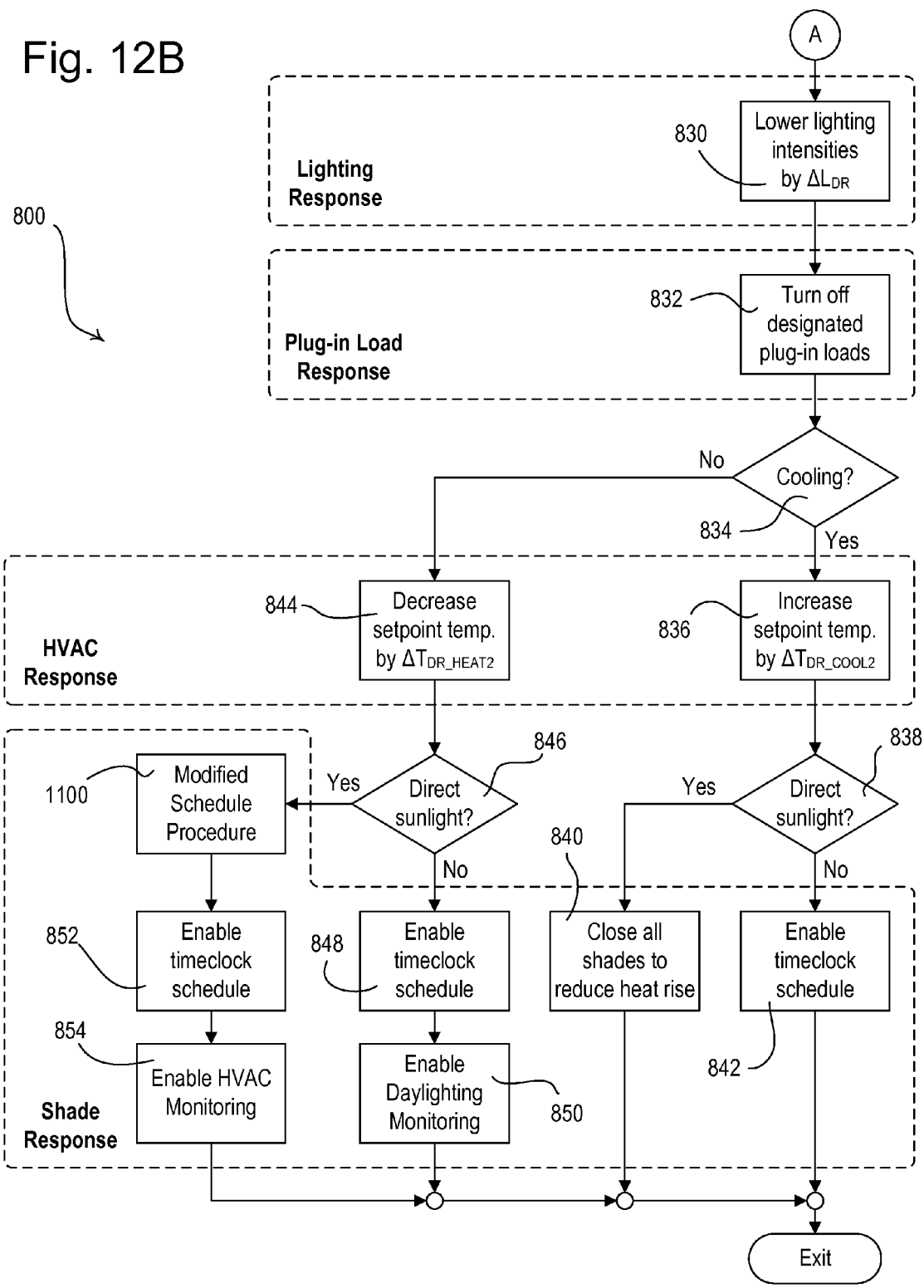

FIGS. 12A and 12B are simplified flowcharts of the demand response control procedure 800 executed periodically by the controller 150 when the controller is operating in the demand response mode of operation (i.e., once every minute after a demand response command is received). If the area is not occupied at step 810, the controller 150 turns off the lighting loads 112 in the area at step 812 and turns off the designated plug-in electrical loads 142 at step 814. If the HVAC system 132 is presently cooling the building at step 816, the controller 150 increases the setpoint temperature $T_{SET}$ of each of the temperature control devices 130 by a predetermined setback temperature $T_{DR\_COOL1}$ (e.g., approximately 3° F.) at step 818. The controller 150 then controls the motorized roller shades 120 to the fully-closed positions and disables the shade timeclock schedule at step 820, such that the HVAC system 132 will consume less power.

If the HVAC system 132 is presently heating the building at step 816, the controller 150 decreases the setpoint temperatures $T_{SET}$ of each of the temperature control devices 130 by a predetermined setback temperature $T_{DR\_HEAT1}$ (e.g., approximately 3° F.) at step 822. If the façade 164 of the area is not receiving direct sunlight at step 824, the controller 150 moves all of the motorized roller shades 120 to the fully-closed positions to provide additional insulation for the building and disables the shade timeclock schedule at step 826, such that the HVAC system 132 will consume less power. If the façade 164 of the area may be receiving direct sunlight at step 824, the controller 150 controls the motorized roller shade 120 to the fully-open positions at step 828 in order to take advantage of the potential heat gain through the windows due to the direct sunlight. The controller 150 also disables the shade timeclock schedule at step 828, before the demand response control procedure 800 exits.

Referring to FIG. 12B, if the area is occupied at step 810, the controller 150 transmits at step 830 one or more digital messages to the lighting control devices 110 to lower the present lighting intensities $L_{PRES}$ of each of the lighting loads 112 by a predetermined percentage $\Delta L_{DR}$ (e.g., by approximately 20% of the present lighting intensity $L_{PRES}$). The lighting control device 110 fades the present lighting intensity $L_{PRES}$ of each of the lighting loads 112 over a first fade time period (e.g., approximately thirty seconds) to a new lighting intensity $L_{NEW}$, i.e., $$L_{NEW} = \Delta L_{DR} \cdot L_{PRES}. \quad \text{(Equation 15)}$$

Accordingly, when operating at the new reduced lighting intensities $L_{NEW}$, the lighting loads 112 consume less power. Alternatively, the controller 150 may decrease the setpoint light intensity $L_{SET}$ of the space 160 by a predetermined percentage $\Delta L_{SET-DR}$ at step 830.

Next, the controller 150 turns off the designated plug-in electrical loads 142 at step 832. If the HVAC system 132 is presently cooling the building at step 834, the controller 150 increases the setpoint temperatures $T_{SET}$ of each of the temperature control devices 130 by a predetermined setback temperature $T_{DR\_COOL2}$ (e.g., approximately 2° F.) at step 836. If the façade 164 of the area may be receiving direct sunlight at step 838, the controller 150 controls the motorized roller shade 120 to the fully-closed positions at step 840 in order to reduce heat rise in the area. If the façade 164 of the area is not receiving direct sunlight at step 838, the controller 150 enables the shade timeclock schedule at step 842, such that the timeclock execution procedure 900 will be executed periodically to adjust the positions of the motorized roller shades 120 to the controlled positions $P_{CNTL}(t)$ after the demand response control procedure 800 exits.

If the HVAC system 132 is presently heating the building at step 834, the controller 150 decreases the setpoint temperatures $T_{SET}$ of each of the temperature control devices 130 by a predetermined setback temperature $T_{DR\_HEAT2}$ (e.g., approximately 2° F.) at step 844. If the façade 164 of the area is not receiving direct sunlight at step 846, the controller 150 enables the shade timeclock schedule at step 848, such that the timeclock execution procedure 900 will be executed to control the positions of the motorized roller shades 120 to the controlled positions $P_{CNTL}(t)$ after the demand response control procedure 800 exits. The controller 150 then enables daylighting monitoring (DM) at step 850 by initializing a daylighting monitoring (DM) timer (e.g., to approximately one minute) and starting the timer decreasing in value with respect to time. When the daylighting monitoring timer expires, the controller 150 will execute a daylighting monitoring (DM) procedure 1000 if the daylighting procedure 500 (as shown in FIG. 9) is causing the load control system 100 to save energy. Specifically, the controller 150 determines if providing daylight in the area by controlling the motorized roller shades 120 to the controlled positions $P_{CNTL}(t)$ of the timeclock schedule has resulted in energy savings in the amount of energy consumed by the lighting loads 112 (as compared to the energy consumed by the lighting loads when the motorized roller shades are fully closed). The daylighting monitoring timer is initialized to an amount of time that is appropriate to allow the lighting control devices 110 to adjust the intensities of the lighting loads 112 in response to the ambient light intensity $L_{AMB}$ measured by the daylight sensor 154. The daylighting monitoring procedure 1000 will be described in greater detail below with reference to FIG. 14.

If the façade 164 of the area may be receiving direct sunlight at step 846, the controller 150 executes a modified schedule procedure 1100 (which will be described in greater detail below with reference to FIG. 15A) to temporarily increase the desired maximum sunlight penetration distance $d_{MAX}$ by a predetermined amount $\Delta d_{MAX}$ (e.g., by approximately 50%) and to generate a modified timeclock schedule at the modified maximum sunlight penetration distance $d_{MAX}$. The controller 150 then enables the shade timeclock schedule at step 852, such that the controller will adjust the positions of the motorized roller shades 120 to the modified controlled positions $P_{CNTL}(t)$ as determined during the modified schedule procedure 1100 when the timeclock execution procedure 900 is executed after the demand response control procedure 800 exits. Since the desired maximum sunlight penetration $d_{MAX}$ has been increased, the sunlight will penetrate deeper into the space 160 using the modified controlled positions $P_{CNTL}(t)$ determined during the modified schedule procedure 1100.

Referring back to FIG. 12B, after executing the modified schedule procedure 1100, the controller 150 enables HVAC monitoring at step 854 by initializing an HVAC monitoring timer (e.g., to approximately one hour) and starting the timer decreasing in value with respect to time. When the HVAC monitoring timer expires, the controller 150 will execute an HVAC monitoring procedure 1150 to determine if the modified controlled positions $P_{CNTL}(t)$ of the motorized roller shades 120 have resulted in energy savings in the amount of energy consumed by the HVAC system 132. The HVAC monitoring procedure 1150 will be described in greater detail below with reference to FIG. 15B. After enabling HVAC monitoring at step 854, the demand response control procedure 800 exits.

As previously mentioned, the load control procedure 650 is executed periodically by the controller 150. During the first execution of the load control procedure 650 after a change in state of the load control system 100 (e.g., in response to receiving a demand response command, detecting an occupancy or vacancy condition, or determining that one of the façades 164 may be receiving direct sunlight or not), the controller 150 is operable to lower the lighting intensities of the lighting loads 112 by the predetermined percentage $\Delta L_{DR}$ (e.g., at step 830) or to adjust the setpoint temperatures $T_{SET}$ of the temperature control devices 130 by predetermined amounts (e.g., at steps 724, 728, 818, 822, 836, 844). However, during subsequent executions of the load control procedure 650, the controller 150 does not continue lowering the lighting intensity of the lighting loads 112 by the predetermined percentage $\Delta L_{DR}$ (at step 830), or adjusting the setpoint temperatures $T_{SET}$ by predetermined amounts (at steps 724, 728, 818, 822, 836, 844). In addition, the controller 150 only executes the modified schedule procedure 1100 and enables daylighting monitoring (at step 850) or HVAC monitoring (at step 854) the first time that the load control procedure 650 is executed after a change in state of the load control system 100.

Figure 13:
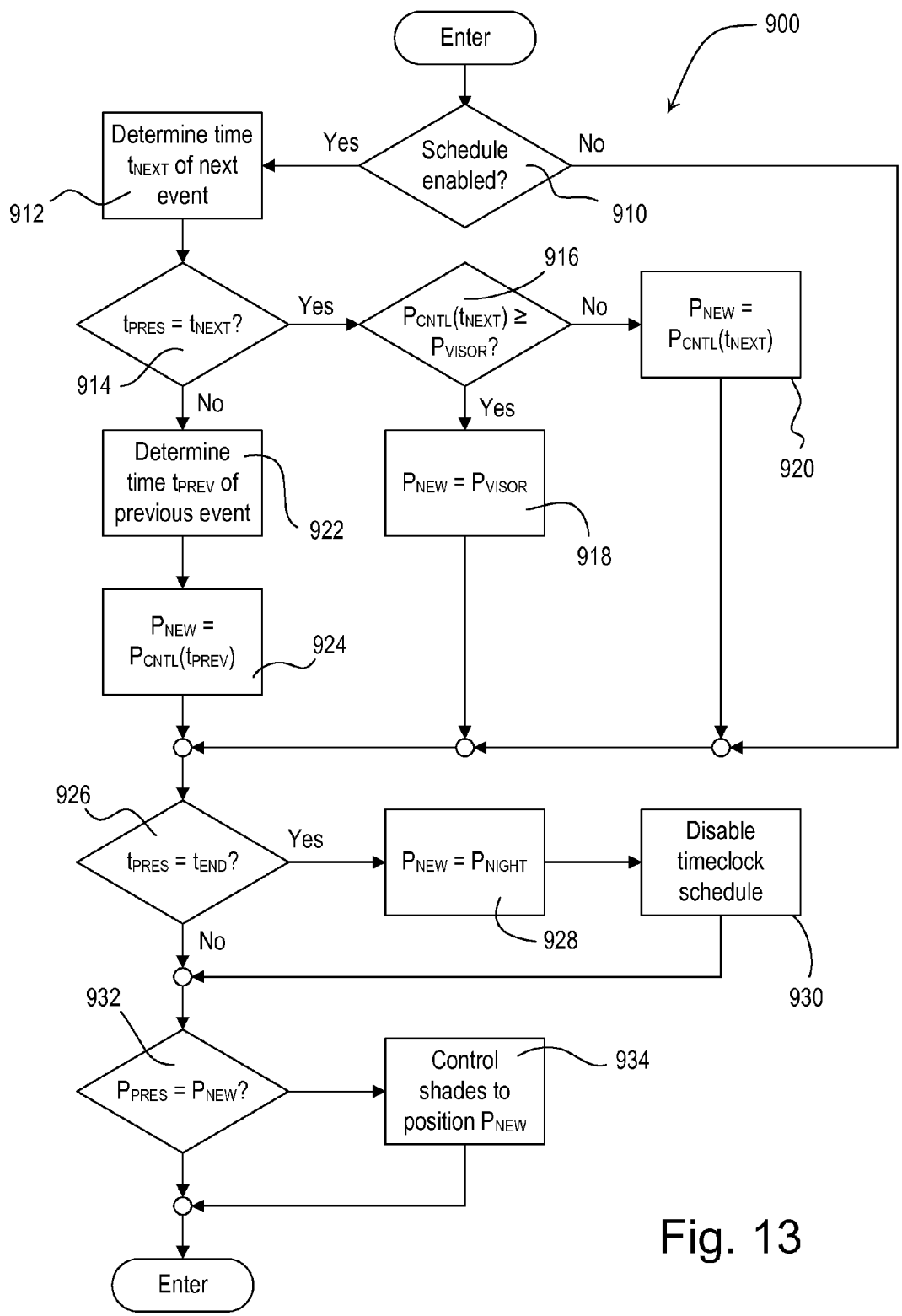
FIG. 13 is a simplified flowchart of a timeclock execution procedure executed periodically by the controller of the load control system of FIG. 1 according to the first embodiment of the present invention.

FIG. 13 is a simplified flowchart of the timeclock execution procedure 900, which is executed by the controller 150 periodically, i.e., every minute between the start time $t_{START}$ and the end time $t_{END}$ of the shade timeclock schedule. Since there may be multiple timeclock schedules for the motorized roller shades 120, the controller 150 may execute the timeclock execution procedure 900 multiple times, e.g., once for each shade timeclock schedule. During the timeclock execution procedure 900, the controller 150 adjusts the positions of the motorized roller shades 120 to the controlled positions $P_{CNTL}$(t) determined in the timeclock event creation procedure 400 (or alternatively the modified controlled positions $P_{CNTL}$(t) determined in the modified schedule procedure 1100).

In some cases, when the controller 150 controls the motorized roller shades 120 to the fully-open positions $P_{FO}$ (i.e., when there is no direct sunlight incident on the façade 164), the amount of daylight entering the space 160 (e.g., due to sky luminance from light reflected off of clouds or other objects) may be unacceptable to a user of the space. Therefore, the controller 150 is operable to have a visor position $P_{VISOR}$ enabled for one or more of the spaces 160 or façades 164 of the building. The visor position $P_{VISOR}$ defines the highest position to which the motorized roller shades 120 will be controlled during the shade timeclock schedule. The visor position $P_{VISOR}$ is typically lower than the fully-open position $P_{FO}$, but may be equal to the fully-open position. The position of the visor position $P_{VISOR}$ may be entered using the GUI software of the PC. In addition, the visor position $P_{VISOR}$ may be enabled and disabled for each of the spaces 160 or façades 164 of the building using the GUI software of the PC.

Referring to FIG. 13, if the timeclock schedule is enabled at step 910, the controller 150 determines the time $t_{NEXT}$ of the next timeclock event from the shade timeclock schedule at step 912. If the present time $t_{PRES}$ (e.g., determined from the astronomical timeclock) is equal to the next event time $t_{NEXT}$ at step 914 and the controlled position $P_{CNTL}(t_{NEXT})$ at the next event time $t_{NEXT}$ is greater than or equal to the visor position $P_{VISOR}$ at step 916, the controller 150 sets a new shade position $P_{NEW}$ equal to the visor position $P_{VISOR}$ at step 918. If the controlled position $P_{CNTL}(t_{NEXT})$ at the next event time $t_{NEXT}$ is less than the visor position $P_{VISOR}$ at step 916, the controller 150 sets the new shade position $P_{NEW}$ equal to the controlled position $P_{CNTL}(t_{NEXT})$ at the next event time $t_{NEXT}$ at step 920. If the present time $t_{PRES}$ is not equal to the next event time $t_{NEXT}$ at step 914, the controller 150 determines the time $t_{PREV}$ of the previous timeclock event from the shade timeclock schedule at step 922 and sets the new shade position $P_{NEW}$ equal to the controlled position $P_{CNTL}(t_{PREV})$ at the previous event time $t_{PREV}$ at step 924.

After setting the new shade position $P_{NEW}$ at steps 918, 920, 924, the controller 150 makes a determination as to whether the present time is equal to the end time $t_{END}$ of the shade timeclock schedule at step 926. If the present time $t_{PRES}$ is equal to the end time $t_{END}$ at step 926, the controller 150 sets the new shade position $P_{NEW}$ to be equal to the nighttime position $P_{NIGHT}$ at step 928 and disables the timeclock schedule at step 930. If the new shade position $P_{NEW}$ is the same as the present shade position $P_{PRES}$ of the motorized roller shades 120 at step 932, the timeclock execution procedure 900 simply exits without adjusting the positions of the motorized roller shades 120. However, if the new shade position $P_{NEW}$ is not equal to the present shade position $P_{PRES}$ of the motorized roller shades 120 at step 932, the controller 150 adjusts the positions of the motorized roller shades 120 to the new shade position $P_{NEW}$ at step 934 and the timeclock execution procedure 900 exits.

Figure 14:
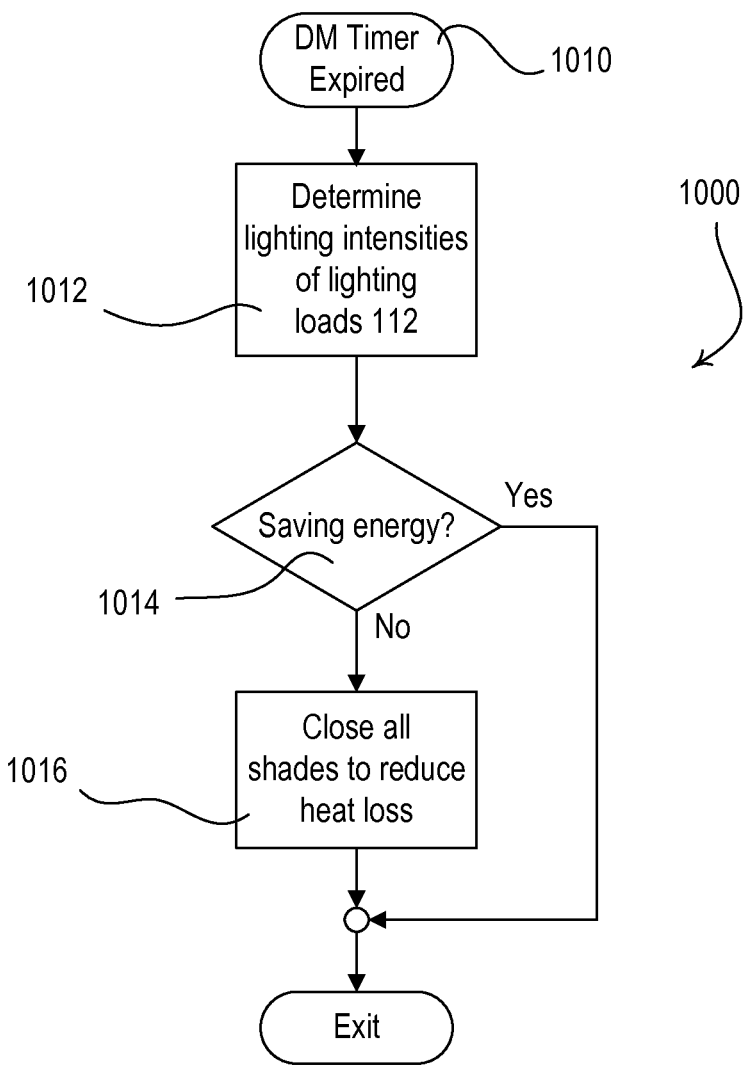
FIG. 14 is a simplified flowchart of a daylighting monitoring procedure executed by the controller of the load control system of FIG. 1 according to the first embodiment of the present invention.

FIG. 14 is a simplified flowchart of the daylighting monitoring procedure 1000, which is executed by the controller 150 when the daylighting monitoring timer expires at step 1010. As previously mentioned, the daylighting monitoring timer is initialized to an amount of time that is appropriate to allow the lighting control devices 110 to adjust the intensities of the lighting loads 112 in response to the ambient light intensity $L_{AMB}$ determined by the daylight sensor 154. During the daylighting monitoring procedure 1000, the controller 150 first determines at step 1012 the present intensities of the lighting loads 110 in the area, which are representative of the amount of power presently being consumed by the lighting loads. The controller 150 compares these lighting intensities to the lighting intensities of the lighting loads 112 that would be required if the motorized roller shades 120 were at the fully-closed positions to determine if the load control system 100 is presently saving energy as compared to when the motorized roller shades 120 are fully closed. If the load control system 100 is presently saving energy at step 1014, the controller 150 maintains the present positions of the motorized roller shades 120 and the daylighting monitoring procedure 1000 simply exits. However, if the load control system 100 is not presently saving energy at step 1014, the controller 150 closes all of the motorized roller shades 120 in the area to reduce heat loss at step 1016, before the daylighting monitoring procedure 1000 exits.

Figure 15A:
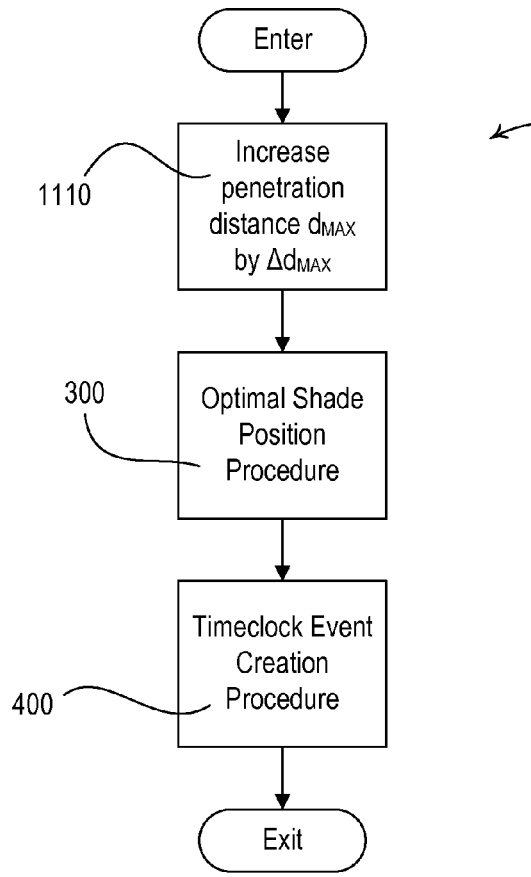
FIG. 15A is a simplified flowchart of a modified schedule procedure executed by the controller of the load control system of FIG. 1 according to the first embodiment of the present invention.

FIG. 15A is a simplified flowchart of the modified schedule procedure 1100, which is executed by the controller 150 during the demand response control procedure 800 when the area is occupied, the HVAC system 132 is presently heating the building, and there may be direct sunlight shining on the façade 164. First, the controller 150 temporarily increases the desired maximum sunlight penetration distance $d_{MAX}$ by a predetermined percentage $\Delta d_{MAX}$ (e.g., by approximately 50%) at step 1110, e.g., $$d_{MAX} = (1 + \Delta d_{MAX}) \cdot d_{MAX}. \quad \text{(Equation 16)}$$

Next, the controller 150 executes the optimal shade position procedure 300 (as shown in FIG. 5) for determining the optimal shade positions $P_{OPT}(t)$ of the motorized roller shades 120 in response to the modified desired maximum sunlight penetration distance $d_{MAX}$. The controller 150 then executes the timeclock event creation procedure 400 to generate the modified controlled positions $P_{CNTL}(t)$ in response to the optimal shade positions $P_{OPT}(t)$ determined from the modified desired maximum sunlight penetration distance $d_{MAX}$. Finally, the modified schedule procedure 1100 exits.

Figure 15B:
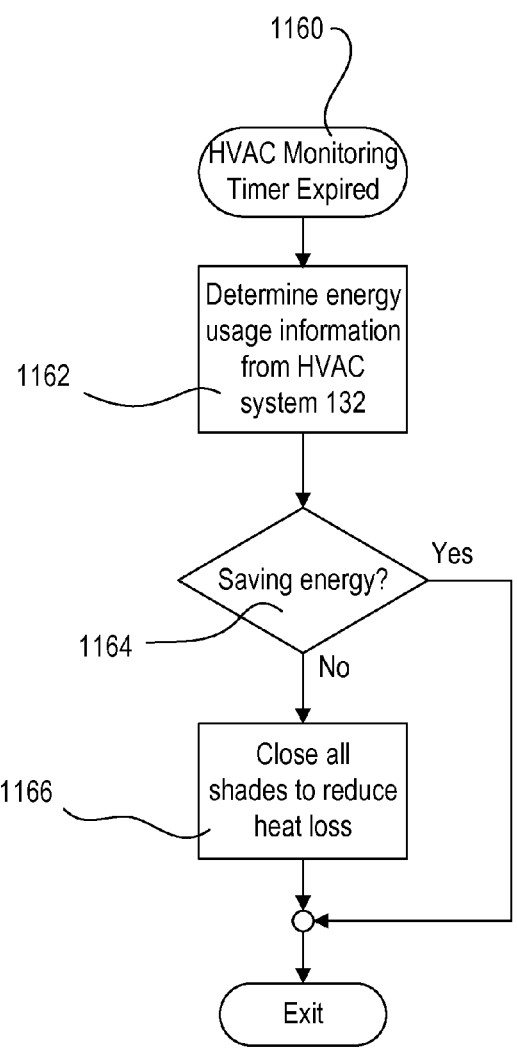
FIG. 15B is a simplified flowchart of an HVAC monitoring procedure executed by the controller of the load control system of FIG. 1 according to the first embodiment of the present invention.

FIG. 15B is a simplified flowchart of the HVAC monitoring procedure 1150, which is executed by the controller 150 when the HVAC monitoring timer expires at step 1160. The controller 150 first determines energy usage information from the HVAC system 132. For example, the controller 150 could cause the temperature control device 130 to transmit a request for energy usage information from the HVAC system 132 via the HVAC communication link 134. Alternatively, the temperature control device 130 could store data representative of the energy usage information of the HVAC system 132. For example, the temperature control device 130 could monitor when the HVAC system 132 is active or inactive while operating to heat the building when HVAC monitoring in enabled and determine a heating duty cycle, which is representative of the energy usage information of the HVAC system 132. Alternatively, the temperature control device 130 could monitor the rate at which the temperature in the space 160 decreases when the HVAC system is not actively heating the space.

Referring back to FIG. 15B, the controller 150 determines if the HVAC system 132 is saving energy during the HVAC monitoring at step 1164. For example, the controller 150 could compare the heating duty cycle during HVAC monitoring to the heating duty cycle prior to HVAC monitoring to determine if the HVAC system 132 is saving energy. If the heating duty cycle during HVAC monitoring is less than the heating duty cycle prior to HVAC monitoring than the HVAC system is saving energy. Alternatively, the controller 150 could compare the rate at which the present temperature $T_{PRES}$ of the space 160 decreases when the HVAC system 132 is not actively heating the space during HVAC monitoring to the rate prior to HVAC monitoring to determine if the HVAC system is saving energy. If the rate at which the present temperature $T_{PRES}$ of the space 160 decreases when the HVAC system 132 is not actively heating the space 160 is less than the rate prior to HVAC monitoring, the HVAC system is saving energy. If the controller 150 determines that the HVAC system 132 is saving energy at step 1164, the controller 150 maintains the present positions of the motorized roller shades 120 and the HVAC monitoring procedure 1150 simply exits. However, if the HVAC system 132 is not presently saving energy at step 1164, the controller 150 closes all of the motorized roller shades 120 in the area to reduce heat loss at step 1166, before the HVAC monitoring procedure 1150 exits. Alternatively, the HVAC monitoring procedure 1150 could be executed by the temperature control device 130.

Figure 16:
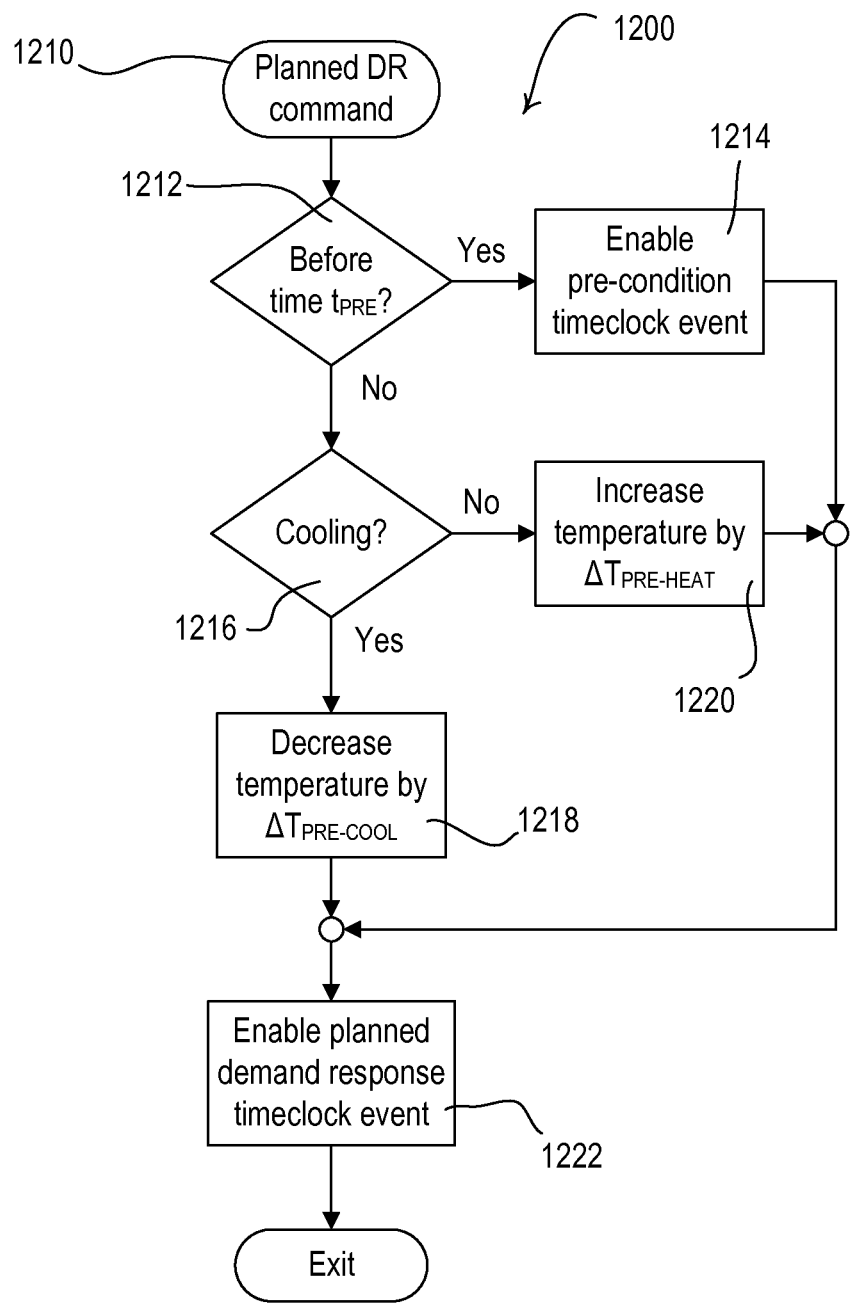
FIG. 16 is a simplified flowchart of a planned demand response procedure executed by the controller of the load control system of FIG. 1 according to a second embodiment of the present invention.

FIG. 16 is a simplified flowchart of a planned demand response procedure 1200 executed by the controller 150 of the load control system 100 according to a second embodiment of the present invention. In response to receiving a planned demand response command, the controller 150 controls the load control system 100 to reduce the total power consumption at a predetermined start time $t_{START}$ in the future, for example, at noon on the day after the planned demand response command was received. The controller 150 is operable to "pre-condition" (i.e., pre-cool or pre-heat) the building before the start time $t_{START}$ of the planned demand response command, such that the HVAC system 132 will be able to consume less power during the planned demand response event (i.e., after the start time). To pre-condition the building before a planned demand response event, the controller 150 is operable to pre-cool the building when the HVAC system 132 is in the cooling mode and will be cooling the building during the present day (e.g., during the summer), and to pre-heat the building when the HVAC system is in heating mode and the will be heating the building during the present day (e.g., during the winter).

Referring to FIG. 16, the planned demand response procedure 1200 is executed by the controller 150 when a planned demand response command is received via the network communication link 156 at step 1210. The controller 150 first determines if the present time of the day is before the predetermined pre-condition time $t_{PRE}$ (e.g., approximately 6 A.M.) at step 1212. If so, the controller 150 enables a pre-condition timeclock event at step 1214. The controller 150 will then execute (in the future at the pre-condition time $t_{PRE}$) a pre-condition timeclock event procedure 1300, which will be described in greater detail below with reference to FIG. 17. If the present time of the day is after the pre-condition time $t_{PRE}$ at step 1212 and the HVAC system 132 is presently cooling the building at step 1216, the controller 150 decreases the setpoint temperatures $T_{SET}$ of each of the temperature control devices 130 in the building by a pre-cool temperature setback temperature $T_{PRE-COOL}$ (e.g., approximately 4° F.) at step 1218 in order to pre-condition the building before the planned demand response event. Specifically, the setpoint temperature $T_{SET}$ of the building is lowered from an initial setpoint temperature $T_{INIT}$ to a new setpoint temperature $T_{NEW}$ to pre-cool the building in preparation for the planned demand response event during which the setpoint temperature will be increased above the initial temperature $T_{INIT}$ (as will be described in greater detail below with reference to FIG. 18).

Referring back to FIG. 16, if the HVAC system 132 is presently heating the building at step 1216, the controller 150 increases the setpoint temperatures $T_{SET}$ of each of the temperature control devices 130 in the building by a pre-heat temperature amount $T_{PRE-HEAT}$ (e.g., approximately 4° F.) at step 1220. After either enabling the pre-condition timeclock event at step 1214 or pre-conditioning the building at step 1218 or step 1220, the controller 150 enables a planned demand response timeclock event at step 1222, before the planned demand response procedure 1200 exits. A planned demand response timeclock event procedure 1400 will be executed by the controller 150 at a planned demand response start time $t_{START}$. The planned demand response timeclock event procedure 1400 will be described in greater detail below with reference to FIG. 18.

Figure 17:
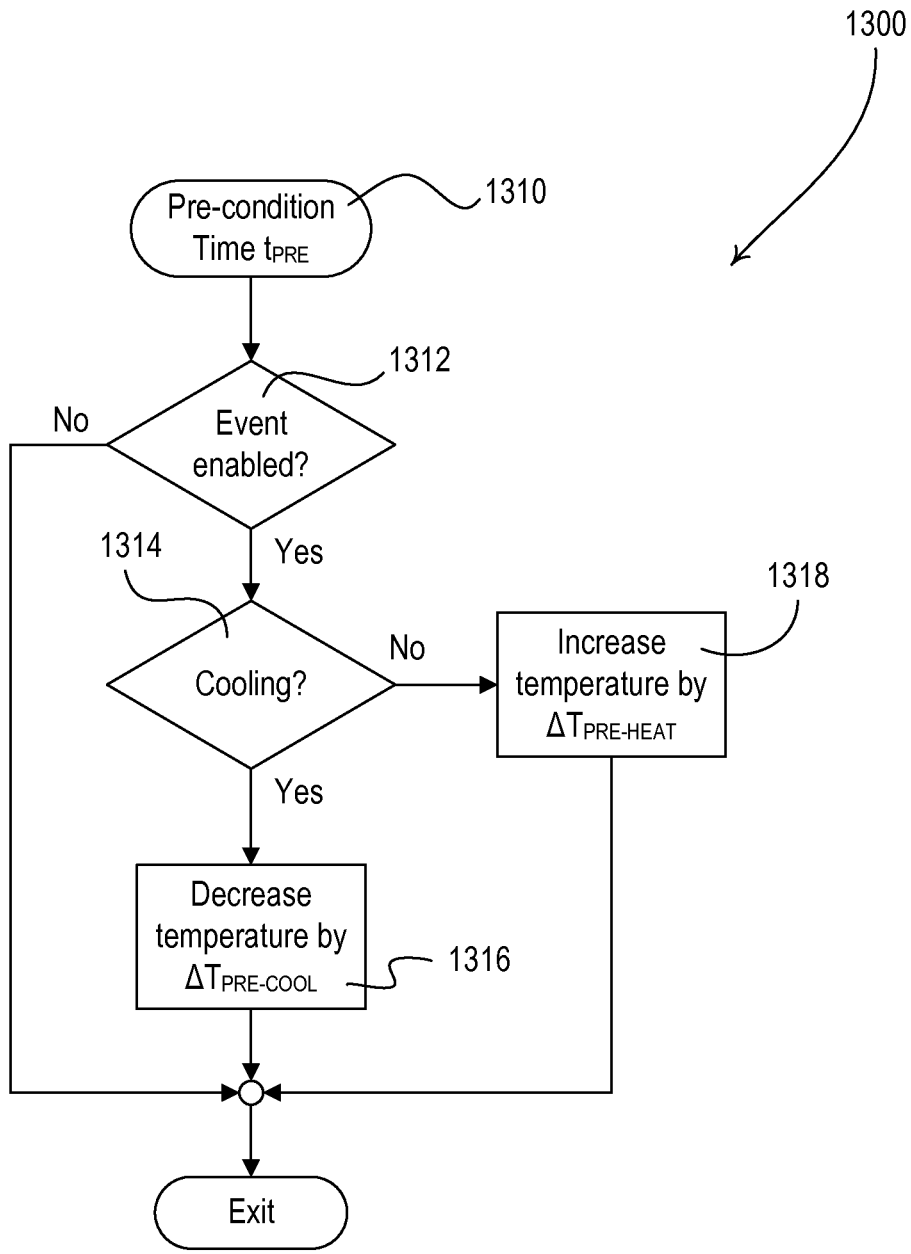
FIG. 17 is a simplified flowchart of the pre-condition timeclock event procedure executed by the controller of the load control system of FIG. 1 according to the second embodiment of the present invention.

FIG. 17 is a simplified flowchart of the pre-condition timeclock event procedure 1300, which is executed by the controller 150 at step 1310 (i.e., at the pre-condition time $t_{PRE}$). If the pre-condition timeclock event is not enabled at step 1312, the pre-condition timeclock event procedure 1300 simply exits. However, if the pre-condition timeclock event is enabled at step 1312 and the HVAC system 132 is presently cooling the building at step 1314, the controller 150 causes each of the temperature control devices 130 to decrease the setpoint temperatures $T_{SET}$ by the pre-cool temperature amount $T_{PRE-COOL}$ (i.e., approximately 4° F.) at step 1316 in order to pre-cool the building before the planned demand response event, and the pre-condition timeclock event procedure 1300 exits. If the HVAC system 132 is presently heating the building at step 1314, the controller 150 increases the setpoint temperatures $T_{SET}$ of each of the temperature control devices 130 by the pre-heat temperature amount $T_{PRE-HEAT}$ (e.g., approximately 4° F.) at step 1318 in order to pre-heat the building before the planned demand response event, and the pre-condition timeclock event procedure 1300 exits.

Figure 18:
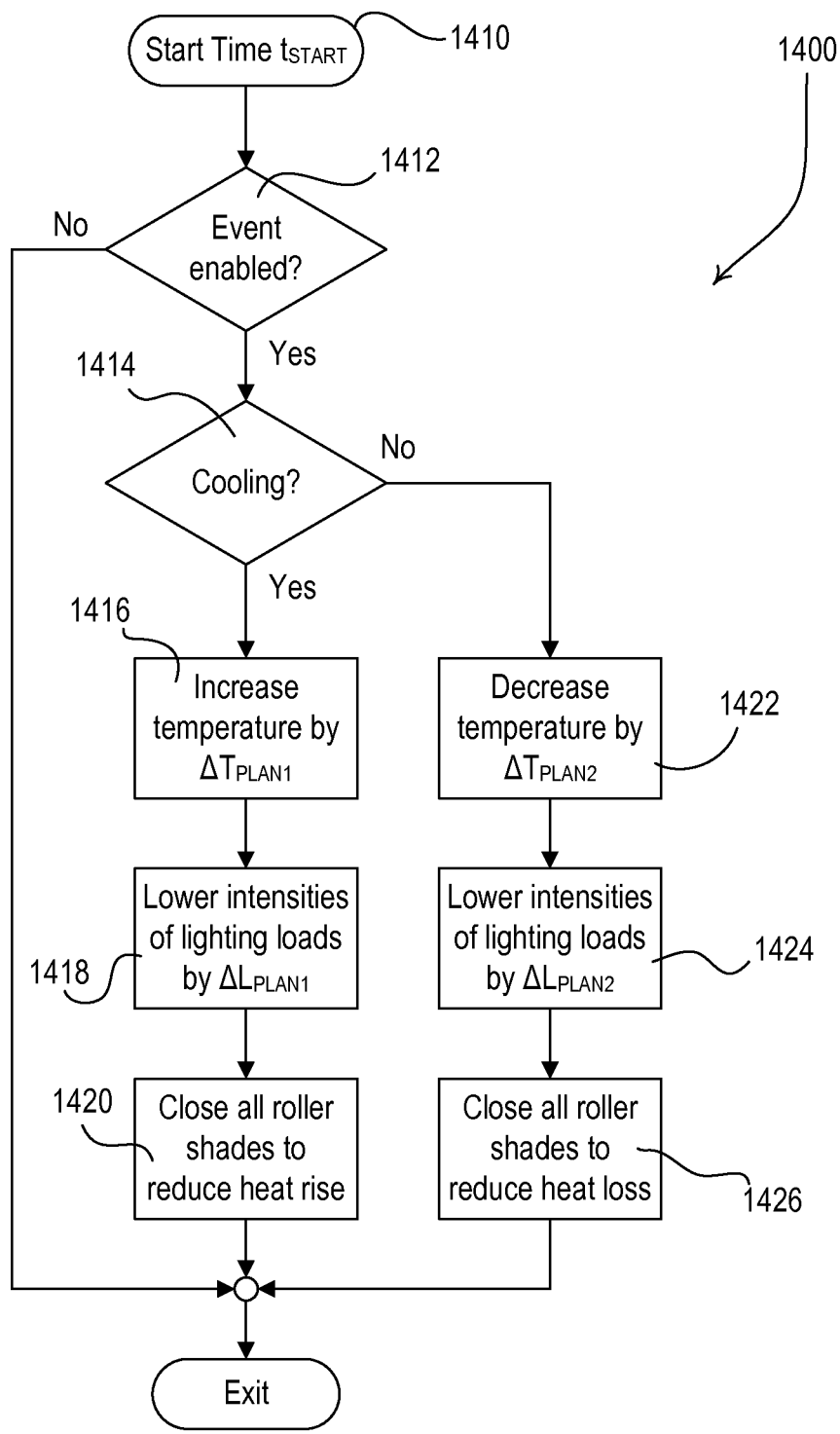
FIG. 18 is a simplified flowchart of the planned demand response timeclock event procedure executed by the controller of the load control system of FIG. 1 according to the second embodiment of the present invention.

FIG. 18 is a simplified flowchart of the planned demand response timeclock event procedure 1400, which is executed by the controller 150 at step 1410 (i.e., at the start time $t_{START}$). If the planned demand response timeclock event is not enabled at step 1412, the planned demand response timeclock event procedure 1400 simply exits. However, if the planned demand response timeclock event is enabled at step 1412 and the HVAC system 132 is presently cooling the building at step 1414, the controller 150 causes each of the temperature control devices 130 to increase the respective setpoint temperature $T_{SET}$ by a setback temperature $T_{PLAN1}$ (i.e., approximately 8° F.) at step 1416, such that the new setpoint temperature $T_{NEW}$ is greater than the initial setpoint temperature $T_{INIT}$ of the building before pre-cooling, i.e., $$T_{NEW}=T_{INIT}+(T_{PLAN1}-T_{PRE-COOL}). \qquad \text{(Equation 17)}$$

At step 1418, the controller 150 causes the lighting control devices 110 to lower each of the present lighting intensities $L_{PRES}$ of the lighting loads 112 by a predetermined percentage $\Delta L_{PLAN1}$ (e.g., by approximately 20% of the present intensity), such that the lighting loads consume less power. At step 1420, the controller 150 causes each of the motorized roller shades 120 to move the respective shade fabric 122 to the fully-closed position, before the planned demand response timeclock event procedure 1400 exits.

If the HVAC system 132 is presently heating the building at step 1414, the controller 150 decreases the setpoint temperatures $T_{SET}$ of each of the temperature control devices 130 by a setback temperature $T_{PLAN2}$ (i.e., approximately 8° F.) at step 1422, such that the new setpoint temperature $T_{NEW}$ is less than the initial setpoint temperature $T_{INIT}$ of the building before pre-heating, i.e., $$T_{NEW}=T_{INIT}-(T_{PLAN2}-T_{PRE-HEAT}). \qquad \text{(Equation 18)}$$

At step 1424, the controller 150 decreases each of the present lighting intensities $L_{PRES}$ of the lighting loads 112 connected to the lighting control devices 110 by a predetermined percentage $\Delta L_{PLAN2}$ (e.g., by approximately 20% of the present intensity). At step 1426, the controller 150 moves the respective shade fabric 122 of each of the motorized roller shades 120 to the fully-closed position, before the planned demand response timeclock event procedure 1400 exits.

While the controller 150 of the load control system 100 of FIG. 1 receives the demand response command from the electrical utility company via the network communication link 156, the load control system could alternatively receive the demand response command through other means. Often, the electrical utility company may not be connected to the load control system 100 via the Internet (i.e., via the network communication link 156). In such situations, a representative of the electrical utility company may contact a building manager of the building in which the load control system 100 is installed via telephone in order to communicate the specific demand response command. For example, the building manager could actuate one of the buttons 114 on the lighting control device 110 in order to input an immediate demand response command to the load control system 100. The lighting control device 110 could then transmit appropriate digital messages to the controller 150. Alternatively, the load control system 100 could also comprise a personal computer or laptop operable to communicate with the controller 150. The building manager could use the personal computer to communicate an immediate or a planned demand response command to the controller 150. Further, the controller 150 could include an antenna, such that the building manager could use a wireless cell phone or a wireless personal digital assistant (PDA) to transmit an immediate or a planned demand response command wirelessly to the controller (e.g., via RF signals).

the demand response command. For example, in a specific demand response level, a certain number of lighting loads may be dimmed by a predetermined amount, a certain number of motorized roller shades may be closed, a certain number of plug-in electrical loads 142 may be turned off, and the setpoint temperature may be adjusted by a certain amount. The demand response level to which the controller 150 controls the load control system 100 may be included in the demand response command received from the electrical utility company via the network communication link 156. Alternatively, the demand response command received from the electrical utility company may not include a specific demand response level. Rather, the controller 150 may be operable to select the appropriate demand response level in response to the demand response command transmitted by the electrical utility company.

When the load control system 100 is programmed to provide multiple demand response levels, each successive demand response level further reduces the total power consumption of the load control system 100. For example, the electrical utility company may first transmit a demand response command having demand response level one to provide a first level of energy savings, and then may subsequently transmit demand response commands having demand response levels two, three, and four to further and sequentially reduce the total power consumption of the load control system 100. Four example demand response levels are provided in the following table, although additional demand response levels could be provided. As shown in Table 1, the second demand response level causes the load control system 100 to consume less power than the first demand response level, and so on.

TABLE 1

Example Demand Response (DR) Levels of the Third Embodiment

| DR Level | Lighting Loads | Motorized Roller Shades | Temperature (HVAC) | Plug-In Electrical Loads |
|---|---|---|---|---|
| DR Level 1 | Reduce intensities of lighting loads in some areas by 20%. | Close shades in some areas. | Increase/reduce temperature by 2° F. when heating and cooling. | No change. |
| DR Level 2 | Reduce intensities of lighting loads in all areas by 20%. | Close shades in all areas. | Increase/reduce temperature by 4° F. when heating and cooling. | No change. |
| DR Level 3 | Reduce intensities of lighting loads in all areas by 50%. | Close shades in all areas. | Increase/reduce temperature by 6° F. when heating and cooling. | No change. |
| DR Level 4 | Reduce intensities of lighting loads in all areas by 50%. | Close shades in all areas. | Turn off HVAC system when cooling or reduce temperature to 45° F. when heating. | Turn off some plug-in electrical loads. |

Figure 19A:
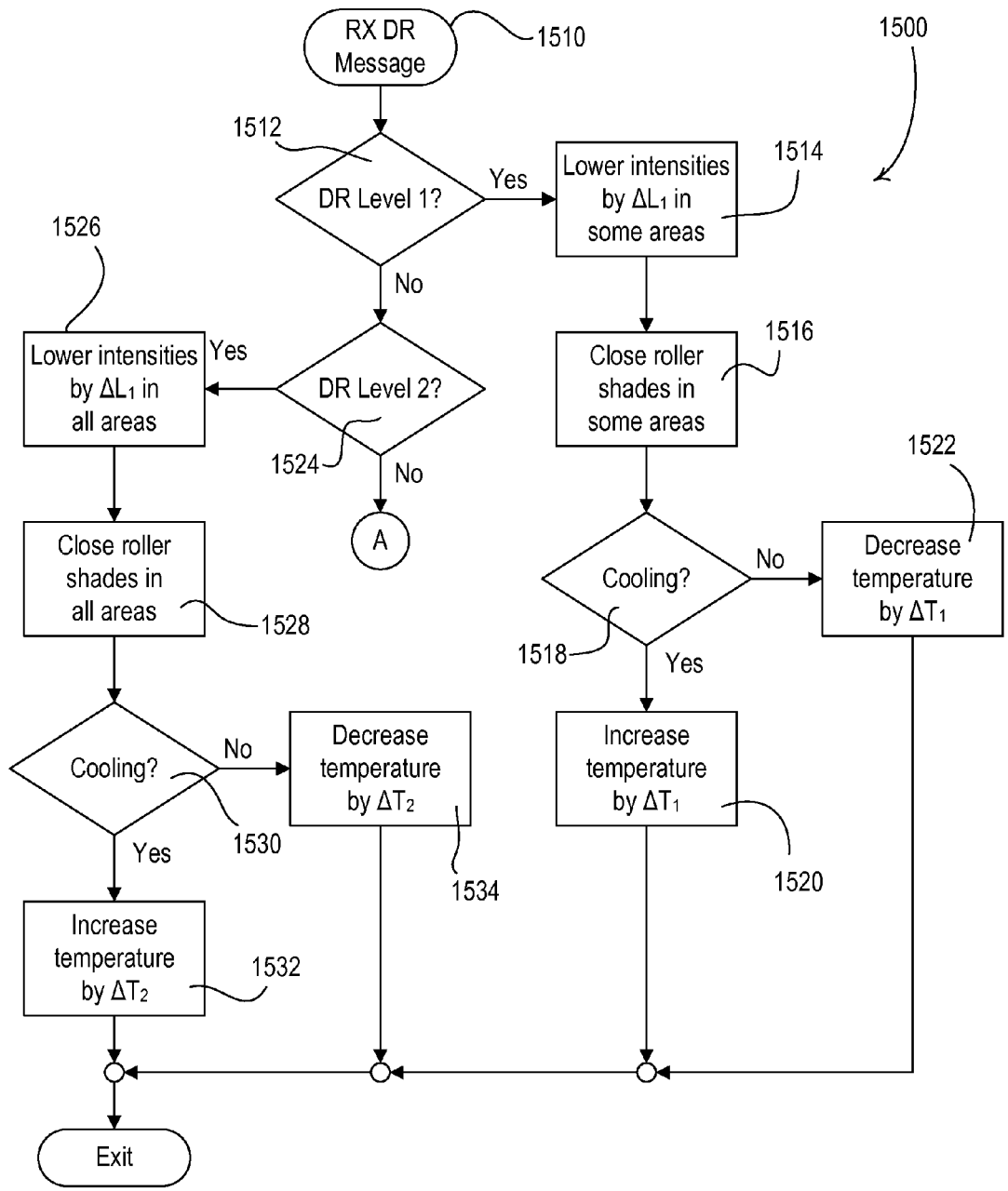
FIGS. 19A and 19B are simplified flowcharts of a demand response level procedure executed by the controller of the load control system of FIG. 1 according to a third embodiment of the present invention.
Figure 19B:
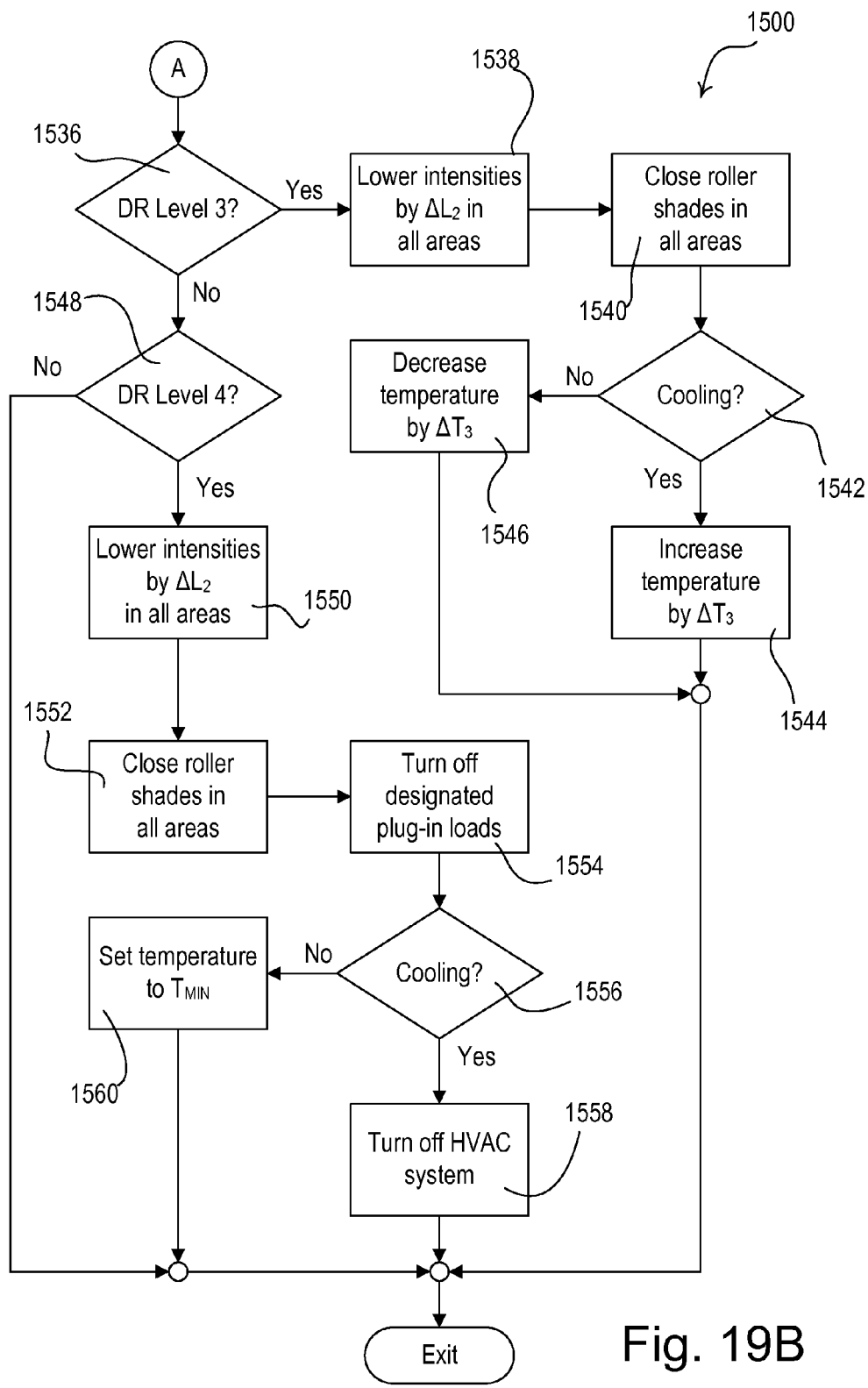

According to a third embodiment of the present invention, the controller 150 is operable to control the lighting control device 110, the motorized roller shades 120, the temperature control device 130, and the controllable electrical receptacle 140 according to a plurality of demand response (DR) levels. A demand response level is defined as a combination of predetermined parameters (e.g., lighting intensities, shades positions, temperatures, etc.) for one or more of the loads of the load control system 100. The demand response levels provide a number of predetermined levels of energy savings that the load control system 100 may provide in response to FIGS. 19A and 19B are simplified flowcharts of a demand response level procedure 1500 executed by the controller 150 according to the third embodiment of the present invention. The demand response level procedure 1500 is executed by the controller 150 in response to receiving a demand response command including a demand response level via the network communication link 156 at step 1510. If the demand response level of the received demand response command is one at step 1512, the controller 150 lowers the present intensities $L_{PRES}$ of only some of the lighting loads 112, for example, only the lighting loads 112 in the non-working areas of the building (such as, for example, rest rooms, corridors, and public areas) by a first predetermined percentage $\Delta L_1$ (e.g., approximately 20% of an initial lighting intensity $L_{INIT}$) at step 1514. The controller 150 then closes the motorized roller shades 120 in the same non-working areas of the building at step 1516. If the HVAC system 132 is presently cooling the building at step 1518, the controller 150 increases the setpoint temperatures $T_{SET}$ by a first setback temperature $T_1$ (e.g., approximately 2° F.) at step 1520, and the demand response level procedure 1500 exits. If the HVAC system 132 is presently heating the building at step 1518, the controller 150 decreases the setpoint temperatures $T_{SET}$ by the first setback temperature $T_1$ at step 1522, and the demand response level procedure 1500 exits.

If the demand response level of the received demand response command is not one at step 1512, but is two at step 1524, the controller 150 lowers the present intensities $L_{PRES}$ of all of the lighting loads 112 in the building, i.e., including the working areas of the building (such as, office spaces and conference rooms) by the first predetermined percentage $\Delta L_1$ (i.e., approximately 20% of the initial lighting intensity $L_{INIT}$) at step 1526. If the controller 150 had previously reduced the present intensities $L_{PRES}$ of the lighting loads 112 in the non-working areas of the building at step 1514 (i.e., according to the demand response level one), the controller only adjusts the present intensities $L_{PRES}$ of the lighting loads 112 in the working areas of the building at step 1526. At step 1528, the controller 150 then closes the motorized roller shades 120 in all of the areas of the building.

If the HVAC system 132 is presently cooling the building at step 1530, the controller 150 increases the setpoint temperature $T_{SET}$ by a second setback temperature $T_2$ (e.g., approximately 4° F.) at step 1532, and the demand response level procedure 1500 exits. If the controller 150 had previously increased the setpoint temperatures $T_{SET}$ by the first setback temperature $T_1$ at step 1520 (i.e., according to the demand response level one), the controller 150 only increases the setpoint temperatures $T_{SET}$ by approximately 2° F. at step 1532, (i.e., $T_2-T_1$). If the HVAC system 132 is presently heating the building at step 1530, the controller 150 decreases the setpoint temperature $T_{SET}$ by the second setback temperature $T_2$ at step 1534, and the demand response level procedure 1500 exits.

Referring to FIG. 19B, if the demand response level is not two at step 1524, but is three at step 1536, the controller 150 lowers the present intensities $L_{PRES}$ of all of the lighting loads 112 in the building by a second predetermined percentage $\Delta L_2$ (i.e., approximately 50% of the initial lighting intensity $L_{INIT}$) at step 1538. If the controller 150 had previously reduced the present intensities $L_{PRES}$ of the lighting loads 112 in any of the areas of the building at steps 1514 or 1526 (i.e., according to the demand response levels one or two), the controller only adjusts the present intensities $L_{PRES}$ of each of the lighting loads 112 by the necessary amount at step 1538. The controller 150 then closes the motorized roller shades 120 in all of the areas of the building at step 1540 (if needed). If the HVAC system 132 is presently cooling the building at step 1542, the controller 150 increases the setpoint temperature $T_{SET}$ by a third setback temperature $T_3$ (e.g., approximately 6° F.) at step 1544, and the demand response level procedure 1500 exits. If the HVAC system 132 is presently heating the building at step 1542, the controller 150 decreases each of the setpoint temperatures $T_{SET}$ by the third setback temperature $T_3$ at step 1546, and the demand response level procedure 1500 exits.

If the demand response level is not three at step 1536, but is four at step 1548, the controller 150 lowers the present intensities $L_{PRES}$ of all of the lighting loads 112 in the building by the second predetermined percentage $\Delta L_2$ at step 1550 (if needed) and closes all of the motorized roller shades 120 at step 1552 (if needed). At step 1554, the controller 150 transmits digital messages to the electrical receptacles 140 to turn off the designated plug-in electrical loads 142, such as, for example, table lamps, floor lamps, printers, fax machines, water heaters, water coolers, and coffee makers, but leaves some other plug-in loads powered, such as, personal computers. If the HVAC system 132 is presently cooling the building at step 1556, the controller 150 turns off the HVAC system at step 558, and the demand response level procedure 1500 exits. If the HVAC system 132 is presently heating the building at step 1556, the controller 150 causes each of the temperature control devices 130 to decrease the respective setpoint temperature $T_{SET}$ to a minimum temperature $T_{MIN}$ at step 1560 and the demand response level procedure 1500 exits.

Figure 20:
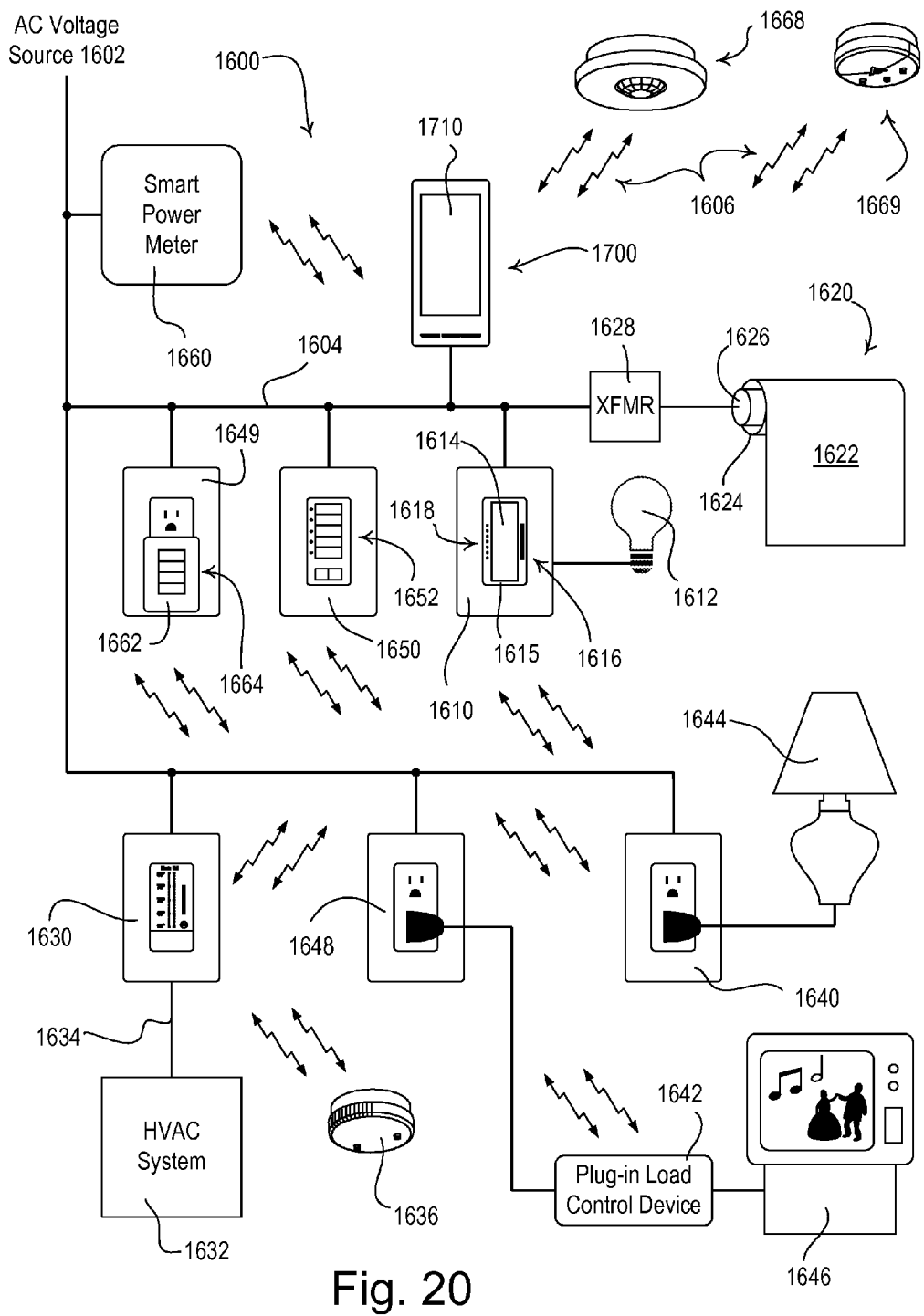
FIG. 20 is a simplified block diagram of a distributed load control system according to a fourth embodiment of the present invention.

FIG. 20 is a simplified block diagram of a distributed load control system that may be installed in a building, such as a residence, according to a fourth embodiment of the present invention. The load control system 1600 comprises a lighting control device, e.g., a wall-mountable dimmer switch 1610, which is coupled to an AC power source 1602 via a line voltage wiring 1604. The dimmer switch 1610 is operable to adjust the amount of power delivered to the lighting load 1612 to thus control the present lighting intensity $L_{PRES}$ of the lighting load 1612. The dimmer switch 1610 is also operable to fade the present lighting intensity $L_{PRES}$ between two lighting intensities.

The dimmer switch 1610 comprises a control actuator 1614 that is provided on a front surface 1615 and allows a user to turn the lighting load 1612 on and off. The dimmer switch 1610 also comprises an intensity adjustment actuator 1616, for example, a vertically-arranged linear rocker switch provided on the front surface 1615. The intensity adjustment actuator 1616 allows the user to adjust the present lighting intensity $L_{PRES}$ of the lighting load 1612 between a minimum lighting intensity $L_{MIN}$ and a maximum lighting intensity $L_{MAX}$. The dimmer switch 1610 further comprises an intensity visual display 1618, e.g., a vertically-arranged linear array of light-emitting diodes (LEDs), for displaying a visual representation of the present lighting intensity $L_{PRES}$ of the lighting load 1612. One of the individual LEDs of the intensity visual display 1618 is illuminated to display present lighting intensity $L_{PRES}$ of the lighting load 1612, for example, on a linear scale between the minimum lighting intensity $L_{MIN}$ and the maximum lighting intensity $L_{MAX}$. An example of a wall-mountable dimmer switch is described in greater detail in commonly-assigned U.S. Pat. No. 5,399,940, entitled LIGHTING INDICATING DEVICE HAVING PLURAL ILLUMINATING ELEMENTS WITH ALL SUCH ELEMENTS BEING ILLUMINATED WITH ONE BEING GREATER THAN THE OTHERS, the entire disclosure of which is hereby incorporated by reference.

The dimmer switch 1610 is operable to transmit and receive digital messages via wireless signals, e.g., RF signals 1606 (i.e., via an RF communication link). The dimmer switch 1610 is operable to adjust the present lighting intensity $L_{PRES}$ of the lighting load 1612 in response to the digital messages received via the RF signals 1606. The dimmer switch 1610 may also transmit feedback information regarding the amount of power being delivered to the lighting load 1610 via the digital messages included in the RF signals 1606. Examples of RF lighting control systems are described in greater detail in commonly-assigned U.S. Pat. No. 5,905,442, issued on May 18, 1999, entitled METHOD AND APPARA- TUS FOR CONTROLLING AND DETERMINING THE STATUS OF ELECTRICAL DEVICES FROM REMOTE LOCATIONS, and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of which are both hereby incorporated by reference.

The load control system 1600 comprises a motorized window treatment, e.g., a motorized roller shade 1620, which may be positioned in front of a window for controlling the amount of daylight entering the building. The motorized roller shade 1620 comprises a flexible shade fabric 1622 rotatably supported by a roller tube 1624, and an electronic drive unit (EDU) 1626, which may be located inside the roller tube 1624. The electronic drive unit 1626 may be powered by an external transformer (XFMR) 1628, which is coupled to the AC power source 1602 and produces a lower voltage AC supply voltage for the electronic drive unit. The electronic drive unit 1626 is operable to transmit and receive the RF signals 1606, such that the electronic drive unit may control the position of the shade fabric 1622 in response to digital messages received via the RF signals and may transmit feedback information regarding the position of the shade fabric via the RF signals.

The load control system 1600 also comprises a wall-mountable temperature control device 1630, which is coupled to an HVAC system 1632 via an HVAC communication link 1634, e.g., a digital communication link, such as an Ethernet link or a BACnet® link. The temperature control device 1630 measures the present temperature $T_{PRES}$ in the building and transmits appropriate digital messages to the HVAC system 1632 to thus control the present temperature $T_{PRES}$ in the building towards a setpoint temperature $T_{SET}$. The temperature control device 1630 is operable to adjust the setpoint temperature $T_{SET}$ in response to the digital messages received via the RF signals 1606. The temperature control device 1630 could comprise a more traditional analog control link for simply turning the HVAC system 1632 on and off.

The load control system 1600 further comprises one or more controllable electrical receptacles 1640, and plug-in load control devices 1642 for control of plug-in electrical loads, such as, for example, a table lamp 1644, a television 1646, a floor lamp, a stereo, or a plug-in air conditioner. The controllable electrical receptacle 1640 and the plug-in load control device 1642 are responsive to the digital messages received via the RF signals 1606 to turn on and off the respective plug-in loads 1644, 1646. The plug-in load control device 1642 is adapted to be plugged into a standard electrical receptacle 1648. The controllable electrical receptacle 1640 may comprise a dimmable electrical receptacle including an internal dimming circuit for adjusting the intensity of the lamp 1644. Additionally, the load control system 1600 could comprise one or more controllable circuit breakers (not shown) for control of other switched electrical loads, such as, for example, a water heater. The load control system 1600 may also comprise additional dimmer switches 1610, motorized roller shades 1620, temperature control devices 1630, controllable electrical receptacles 1640, and plug-in load control devices 1642.

According to the fourth embodiment of the present invention, the dimmer switch 1610, the motorized roller shade 1620, the temperature control device 1630, and the controllable electrical receptacles 1640, 1642 are each individually responsive to a plurality of demand response levels, i.e., predetermined energy-savings "presets". The energy-savings presets may be user selectable and may be defined to provide energy savings for different occupancy conditions of the building. For example, the energy-savings presets may comprise a "normal" preset, an "eco-saver" preset, an "away" preset, a "vacation" preset, and a "demand response" preset. Examples of the energy-savings presets are provided in the following table.

TABLE 2

Example Energy-Savings Presets of the Fourth Embodiment

| | Load | | | |
|---|---|---|---|---|
| Preset | Lighting Loads | Motorized Roller Shades | Temperature (HVAC) | Plug-In Electrical Loads |
| Normal | Reduce intensities of lighting loads by 0%. | Shade positions as controlled by user. | Temperature as controlled by user. | No change. |
| Eco-Saver | Reduce intensities of lighting loads by 15%. | Control position in response to ambient light intensity. | Increase/reduce temperature by 2° F. when heating and cooling. | No change. |
| Away | Turn off all lighting loads. | Close all shades. | Increase/reduce temperature by 6° F. when heating and cooling. | Turn off lamps, television, and stereo. |
| Vacation | Turn off all lighting loads. | Close all shades. | Increase temp. by 10° F. when cooling or reduce temp. to 45° F. when heating. | Turn off lamps, television, stereo, and water heater. |
| Demand Response | Reduce intensities of lighting loads by 20%. | Close all shades. | Increase/reduce temperature by 2° F. when heating and cooling. | No change. | may be operable to adjust the setpoint temperature $T_{SET}$ in response to the present time of day according to a predetermined timeclock schedule. The HVAC system 1632 may comprise, for example, a building management system (BMS). Alternatively, the HVAC communication link 1634

When the normal preset is selected, the load control system 1600 operates as controlled by the occupant of the building, i.e., the normal preset provides no changes to the parameters of the load control system. For example, the lighting loads 1612 may be controlled to 100%, the motorized roller shades 1620 may be opened, and the setpoint temperature $T_{SET}$ may be controlled to any temperature as determined by the occupant. The eco-saver preset provides some energy savings over the normal preset, but still provides a comfortable environment for the occupant. The away preset provides additional energy savings by turning off the lighting loads and some of the plug-in electrical loads when the occupant may be away temporarily away from the building. The vacation preset provides the maximum energy savings of the energy-savings presets shown in Table 2 for times when the occupant may be away from the building for an extended period of time.

Figure 21A:
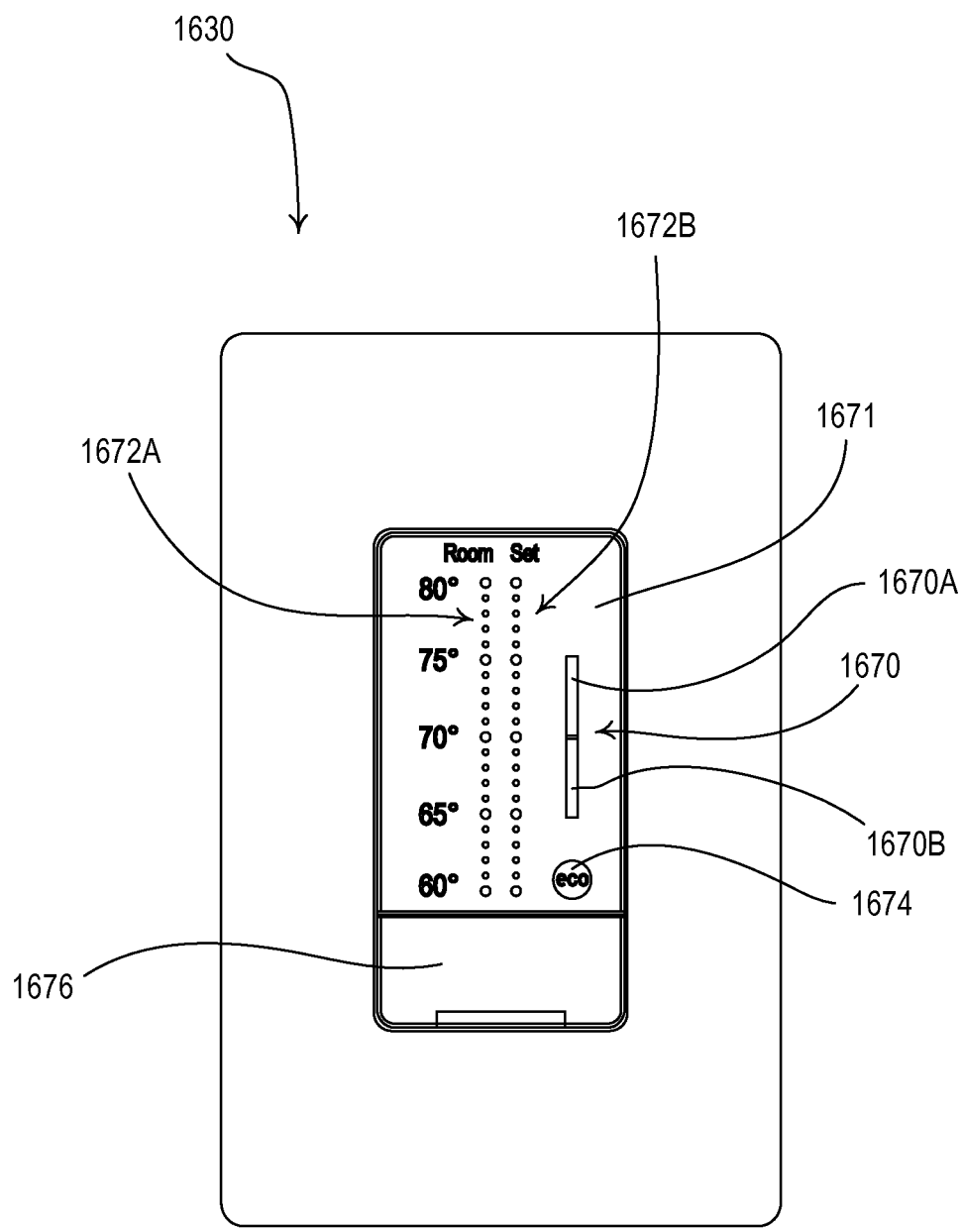
FIG. 21A is a front view of a temperature control device of the load control system of FIG. 20 showing a cover plate open.

FIG. 21A is an enlarged front view of the temperature control device 1630. The temperature control device 1630 includes a temperature adjustment actuator 1670, which may comprise, for example, a vertically-arranged linear rocker switch provided on a front surface 1671 of the temperature control device as shown in FIG. 21A. Actuations of an upper portion 1670A of the temperature adjustment actuator 1670 cause the temperature control device 1630 to increase the setpoint temperature $T_{SET}$, while actuations of a lower portion 1670B of the temperature adjustment actuator cause the temperature control device to decrease the setpoint temperature $T_{SET}$.

The temperature control device 1630 further comprises a room temperature visual display 1672A for displaying a visual representation of the present temperature $T_{PRES}$ of the building, for example, in the room in which the temperature control device 1630 is located, and a setpoint temperature visual display 1672B for displaying a visual representation of the setpoint temperature $T_{SET}$ of the temperature control device 1630. The room temperature visual display 1672A and the setpoint temperature visual display 1672B may each comprise, for example, a linear array of LEDs arranged parallel to the temperature adjustment actuator 1670 on the front surface 1671 of the temperature control device 1630 as shown in FIG. 21A. One of the individual LEDs of the room temperature visual display 1672A is illuminated to display the present temperature $T_{PRES}$, for example, on a linear scale between 60° F. and 80° F. In a similar manner, one of the individual LEDs of the setpoint temperature visual display 1672B is illuminated to display the setpoint temperature $T_{SET}$ of the temperature control device 1630.

The temperature control device 1630 is operable to increase or decrease the setpoint temperature $T_{SET}$ by a setback temperature $T_{SB}$ in response to the mode of the HVAC system 1632 (i.e., heating or cooling, respectively) as part of the energy-savings presets received via the RF signals 1606. In addition, the temperature control device 1630 is operable to adjust the setpoint temperature $T_{SET}$ by the setback temperature $T_{SB}$ in response to the actuation of an "eco-saver" actuator 1674. The temperature control device 1630 may also transmit a digital message including, for example, the eco-saver preset, to the other control devices of the load control system 1600 in response to actuations of the eco-saver actuator 1674. The temperature control device 1630 continues to adjust the setpoint temperature $T_{SET}$ by the setback temperature $T_{SB}$ even when the setpoint temperature $T_{SET}$ is adjusted, for example, in response to a timeclock event of a predetermined timeclock schedule. The temperature control device 1630 may stop adjusting the setpoint temperature $T_{SET}$ by the setback temperature $T_{SB}$, for example, in response to actuations of the temperature adjustment actuator 1670 to adjust the setpoint temperature $T_{SET}$.

Figure 21B:
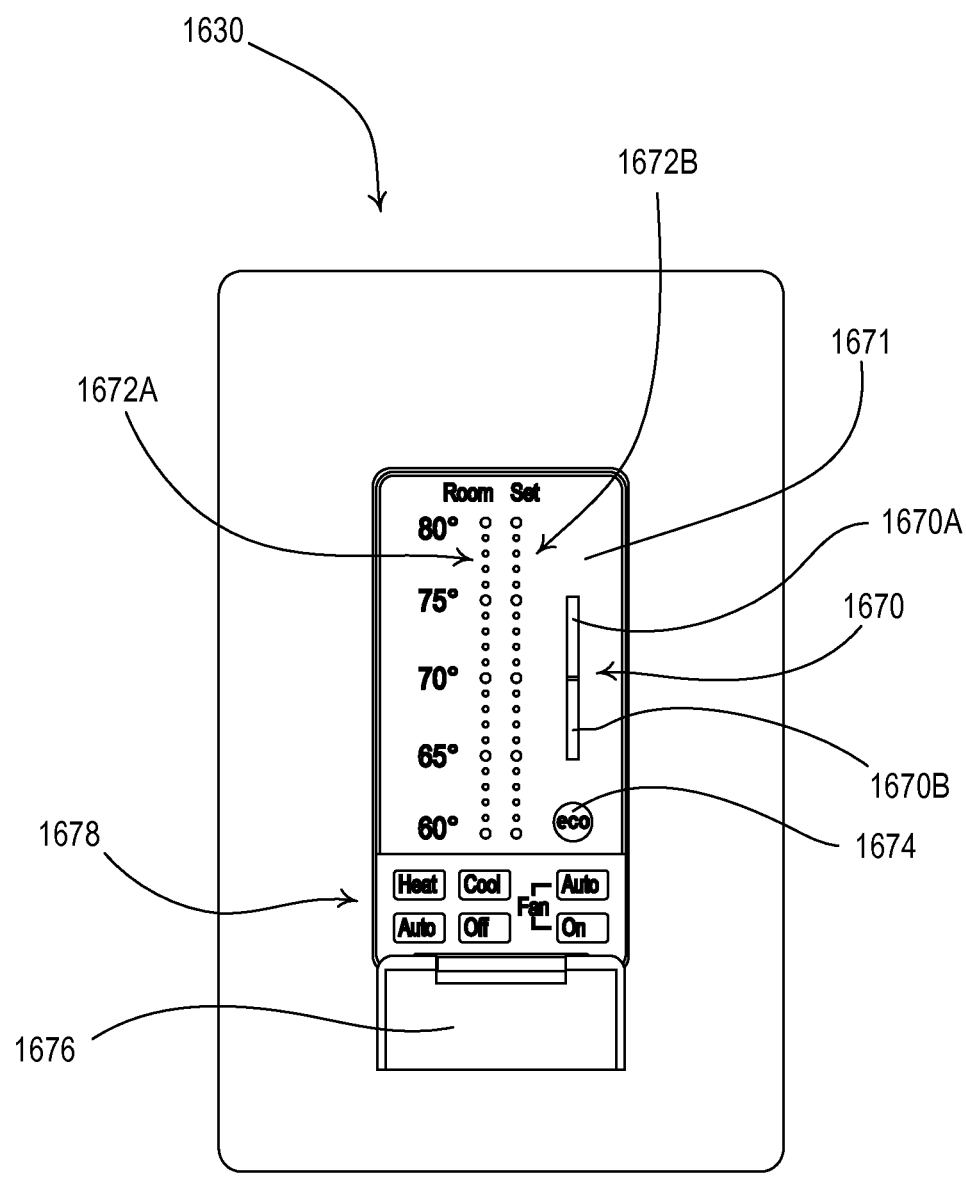
FIG. 21B is a front view of the temperature control device of FIG. 21A showing the cover plate open.

The temperature control device 1630 has a cover plate 1676, which covers a plurality of operational actuators 1678. FIG. 21B is a front view of the temperature control device 1630 in which the cover plate 1676 is open and the operational actuators 1678 are shown. Actuations of the operational actuators 1678 adjust the operation of the HVAC system 1632, for example, to change between the heating mode and the cooling mode. Alternatively, the temperature control device 1630 could, as part of the energy-savings presets, adjust the setpoint temperature $T_{SET}$ by the setback temperature $T_{SB}$ in response to the present time of the year (i.e., the summer or the winter). For example, the temperature control device 1630 could comprise an astronomical time clock.

Figure 22:
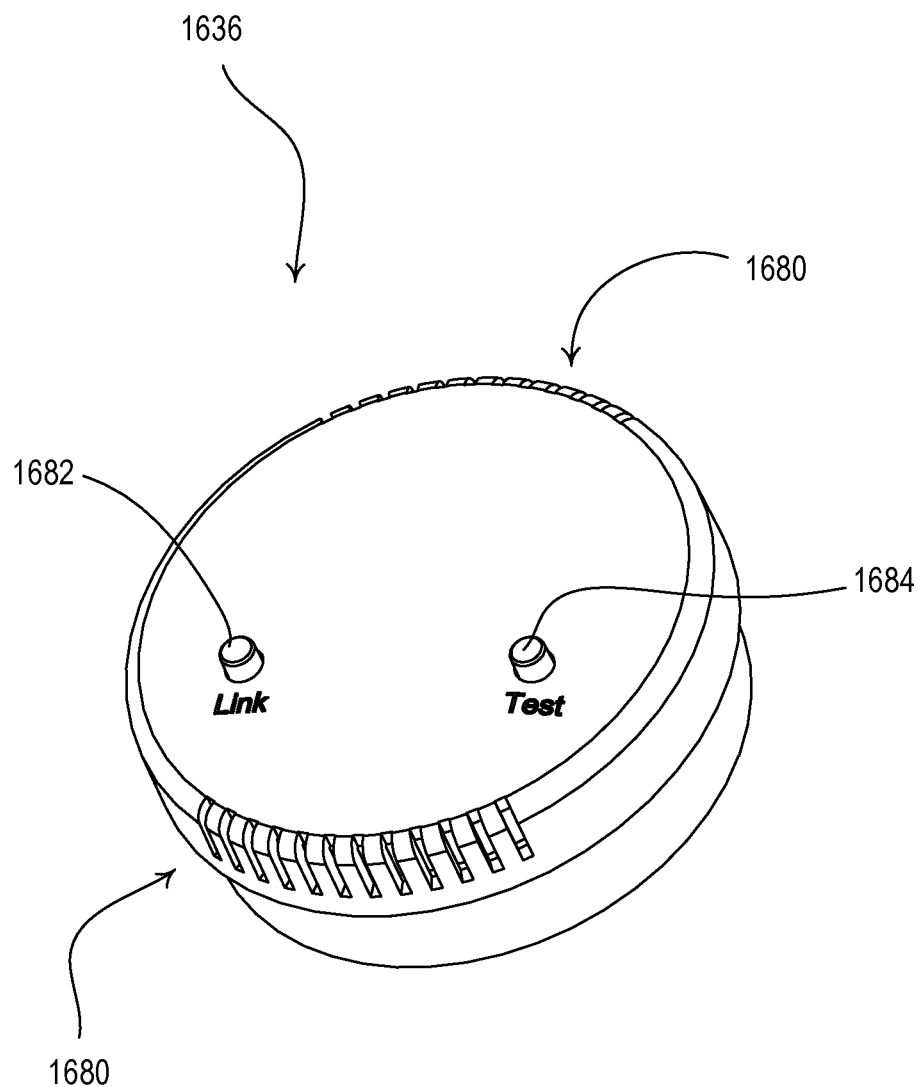
FIG. 22 is a perspective view of a wireless temperature sensor of the load control system of FIG. 20.

Referring back to FIG. 20, the load control system 1600 may also comprise a wireless temperature sensor 1636, which may be mounted remotely in a location away from the temperature control device 1630 and may also be battery-powered. FIG. 22 is an enlarged perspective view of the wireless temperature sensor 1636. The wireless temperature sensor 1636 comprises an internal temperature sensing device (not shown) for measuring the present temperature $T_{PRES}$ in the building at the location away from the temperature control device 1630. The wireless temperature sensor 1636 comprises vents 1680, which allow for air flow from the outside of the temperature sensor to the internal temperature sensing device inside the temperature sensor. The vents 1680 help to improve the accuracy of the measurement of the present temperature $T_{PRES}$ in the room in which the wireless temperature sensor 1636 is mounted (i.e., of the temperature outside the wireless temperature sensor). The wireless temperature sensor 1636 further comprises a link button 1682 and a test button 1684 for use during setup and configuration of the wireless temperature sensor. The wireless temperature sensor 1636 is operable to transmit digital messages regarding the measured temperature to the temperature control device 1630 via the RF signals 1606. In response to receiving the RF signals 1606 from the wireless temperature sensor 1636, the temperature control device is operable to update the room temperature visual display 1672A to display the present temperature $T_{PRES}$ of the room at the location of the wireless temperature sensor and to control the HVAC system 1632, so as to adjust the present temperature $T_{PRES}$ in the room towards the setpoint temperature $T_{SET}$.

Figure 23:
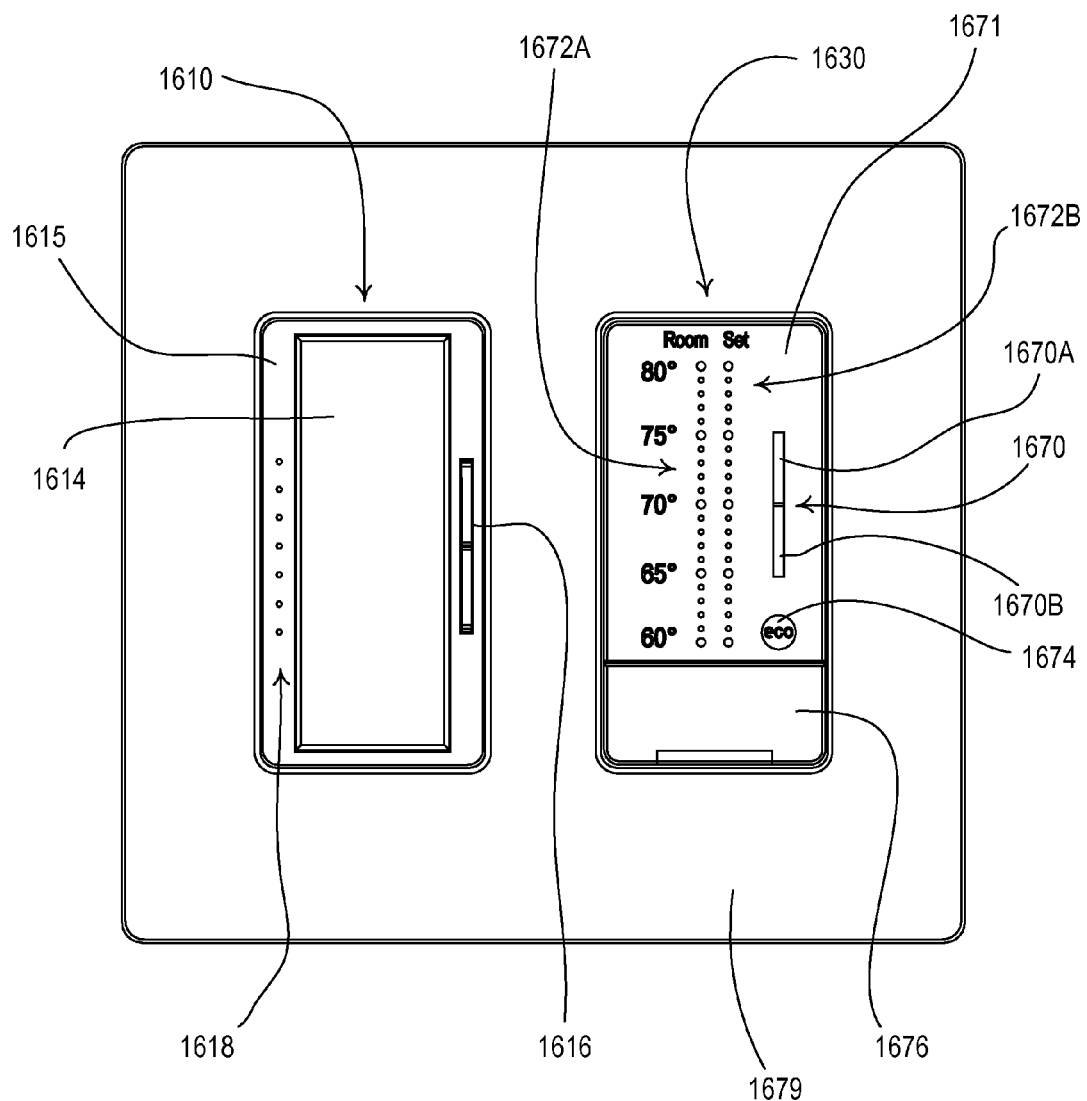
FIG. 23 is a simplified front view of the dimmer switch mounted next to temperature control device with a multiple-gang designer-style faceplate.

Since the temperature sensor 1636 may be mounted remotely from the temperature control device 1630, the temperature control device may be mounted in a multi-gang electrical wallbox next to a heat-generating load control device, such as the dimmer switch 1610. FIG. 23 is a simplified front view of the dimmer switch 1610 mounted next to the temperature control device 1630 with a multiple-gang (e.g., two-gang) designer-style faceplate 1679. The front surface 1615 of the dimmer switch 1610 is received in a first opening of the designer-style faceplate 1679, while the front surface 1671 of the temperature control device 1630 is received in a second opening of the faceplate. Per standards set by the National Electrical Manufacturers Association (NEMA), each opening of a designer-style faceplate has a length of 2.630" and a width of 1.310" (NEMA Standards Publication No. WD6, 2001, p. 5).

Figure 24:
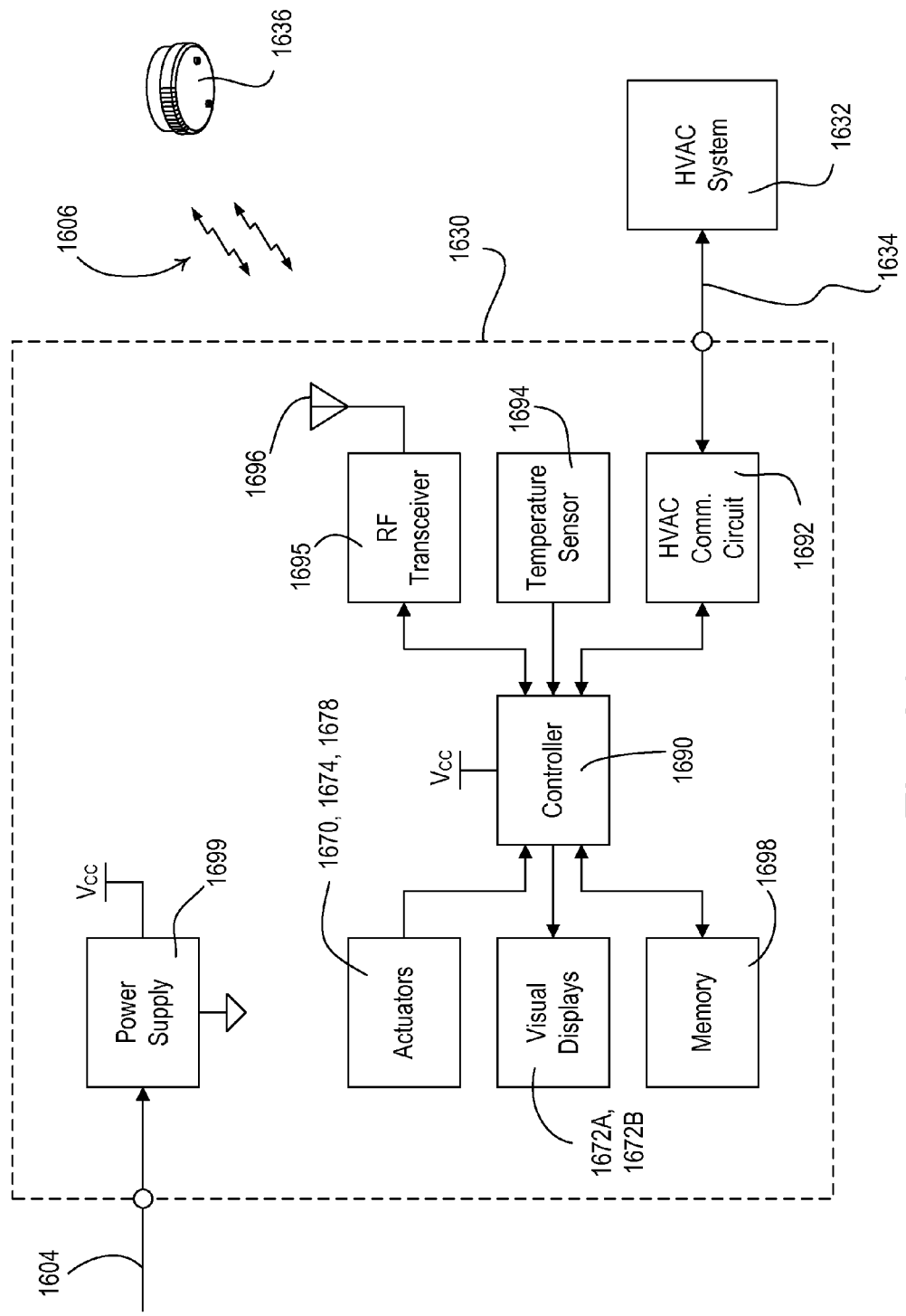
FIG. 24 is a simplified block diagram of the temperature control device of FIG. 21A.

FIG. 24 is a simplified block diagram of the temperature control device 1630 according to the fourth embodiment of the present invention. The temperature control device 1630 comprises a controller 1690, which may be implemented as, for example, a microprocessor, a microcontroller, a programmable logic device (PLD), an application specific integrated circuit (ASIC), or any suitable processing device. The controller 1690 is coupled to an HVAC communication circuit 1692 (e.g., a digital communication circuit, such as an Ethernet communication circuit), which is connected to the HVAC communication link 1634 to allow the controller to adjust the setpoint temperature $T_{SET}$ of the HVAC system

1632. If the HVAC communication circuit 1692 comprises an analog control link, the HVAC communication circuit 1692 could simply comprise a switching device for enabling and disabling the HVAC system 1632.

The controller 1690 is coupled to a wireless communication circuit, e.g., an RF transceiver 1695, which is coupled to an antenna 1696 for transmitting and receiving the RF signals 1606. The controller 1690 is operable to determine the present temperature $T_{PRES}$ in the building in response to the RF signals 1606 received from the wireless temperature sensor 1636. In addition, the controller 1690 may comprise an internal temperature sensor 1694 for determining the present temperature $T_{PRES}$ in the building. Alternatively, the temperature control device 1630 may simply comprise either one or the other of the internal temperature sensor 1694 and the RF transceiver 1695 for determining the present temperature $T_{PRES}$ in the room. Examples of antennas for wall-mounted control devices are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The temperature control device 1630 further comprises a memory 1698 for storage of the setpoint temperature $T_{SET}$ and the present temperature $T_{PRES}$ in the building, as well as data representative of the energy usage information of the HVAC system 1632. The memory 1698 may be implemented as an external integrated circuit (IC) or as an internal circuit of the controller 1690. The controller 1690 may be operable to determine the data representative of the energy usage information of the HVAC system 1632 in a similar manner as the temperature control device 130 of the first embodiment. For example, the data representative of the energy usage information of the HVAC system 1632 may comprise values of the duty cycle defining when the HVAC system is active and inactive during a predetermined time period, or the rate at which the present temperature $T_{PRES}$ decreases or increases in the room when the HVAC system is not actively heating or cooling the space, respectively, during a predetermined time period.

A power supply 1699 receives power from the line voltage wiring 1604 and generates a DC supply voltage $V_{CC}$ for powering the controller 1690 and other low-voltage circuitry of the temperature control device 1630. The controller 1690 is coupled to the temperature adjustment actuator 1670, the eco-saver actuator 1674, and the operational actuators 1678, such that the controller is operable to adjust the operation of the HVAC system 1632 in response to actuations of these actuators. The controller 1690 is coupled to the room temperature visual display 1672A and the setpoint temperature visual display 1672B for displaying the present temperature $T_{PRES}$ and the setpoint temperature $T_{SET}$, respectively.

Figure 25:
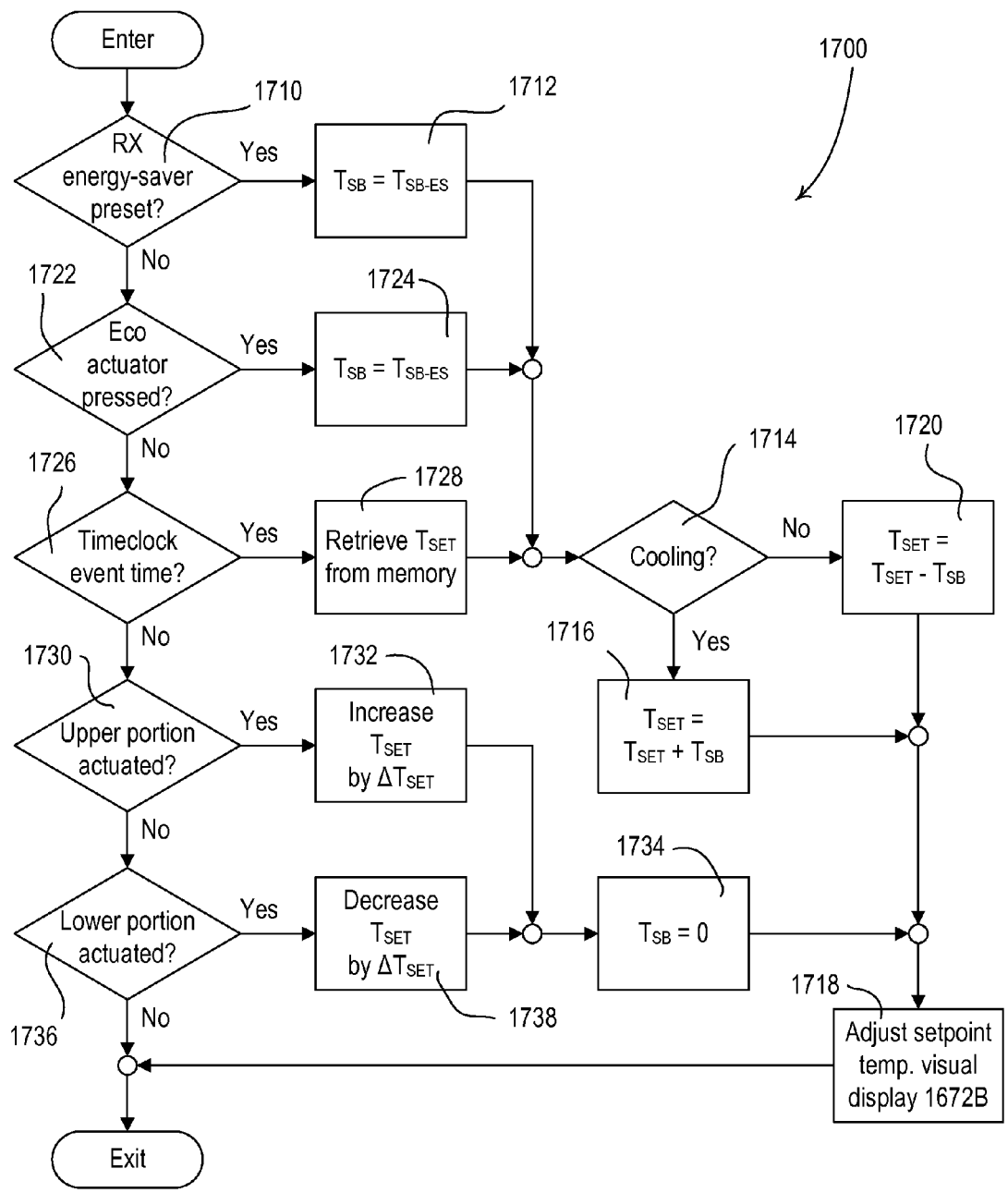
FIG. 25 is a simplified flowchart of a temperature control procedure executed periodically by a controller of the temperature control device of FIG. 21A.

FIG. 25 is a simplified flowchart of a temperature control procedure 1700 executed periodically (e.g., every ten milliseconds) by the controller 1690. If the controller 1690 has received a digital message including an energy-savings preset (e.g., the eco-saver preset) at step 1710, the controller adjusts the setback temperature $T_{SB}$ to be equal to an eco-saver setback temperature $T_{SB-ES}$ (e.g., approximately 2° F.) at step 1712. If the HVAC system 1632 is presently cooling the building at step 1714, the controller 1690 increases the setpoint temperature $T_{SET}$ by the setback temperature $T_{SB}$ at step 1716, and adjusts the setpoint temperature visual display 1672B at step 1718 before the temperature control procedure 1700 exits. If the HVAC system 1632 is presently heating the building at step 1714, the controller 1690 decreases the setpoint temperature $T_{SET}$ by the setback temperature $T_{SB}$ at step 1720, and adjusts the setpoint temperature visual display 1672B at step 1718.

If the eco-saver actuator 1674 was actuated at step 1722, the controller adjusts the setback temperature $T_{SB}$ to be equal to the eco-saver setback temperature $T_{SB-ES}$ at step 1724 and adjusts the setpoint temperature $T_{SET}$ at steps 1716, 1720, before the temperature control procedure 1700 exits. If it is presently time for a timeclock event at step 1726, the controller 1690 retrieves the setpoint temperature for the present timeclock event from the memory 1698 at step 1728 and then adjusts the setpoint temperature $T_{SET}$ in response to the setback temperature $T_{SB}$ at steps 1716, 1720. If the upper portion 1670A of the temperature adjustment actuator 1670 is actuated at step 1730, the controller 1690 increases the setpoint temperature $T_{SET}$ by a predetermined adjustment increment $\Delta T_{SET}$ (e.g., approximately 1° F.) at step 1732 and clears the setback temperature $T_{SB}$ (i.e., sets the setback temperature $T_{SB}$ to be equal to 0° F.) at step 1734, before adjusting the setpoint temperature visual display 1672B at step 1718. If the lower portion 1670B of the temperature adjustment actuator 1670 is actuated at step 1736, the controller 1690 decreases the setpoint temperature $T_{SET}$ by the predetermined adjustment increment $\Delta T_{SET}$ at step 1738, sets the setback temperature $T_{SB}$ to be equal to 0° F. at step 1734, and adjusts the setpoint temperature visual display 1672B at step 1718, before the temperature control procedure 1700 exits.

Figure 26:
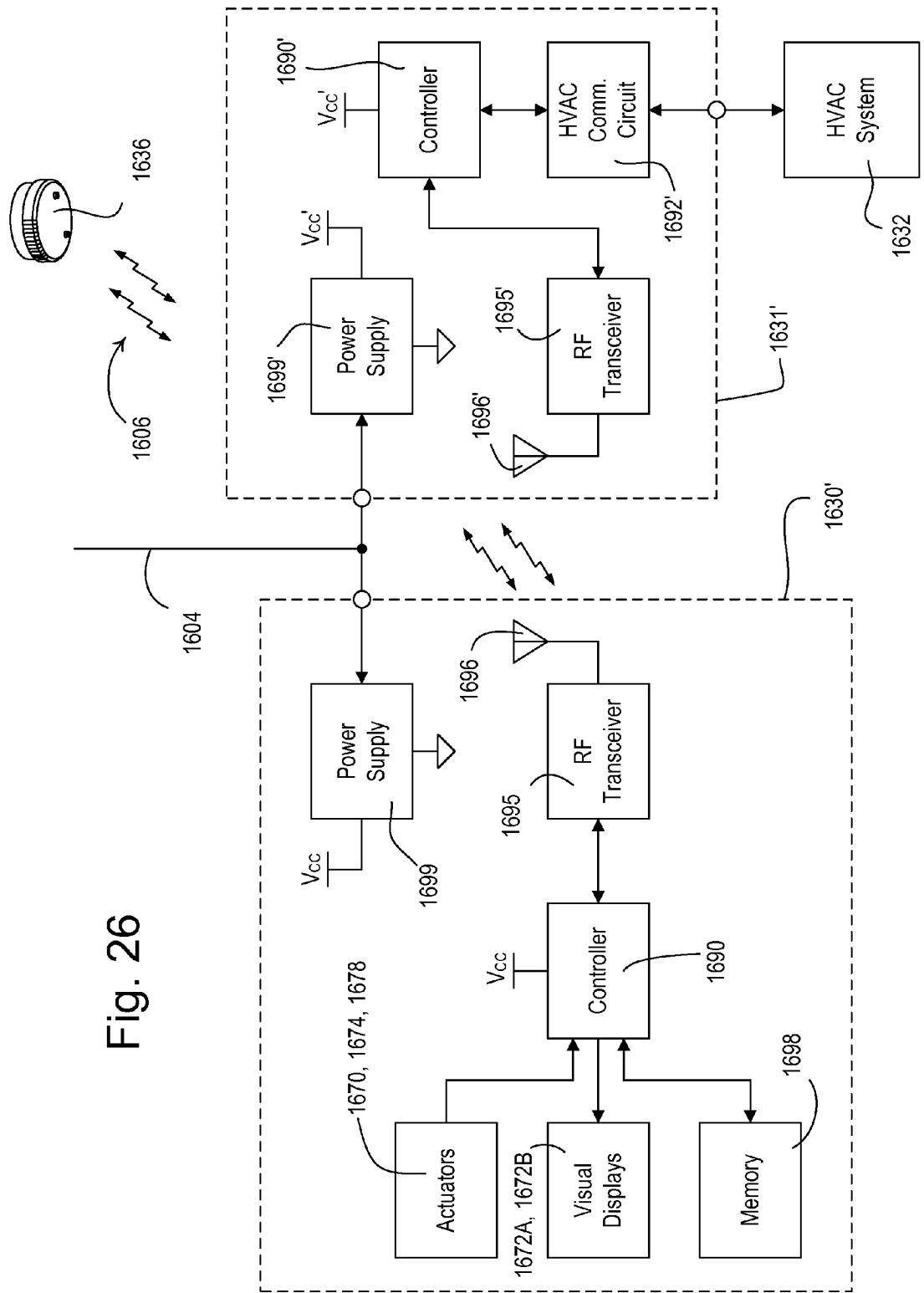
FIG. 26 is a simplified block diagram of a temperature control device according to an alternate embodiment of the present invention.

FIG. 26 is a simplified block diagram of a temperature control device 1630' according to an alternate embodiment of the present invention. The temperature control device 1630' shown in FIG. 26 is not directly coupled to the HVAC system 1632. The temperature control device 1630' is operable to transmit and receive digital messages via the RF signals 1606 with an HVAC controller 1631', which is coupled to the HVAC system 1632 via the HVAC communication link 1634. The HVAC controller 1631' comprises a controller 1690', which is coupled to an HVAC communication circuit 1692' and an RF transceiver 1695'. The HVAC controller 1631' also comprises a power supply 1690' for generating a DC supply voltage $V_{CC}'$ for powering the controller 1690', the HVAC communication circuit 1692', and the RF transceiver 1695'. The RF transceiver 1695' is operable to receive via an antenna 1696' the RF signals 1606 transmitted by the wireless temperature sensor 1636, such that the controller 1690' is able to determine the present temperature $T_{PRES}$ in the building. The controller 1690' is also operable to transmit and receive the digital messages with the temperature control device 1630' via the RF transceiver 1695' and with the HVAC system 1632 via the HVAC communication circuit 1692', such that the controller 1690' is operable to adjust the setpoint temperature $T_{SET}$ in response to actuations of the temperature adjustment actuator 1670 of the temperature control device. In addition, the controller 1690' is operable to cause the temperature control device 1630' to adjust the room temperature visual display 1672A in response to the present temperature $T_{PRES}$ in the building as determined from the wireless temperature sensor 1636 and the setpoint temperature visual display 1672B in response to the setpoint temperature $T_{SET}$.

Figure 27:
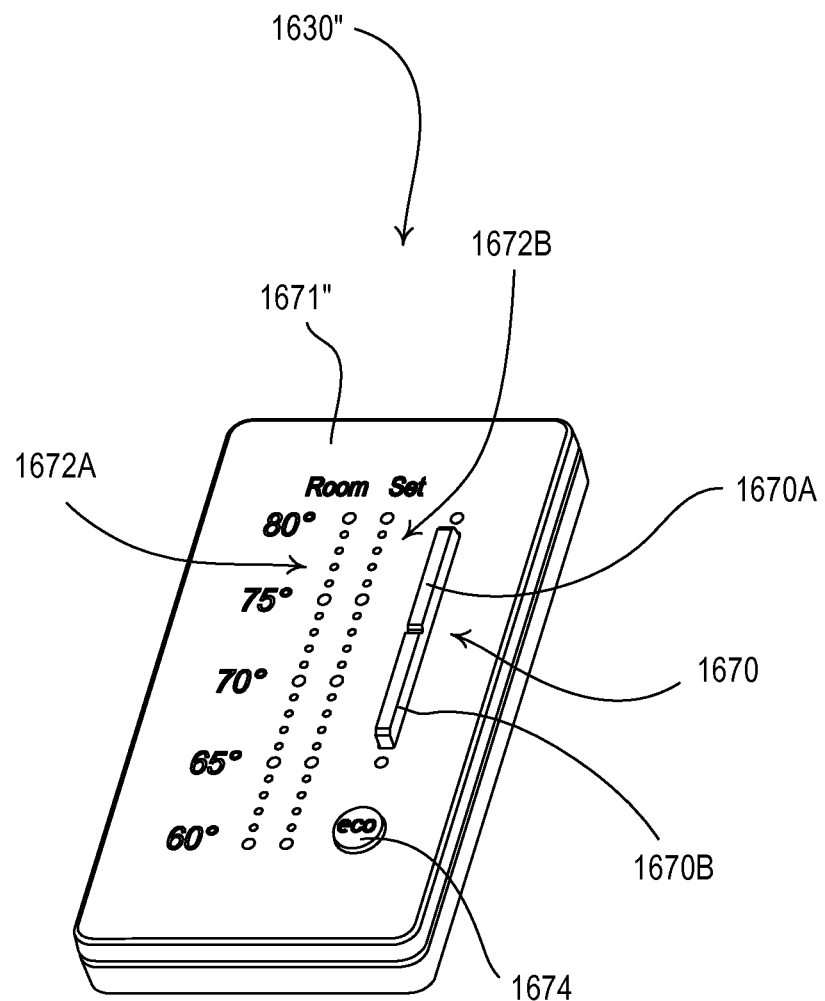
FIG. 27 is a perspective view of a temperature control device according to another alternate embodiment of the present invention.
Figure 28:
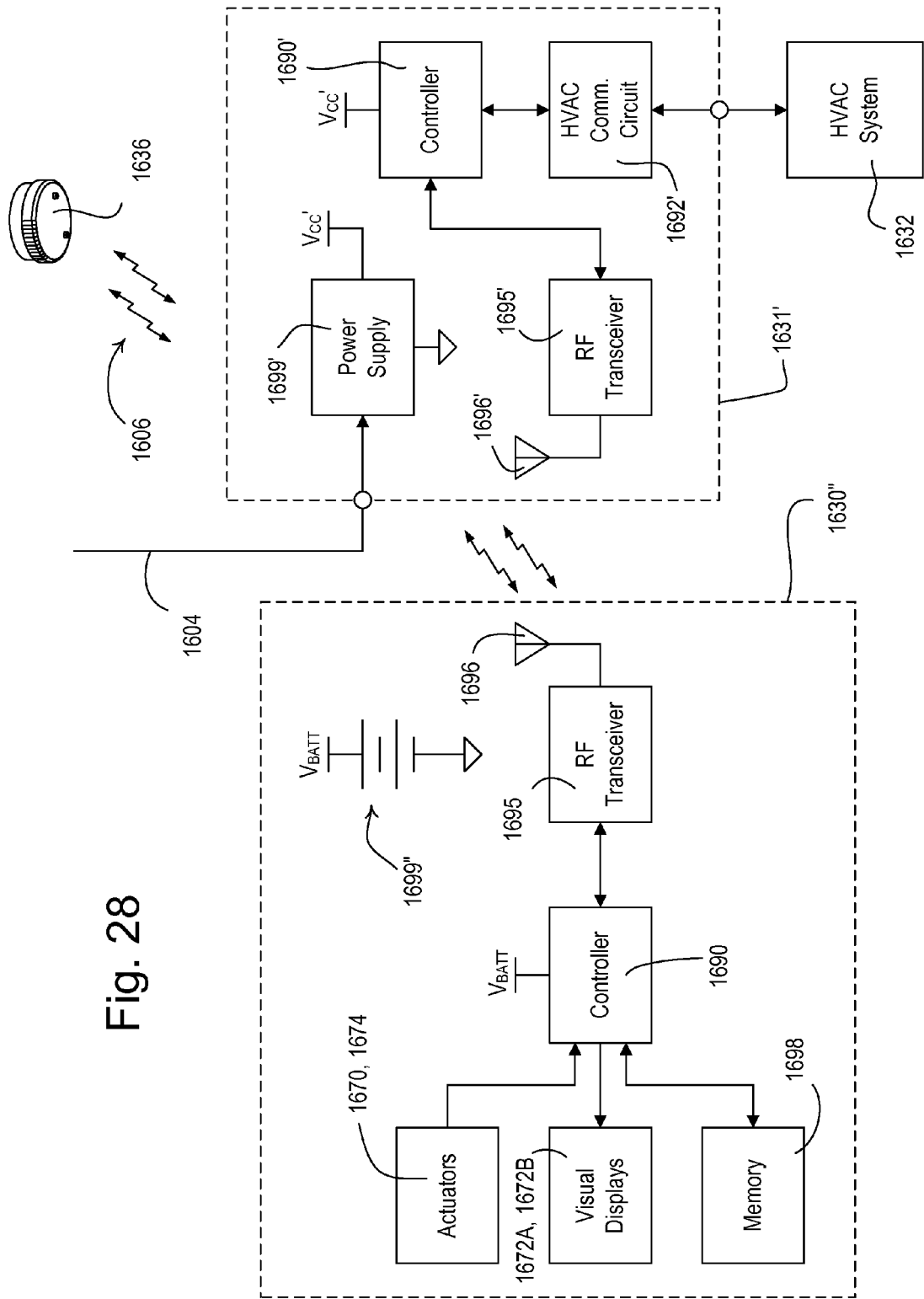
FIG. 28 is a simplified block diagram of the temperature control device of FIG. 27.

FIG. 27 is a perspective view and FIG. 28 is a simplified block diagram of a temperature control device 1630" according to another alternate embodiment of the present invention. As shown in FIGS. 27 and 28, the temperature control device 1630" is a battery-powered remote control having a battery 1699" that generates a battery voltage $V_{BATT}$ (e.g., approximately three volts) for powering the controller 1690 and other low-voltage circuitry of the battery-powered temperature control device 1630". The battery-powered temperature control device 1630" comprises an enclosure 1671" that is sized to fit in the opening of a designer-style faceplate, such that the temperature control device may be mounted to a wall next to an electrical wallbox and ganged with the dimmer switch 1610 as shown in FIG. 23. The battery-powered temperature control device 1630" is operable to transmit RF signals 1606 to the HVAC controller 1631' to adjust the setpoint temperature $T_{SET}$ in response to actuations of the temperature adjustment actuator 1670, and to receive RF signals from the HVAC controller 1631' to adjust the room temperature visual display 1672A in response to the present temperature $T_{PRES}$ in the building as determined from the wireless temperature sensor 1636 and the setpoint temperature visual display 1672B in response to the setpoint temperature $T_{SET}$. Alternatively, the battery-powered temperature control device 1630" may be used as a hand-held device or implemented as a tabletop device. Battery-powered remote controls are described in greater detail in U.S. patent application Ser. No. 12/399,126, filed Mar. 6, 2009, entitled WIRELESS BATTERY-POWERED REMOTE CONTROL HAVING MULTIPLE MOUNTING MEANS, the entire disclosure of which is hereby incorporated by reference.

Referring back to FIG. 20, the load control system 1600 of the fourth embodiment may also include a keypad 1650 to allow for manual selection of the energy-savings presets, specifically, the normal preset, the eco-saver preset, the away preset, and the vacation preset. The keypad 1650 comprises a plurality of preset buttons 1652 including, for example, a preset button 1652 for each of the energy-savings presets that may be selected by the keypad 1650. The keypad 1650 transmits digital messages to the other control devices of the load control system 1600 via the RF signals 1606 in response to actuations of the preset buttons 1652. The dimmer switch 1610, the motorized roller shade 1620, the temperature control device 1630, the controllable electrical receptacles 1640, and the plug-in load control device 1642 operate as shown in Table 2 in response to the specific energy-savings preset transmitted in the digital messages from the keypad 1650. In addition, the eco-saver preset may be selected in response to an actuation of the eco-saver actuator 1674 on the temperature control device 1630. Specifically, the controller 1690 of the temperature control device 1630 is operable to transmit a digital message including an eco-saver preset command via the RF transceiver 1695 in response to an actuation of the eco-saver actuator 1674. Alternatively, the controller 1690 of the temperature control device 1630 could simply increase or decrease the setpoint temperature $T_{SET}$ by the setback temperature $T_{SB}$ to reduce the power consumption of the HVAC system 1632 in response to an actuation of the eco-saver actuator 1674.

The load control system 1600 may also comprise a smart power meter 1660 coupled to the line voltage wiring 1604. The smart power meter 1660 is operable to receive demand response messages or commands from the electrical utility company, for example, via the Internet or via RF signals. The smart power meter 1660 may be operable to wirelessly transmit a digital message including the received demand response command to a demand response orchestrating device 1662, which may be, for example, plugged into a standard electrical receptacle 1649. In response to receiving a digital message from the smart power meter 1660, the demand response orchestrating device 1662 is operable to subsequently transmit digital messages including, for example, the demand response preset, via the RF signals 1606 to the dimmer switch 1610, the motorized roller shade 1620, the temperature control device 1630, the controllable electrical receptacle 1640, and the plug-in load control device 1642. Accordingly, as shown by the example data in Table 1, the dimmer switch 1610 reduces the present lighting intensity $L_{PRES}$ of the lighting load 1612 by 20% and the electronic drive units 1626 move the respective shade fabrics 1622 to the fully-closed position in response to receiving the demand response command. In response to receiving the utility-company command, the temperature control device 1630 also increases the setpoint temperature $T_{SET}$ by 2° F. when the HVAC system 1632 is presently in the cooling mode, and decreases the setpoint temperature $T_{SET}$ by 2° F. when the HVAC system 1632 is presently in the heating mode. In addition, the demand response orchestrating device 1662 may comprise one or more buttons 1664 for selecting the energy-savings presets. Alternatively, the smart power meter 1660 may be operable to wirelessly transmit digital message directly to the dimmer switch 1610, the motorized roller shade 1620, the temperature control device 1630, the controllable electrical receptacle 1640, and the plug-in load control device 1642.

The load control system 1600 may further comprise a wireless occupancy sensor 1668. The occupancy sensor 1668 is operable to wirelessly transmit digital messages to the dimmer switch 1610, the motorized roller shade 1620, the temperature control device 1630, the controllable electrical receptacles 1640, and the plug-in load control device 1642 in response to detecting an occupancy condition or a vacancy condition in the space in which the occupancy sensor in mounted. For example, the dimmer switch 1610, the motorized roller shade 1620, the temperature control device 1630, the controllable electrical receptacles 1640, and the plug-in load control device 1642 operate according to the away preset in response a vacancy condition, and according to the normal preset in response to an occupied condition.

The load control system 1600 may further comprise a wireless daylight sensor 1669 for measuring the ambient light intensity $L_{AMB}$ in the room in which the daylight sensor is mounted. The daylight sensor 1669 is operable to wirelessly transmit digital messages to the dimmer switch 1610, the motorized roller shade 1620, the temperature control device 1630, the controllable electrical receptacles 1640, and the plug-in load control device 1642 in response to the ambient light intensity $L_{AMB}$ in the space in which the daylight sensor in mounted. The motorized roller shade 1620 may be operable to control the position of the shade fabric 1622 in response to amount of daylight entering the building through the window as part of the eco-saver preset. In addition, the motorized roller shade 1620 could control the position of the shade fabric 1622 in response to the present time of the year and the present time of the day as part of the eco-saver preset.

In addition, the load control system 1600 may further comprise a dynamic keypad 1800 having a visual display 1710. FIG. 29 is a front view of the dynamic keypad 1800 showing an example home screen 1720. The dynamic keypad 1800 is adapted to be mounted to a wall (e.g., in an electrical wallbox), such that the dynamic keypad may be optimally mounted and easily accessible in a space. Alternatively, the dynamic keypad 1800 could be surface-mounted to the wall. The dynamic keypad 1800 may comprise a touch screen, e.g., a capacitive touch pad 1812, displaced overtop the visual display 1810, such that the visual display may display "soft" buttons 1814 that may be actuated by a user. Accordingly, the visual display 1810 is operable to dynamically change to provide a plurality of different soft buttons to the user to thus allow the user to monitor and adjust many different operating characteristics and parameters of the load control system 1600. The dynamic keypad 1800 also comprises "hard" buttons 1816 (i.e., physical buttons), which may, for example, select predetermined presets or scenes, or turn predetermined loads on and off.

As shown in FIG. 29, the soft buttons 1814 of the home screen 1820 include a lights button 1822, a shades button 1824, a temperature button 1825, an audio-visual (A/V) button 1826, an energy (i.e., energy savings) button 1828, and a favorites button 1829. An actuation of the lights button 1822 causes the dynamic keypad 1800 to display a lighting scenes screen 1840 (FIG. 31) for adjusting the intensities of the lighting loads 1612 of the load control system 1600, while an actuation of the shades button 1824 causes the dynamic keypad to display a window treatments scenes screen 1870 (FIG. 33) for controlling the positions of the motorized roller shades 1620. An actuation of the temperature button 1825 results in the display of a setpoint temperature adjustment screen 1800 (FIG. 35), which allows for adjusting the setpoint temperature $T_{SET}$ and the setback temperature $T_{SB}$ as will be described in greater detail below. An actuation of the A/V button 1826 causes the dynamic keypad 1800 to display an A/V screen (not shown) that provides for control of, for example, the volume of a speaker or other controllable characteristics of audio and visual equipment. An actuation of the energy button 1828 displays an energy-saving preset screen 1900 (FIG. 37), which allows for selection of one of the energy-savings presets. Finally, an actuation of the favorites button 1829 displays a favorites screen (not shown) that may include, for example, a selection of often-used or preferred presets of the user of the dynamic keypad 1800. The dynamic keypad 1800 may be operable to time out in response to receiving no user inputs via the soft buttons 1814 or the hard buttons 1816 for a predetermined amount of time, and then return to the home screen 1820 after timing out.

Figure 30:
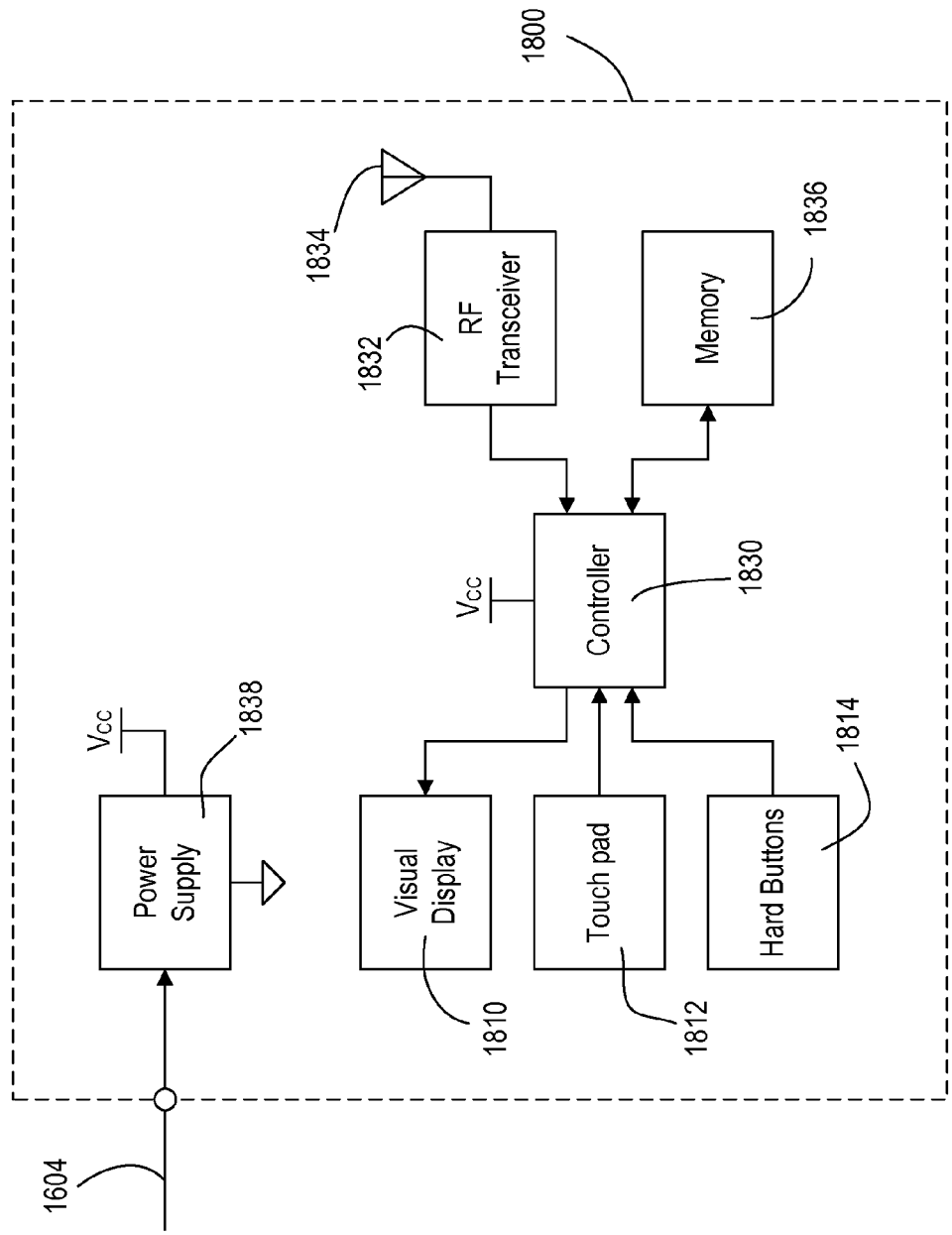
FIG. 30 is a simplified block diagram of the dynamic keypad of FIG. 29.

FIG. 30 is a simplified block diagram of the dynamic keypad 1800. The dynamic keypad 1800 comprises a controller 1830, which may be implemented as, for example, a microprocessor, a microcontroller, a programmable logic device (PLD), an application specific integrated circuit (ASIC), or any suitable processing device. The controller 1830 is coupled to the visual display 1810, such that the controller 1830 is operable to cause the various screens to be displayed on the visual display. The controller 1830 is also coupled to the touch pad 1812 and the hard buttons 1816, such that the controller is operable to receive user inputs via actuations of the soft buttons 1814 and the hard buttons. The controller 1830 is further coupled to a wireless communication circuit, e.g., an RF transceiver 1832, which is coupled to an antenna 1834 for transmitting and receiving digital messages via the RF signals 1606. Alternatively, the dynamic keypad 1800 could comprise a communication circuit adapted to be coupled to a wired communication link. The dynamic keypad 1800 further comprises a memory 1836 for storage of the various screens to be displayed on the visual display 1810 as well as other operational characteristics of the load control system 1600, and a power supply 1838 that receives power from the line voltage wiring 1604 and generates a DC supply voltage $V_{CC}$ for powering the controller 1830 and other low-voltage circuitry of the dynamic keypad 1800. Alternatively, the dynamic keypad 1800 could comprise a battery (not shown) for generating the DC supply voltage $V_{CC}$, such that the dynamic keypad requires no wire connections.

Figures 31, 32:
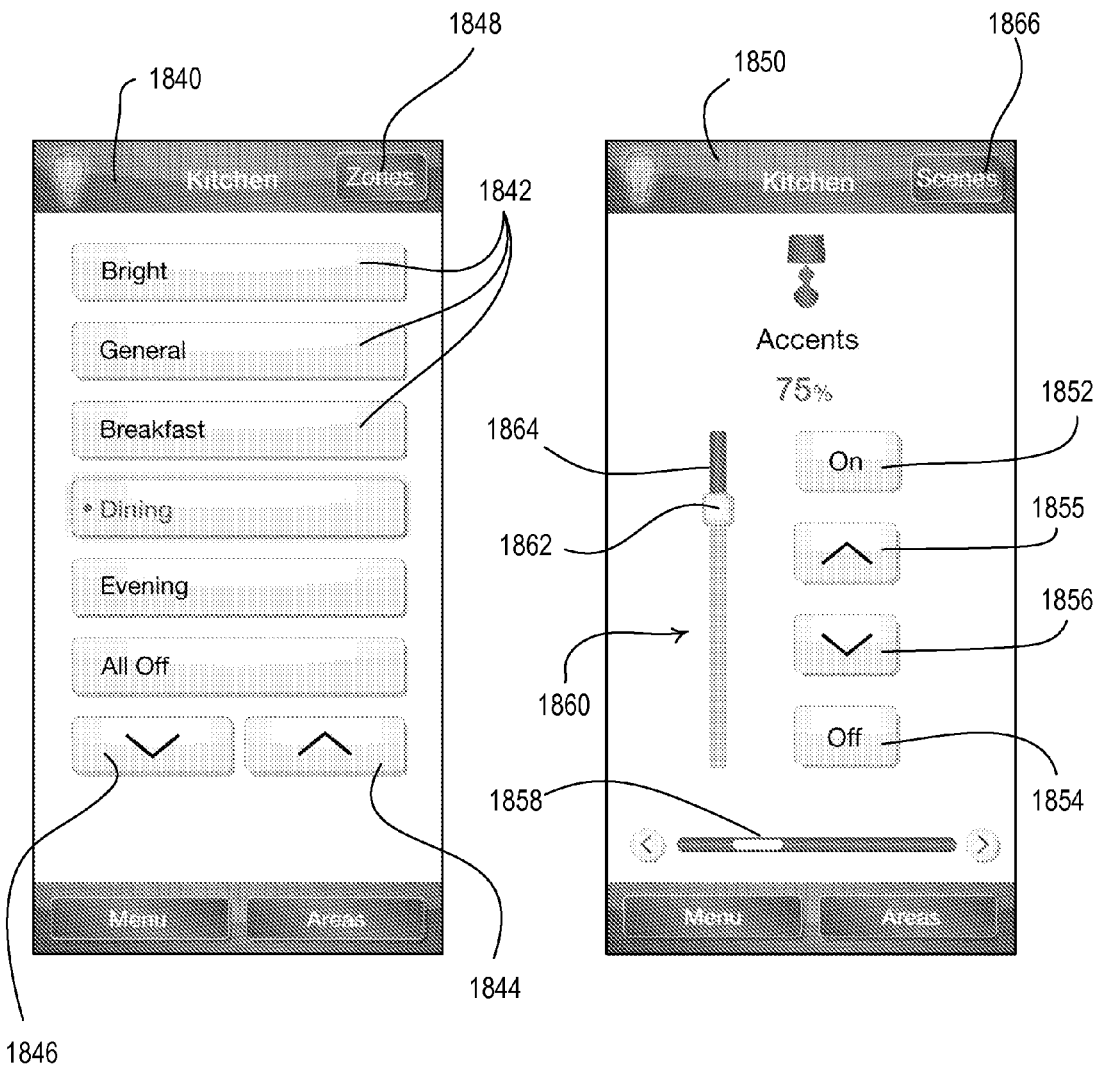
FIG. 31 shows an example screenshot of a lighting scenes screen of the dynamic keypad of FIG. 29.
FIG. 32 shows an example screenshot of a lighting zones screen of the dynamic keypad of FIG. 29.

FIG. 31 shows an example screenshot of the lighting scenes screen 1840, which is displayed in response to actuations of the lights button 1822 on the home screen 1820. The lighting scenes screen 1840 comprises a plurality of lighting scene buttons 1842, which may be actuated by the user to select predetermined lighting presets of the lighting loads 1612 in a specific area of the load control system 1600 (e.g., the kitchen as shown in FIG. 31). In addition, the lighting scenes screen 1840 comprises a raise button 1844 and a lower button 1846 that may be actuated to respectively raise and lower the intensities of all of the lighting loads 1612 in the present area. An actuation of a lighting zones screen buttons 1848 causes the dynamic keypad 1800 to display a lighting zones screen 1850 (as shown in FIG. 32), which provides for control of a specific zone (or group) of the lighting loads 1612 in the area. The lighting zones screen 1850 comprises an on button 1852 for turning on the lighting loads 1612 in the present zone, an off button 1854 for turning off the lighting loads, a raise button 1855 for raising the intensities of the lighting loads, and a lower button 1856 for lowering the intensities of the lighting loads. The lighting zones screen 1850 further comprises a scroll bar 1858 that may be moved horizontally to cause the dynamic keypad 1800 to display other lighting zones in the area to provide for control of the lighting loads 1612 in the other zones in the area.

The lighting zones screen 1850 further comprises a virtual slider control 1860 having an actuator knob 1862 positioned along an elongated vertical slot 1864. The user may touch the actuator knob 1862 and slide the knob 1862 up and down to respectively raise and lower the intensities of the lighting loads 1612 in the present zone. In addition, the dynamic keypad 1800 is operable to update the position of the actuator knob 1862 to accurately reflect the intensity of the lighting loads 1612 in the present zone, for example, in response to actuations of the raise and lower buttons 1855, 1856 of the lighting zones screen 1850, actuations of raise and lower buttons of the external keypad 1650, or scheduled timeclock events. An actuation of a lighting scenes screen button 1866 causes the dynamic keypad 1800 to display the lighting scenes screen 1840 again.

Figures 33, 34:
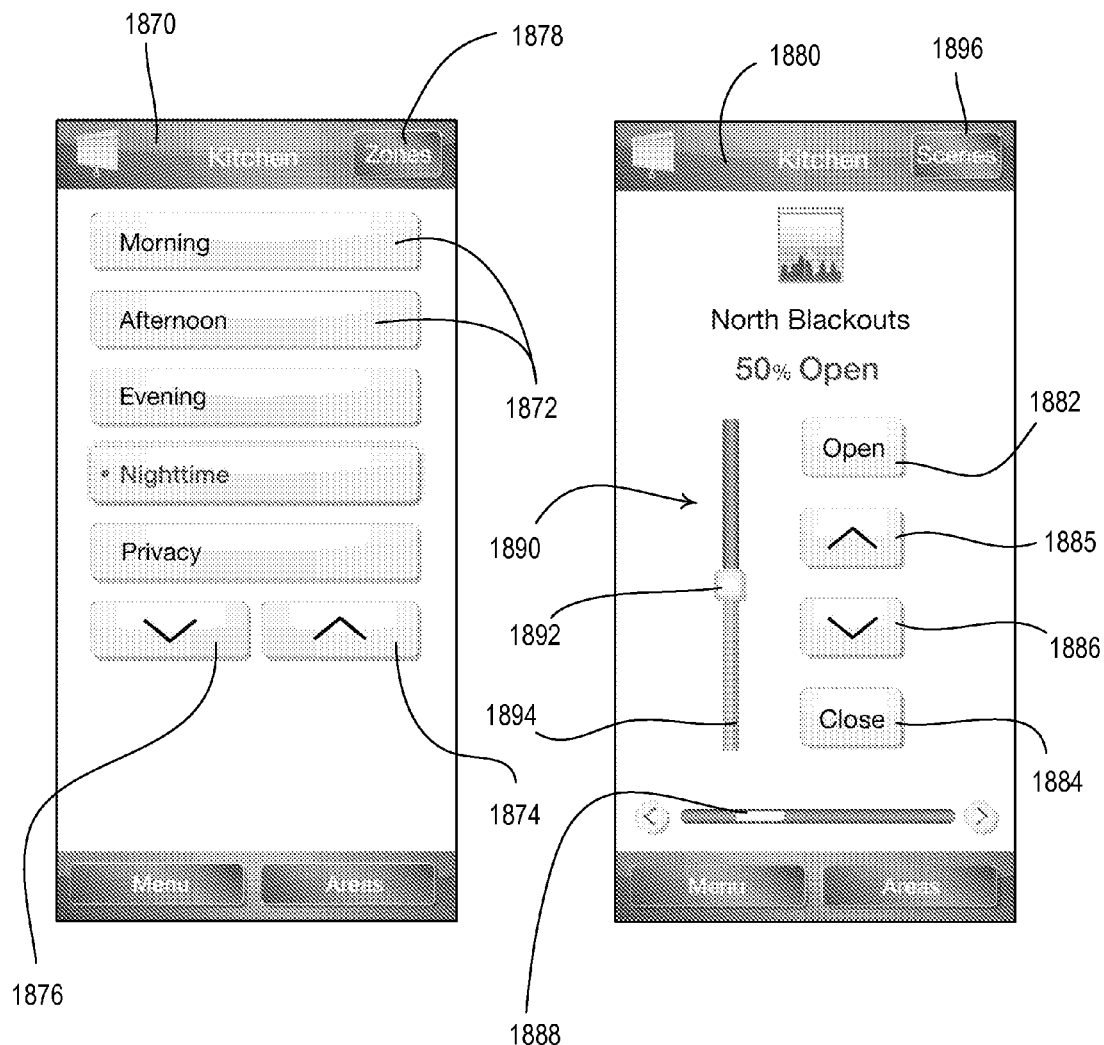
FIG. 33 shows an example screenshot of a window treatments scenes screen of the dynamic keypad of FIG. 29.
FIG. 34 shows an example screenshot of a window treatments zones screen of the dynamic keypad of FIG. 29.

FIG. 33 shows an example screenshot of the window treatments scenes screen 1870, which is displayed in response to actuations of the shades button 1824 on the home screen 1820. The window treatments scenes screen 1870 comprises a plurality of shading scene buttons 1872, a raise button 1874, and a lower button 1876, which provide for control of the motorized roller shades 1620 in the present area of the load control system 1600. FIG. 34 shows an example screenshot of a window treatments zones screen 1880, which is displayed in response to actuations of a window treatments zones screen button 1878 on window treatments scenes screen 1870. The window treatments zones screen button 1878 includes similar buttons 1882-1888 as the lighting zones screen 1850 shown in FIG. 32, as well as a slider control 1890 (including an adjustment knob 1892 and an elongated slot 1894) that provides for adjustment of, and displays feedback of, the positions of the motorized roller shades 1620 of the present zone.

Figures 35, 36:
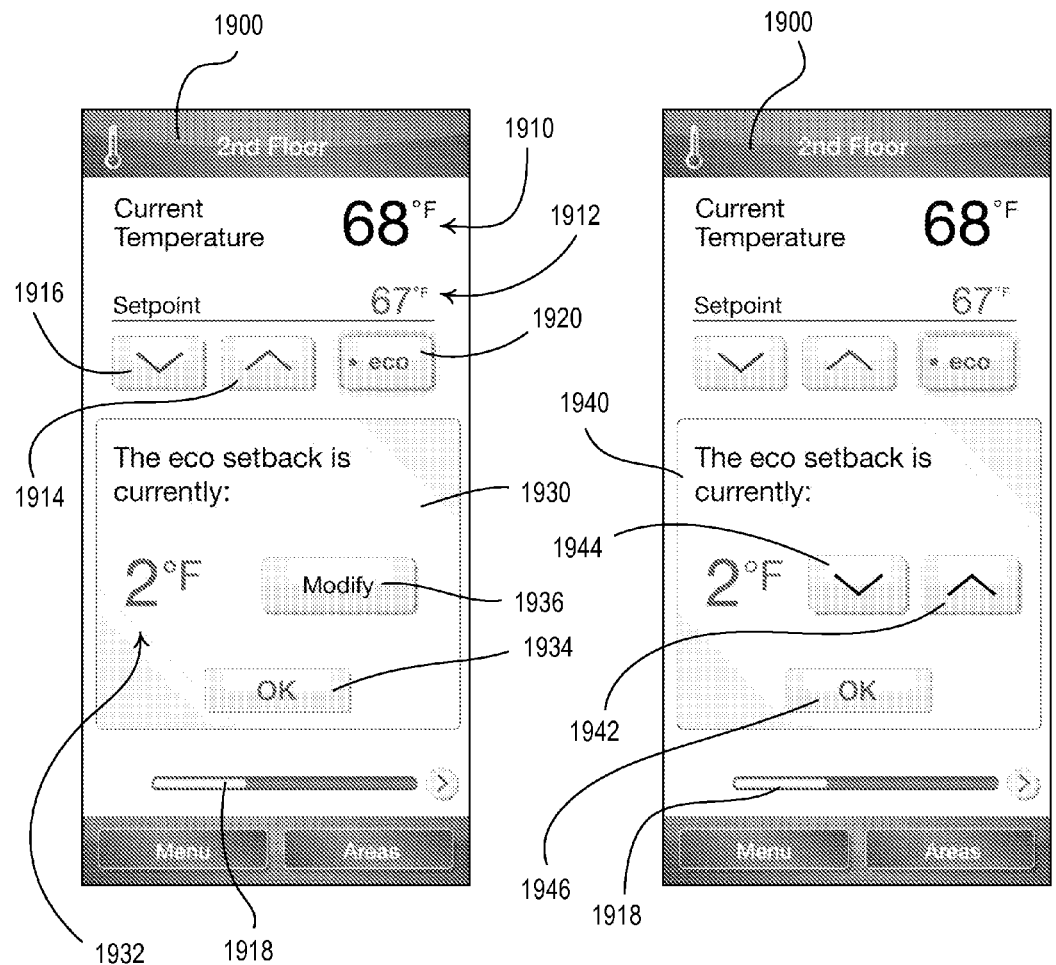
FIG. 35 shows an example screenshot of a setpoint temperature adjustment screen of the dynamic keypad of FIG. 29 showing a setback display window.
FIG. 36 shows an example screenshot of a setpoint temperature adjustment screen of the dynamic keypad of FIG. 29 showing a setback adjustment window.

FIG. 35 shows an example screenshot of the setpoint temperature adjustment screen 1900, which is displayed in response to actuations of the temperature button 1825 on the home screen 1820. The setpoint temperature adjustment screen 1900 comprises a present temperature display 1910 for displaying the present temperature $T_{PRES}$ of the area, and a setpoint temperature display 1912 for displaying the setpoint temperature $T_{SET}$ of the area. The setpoint temperature adjustment screen 1900 also comprises a setpoint temperature raise button 1914 and a setpoint temperature lower button 1916 for respectively raising and lowering the setpoint temperature $T_{SET}$. A scroll bar 1918 allows the user to navigate between different areas to thus view and control the present temperature $T_{PRES}$ and the setpoint temperature $T_{SET}$ of different areas.

The setpoint temperature adjustment screen 1900 also comprises an eco button 1920, which causes a setback display window 1930 to be displayed. The setback temperature display window 1930 comprises a setback temperature display 1932 for showing the present setback temperature $T_{SB}$. An actuation of a setback confirmation button 1934 on the setback temperature display window 1930 causes the temperature control device 1630 to begin offsetting the setpoint temperature $T_{SET}$ by the setback temperature $T_{SB}$. The setback temperature display window 1930 also comprises a setback adjustment button 1936, which allows the user to adjust the value of the setback temperature $T_{SB}$ on-the-fly (i.e., at the time of actuation of the eco button 1920 to enable the setback temperature). Specifically, an actuation of the setback adjustment button 1936 causes a setback adjustment window 1940 to be displayed as shown in FIG. 36. The setback adjustment window 1940 comprises a setback raise button 1942 and a setback lower button 1944 for respectively raising and lowering the value of the setback temperature $T_{SB}$ (as will be visually updated in the setback temperature display 1932). Once the value of the setback temperature $T_{SB}$ is correctly selected on the setback adjustment window 1940, the user may actuate a setback adjustment confirmation button 1946 to return to the setback temperature display window 1930. After the setback temperature $T_{SB}$ is enabled by an actuation of the eco button 1920, the temperature control device 1630 adjusts the setpoint temperature $T_{SET}$ to be offset by the setback temperature $T_{SB}$, even when, for example, the setpoint temperature is adjusted according to the timeclock schedule.

In addition, the lighting scenes screen 1840 could also comprise a lighting eco button (not shown) for decreasing all of the intensities of the lighting loads 1612 in an area by a setback percentage $\Delta L_{SB}$. In a similar manner that the setback adjustment window 1940 enables the user to adjust the setback temperature $T_{SB}$ on-the-fly, the dynamic keypad 1800 could also allow the user to quickly adjust the setback percentage $\Delta L_{SB}$ by which the intensities of the lighting loads 1612 will be decreased in response to an actuation of the lighting eco button.

FIG. 37 shows an example screenshot of the energy-savings preset screen 2000, which is displayed in response to actuations of the energy button 1828 on the home screen 1820. The energy-saving preset screen 2000 comprises a plurality of energy-savings preset buttons 2010 for selecting one of the energy-savings presets. In addition, the energy-savings preset screen 2000 comprises a demand response messages area 2012 for displaying information regarding any demand response messages or commands received from the electrical utility company via the smart power meter 1660, such that the user may make an informed decision when selecting one of the energy-savings presets. When one of the energy-savings preset buttons 2010 is actuated to select the respective energy-savings preset, an energy-savings preset adjustment button 2014 is displayed on the respective energy-savings preset button.

FIG. 38 is an example screenshot of a first energy-savings adjustment screen 2020 and FIG. 39 is an example screenshot of a second energy-savings adjustment screen 2030 that allow for adjustment of the various settings and parameters of the load control system, i.e., the intensities of the lighting loads 1612, the positions of the motorized roller shades 1620, the setpoint temperature $T_{SET}$ of the temperature control device 1630, and the states of plug-in electrical loads or other switched loads 1644, 1646. The first energy-savings adjustment screen 2020 is displayed in response to an actuation of the energy-savings preset adjustment button 2014 of the energy-savings preset screen 2000. The second energy-savings adjustment screen 2030 may be displayed by sliding a scroll bar 2022 of the first energy-savings adjustment screen 2020.

As shown in FIG. 37, the first energy-savings adjustment screen 2020 comprises a lighting energy-savings setting window 2040 having a raise button 2042 and a lower button 2044 for providing on-the-fly adjustment (i.e., immediate adjustment) of a lighting setback percentage by which the intensities of the lighting loads 1612 are being decreased (as displayed on the lighting energy-savings setting window 2040). In addition, adjustments of the lighting setback percentage in the lighting energy-savings setting window 2040 are saved, such that the intensities of the lighting loads 1612 will be decreased by the present value of the lighting setback percentage when the present energy-savings preset is next selected on the energy-savings preset screen 2000. The first energy-savings adjustment screen 2020 also comprises a temperature energy-savings setting window 2050 having a raise button 2052 and a lower button 2054 for adjusting the setback temperature $T_{SB}$ of the temperature control device 1630 in a similar manner as the lighting energy-savings setting window 2040.

The first energy-savings adjustment screen 2020 also comprises a shades timeclock schedule setting window 2060, which allows for adjustment of the state of the timeclock schedule that controls the positions of the motorized roller shades 1620 (i.e., whether or not the timeclock execution procedure 900 is executed) when the present energy-savings preset is selected. The shades timeclock schedule setting window 2060 comprises a temporary override switch 2062, which may be actuated by the user to temporarily change the state of the timeclock schedule, i.e., to enable or disable the timeclock schedule. The shades timeclock schedule setting window 2060 also comprises checkboxes 2064 for choosing mutually-exclusive settings that will be saved, such that the checked setting will be recalled each time that present energy-savings preset is selected on the energy-savings preset screen 2000.

The second energy-savings adjustment screen 2030 comprises first, second, and third switched load energy-savings windows 2070, 2080, 2090, which allow for adjustment of various switched electrical loads of the load control system 1600, e.g., a hot water heater, a dryer, and a dehumidifier, respectively, as shown in FIG. 39. The first, second, and third switched load energy-savings windows 2070, 2080, 2090 comprise respective temporary override switches for temporarily adjusting the states of the respective loads, and checkboxes for choosing the saved settings for the respective load.

According to another embodiment of the present invention, after receiving a demand response preset, the temperature control device 1630 is operable to transmit RF signals 1606 to the control devices of the load control system 1600 in response to the data representative of the energy usage information of the HVAC system 1632 stored in the memory 1698. For example, the controller 1690 of the temperature control device 1630 may be operable to execute an HVAC monitoring procedure similar to the HVAC monitoring procedure 1150 shown in FIG. 15B to control the motorized roller shade 1620 in dependence upon the data representative of the energy usage information of the HVAC system 1632. The controller 1690 is operable to monitor the operation of the HVAC system 1632 for the predetermined time period (e.g., approximately one hour) after the motorized roller shade 1620 moves the shade fabric 1622 in a first direction from an initial position, and to determine if the HVAC system 1632 is consuming more energy than when the shade fabric was in the initial position (i.e., if the heating and cooling system is consuming more energy at the end of the predetermined time period than at the beginning of the predetermined time period). The controller 1690 is then operable to transmit a digital message to the motorized roller shade 1620, such that the motorized roller shade moves the shade fabric 1622 in a second direction opposite the first direction if the HVAC system 1632 is consuming more energy than when the shade fabric was in the initial position.

Specifically, in response to receiving a demand response preset, the motorized roller shade 1620 is operable to open the shade fabric 1622 from the initial position to allow more sunlight to enter the room when the HVAC system 1632 is heating the building, to thus attempt to warm the room using daylight. If the controller 1690 of the temperature control device 1630 then determines that the HVAC system 1632 is not subsequently saving energy, the controller may transmit a digital message including a command to close the shade fabric 1622 (e.g., to the fully-closed position) directly to the motorized roller shade 1620 via the RF transceiver 1695. Similarly, when the HVAC system 1632 is cooling the building, the motorized roller shade 1620 could close the shade fabric 1622 from the initial position to allow less sunlight to enter the room, and open the shade fabric (e.g., to the fully-open position) if the HVAC system is not subsequently saving energy. Alternatively, the controller 1690 of the temperature control device 1630 could simply transmit the data representative of the energy usage information of the HVAC system 1632 to the motorized roller shade 1620, and the motorized roller shade could response appropriately to the data representative of the energy usage information of the HVAC system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A temperature control system for controlling a present temperature of a building having a heating and cooling system, the temperature control system comprising:
    a wall-mountable temperature control device for adjusting a system setpoint temperature of the temperature control system to thus control the present temperature in the building, the temperature control device having a vertically-arranged temperature adjustment actuator for adjusting a base setpoint temperature, a room temperature visual display for displaying a visual representation of the present temperature of the building, and a setpoint temperature visual display for displaying a visual representation of the system setpoint temperature, the room temperature visual display and the setpoint temperature visual display each comprising a linear array of light-emitting diodes arranged parallel to the temperature adjustment actuator and controlled such that one of the light-emitting diodes of the setpoint temperature visual display is illuminated to display the system setpoint temperature and one of the light-emitting diodes of the room temperature visual display is illuminated to display the present temperature of the building; and
    a controller operable to determine the present temperature of the building, the controller operable to receive a digital message including an energy-savings preset and to determine a setback temperature in response to the energy-savings preset, the controller operable, in response to receiving the digital message, to increase the system setpoint temperature to be equal to the base setpoint temperature plus the setback temperature when cooling the building and decrease the system setpoint temperature to be equal to the base setpoint temperature minus the setback temperature when heating the building so as to decrease the power consumption of the heating and cooling system, wherein the controller does not adjust the setback temperature in response to adjustments of the base setpoint temperature;
    wherein the one of the light-emitting diodes of the room temperature visual display that is illuminated to display the present temperature is adjusted in response to changes in the present temperature of the building determined by the controller, and the one of the light-emitting diodes of the setpoint temperature visual display that is illuminated to display the system setpoint temperature is adjusted in response to changes in the base setpoint temperature or the setback temperature of the energy-savings preset.

2. The temperature control system of claim 1, further comprising:
    a wireless temperature sensor adapted to be mounted remotely from the temperature control device, the wireless temperature sensor operable to measure the present temperature of the building and to wirelessly transmit the digital message including a value representative of the present temperature of the building;
    wherein the controller is operable to determine the present temperature of the building in response to the digital message received from the wireless temperature sensor, the controller operable to adjust the one of the light-emitting diodes of the room temperature visual display that is illuminated to display the present temperature of the building in response to the digital message received from the wireless temperature sensor.

3. The temperature control system of claim 2, further comprising:
    a wall-mountable dimmer switch adapted to be mounted in a multiple-gang electrical wallbox immediately adjacent to the temperature control device, the dimmer switch adapted to be coupled in series electrical connection between an AC power source and a lighting load for controlling the amount of power delivered to the lighting load and thus the intensity of the lighting load.

4. The temperature control system of claim 3, wherein the dimmer switch further comprises a front surface adapted to be received in an opening of a designer-style faceplate, a control actuator provided on the front surface for turning the lighting load on and off, and an intensity adjustment actuator arranged vertically on the front surface for adjusting the intensity of the lighting load.

5. The temperature control system of claim 4, wherein the temperature control device further comprises a front surface adapted to be received in an opening of a designer-style faceplate, the temperature adjustment actuator, the room temperature visual display, and the setpoint temperature visual display arranged vertically on the front surface of the temperature control device.

6. The temperature control system of claim 5, further comprising:
    a multi-gang designer-style faceplate having multiple openings;
    wherein the front surface of the temperature control device is received through one of the multiple openings of the faceplate, and the front surface of the dimmer switch is received through another one of the multiple openings of the faceplate.

7. The temperature control system of claim 4, wherein the dimmer switch also includes an intensity visual display comprising a linear array of light-emitting diodes arranged vertically on the front surface for providing a visual representation of the intensity of the lighting load.

8. The temperature control system of claim 1, further comprising:
a designer-style faceplate having an opening;
wherein the temperature control device further comprises a front surface adapted to be received in the opening of the designer-style faceplate, the temperature adjustment actuator, the room temperature visual display, and the setpoint temperature visual display arranged vertically on the front surface of the temperature control device.

9. The temperature control system of claim 8, wherein the temperature adjustment actuator comprises a vertically-arranged linear rocker switch, the controller operable to increase the base setpoint temperature in response to actuations of an upper portion of the rocker switch and to decrease the base setpoint temperature in response to actuations of a lower portion of the rocker switch.

10. The temperature control system of claim 8, wherein the temperature control device further comprises an eco-saver actuator provided on the front surface, the controller operable to increase the system setpoint temperature to be equal to the base setpoint temperature plus the setback temperature or decrease the system setpoint temperature to be equal to base setpoint temperature minus the setback temperature to reduce the total power consumption of the heating and cooling system in response to an actuation of the eco-saver actuator.

11. The temperature control system of claim 8, wherein the temperature control device further comprises an eco-saver actuator provided on the front surface, the controller operable to transmit a digital message including an energy-savings preset.

12. The temperature control system of claim 1, further comprising:
an enclosure located remotely from the temperature control device, the enclosure further comprising a first communication circuit and a second communication circuit, the controller housed in the enclosure and operatively coupled to the first and second communication circuits, the first communication circuit adapted to be coupled in communication with the heating and cooling system, the second communication circuit operable to transmit and receive the digital messages with the temperature control device, the second communication circuit further operable to receive the digital message including a value representative of the present temperature of the building.

13. The temperature control system of claim 12, wherein the temperature control device comprises a battery-powered device.

14. The temperature control system of claim 13, wherein the temperature control device comprises an enclosure adapted to be received in an opening of a designer-style faceplate, such that the temperature adjustment actuator, the room temperature visual display, and the setpoint temperature visual display are provided in the opening of the design-style faceplate.

15. The temperature control system of claim 12, wherein the temperature control device comprises a power supply that receives line voltage and generates a supply voltage for powering the circuitry of the temperature control device.

16. The temperature control system of claim 1, wherein the temperature control device comprises the controller, a first communication circuit, and a second communication circuit, the controller operatively coupled to the first and second communication circuits, the first communication circuit adapted to be coupled in communication with the heating and cooling system, the second communication circuit operable to receive the digital message including a value representative of the present temperature of the building.

17. The temperature control system of claim 16, wherein the temperature control device comprises a power supply that receives line voltage and generates a supply voltage for powering the controller, the first communication circuit, and the second communication circuit.

18. The temperature control system of claim 1, wherein the controller is operable to adjust the base setpoint temperature in response to a timeclock schedule, the controller operable to increase the system setpoint temperature to be equal to the base setpoint temperature plus the setback temperature when cooling the building and to decrease the system setpoint temperature to be equal to the base setpoint temperature minus the setback temperature when heating the building so as to decrease the power consumption of the heating and cooling system during the timeclock schedule.

19. The temperature control system of claim 18, wherein the controller is operable to adjust the base setpoint temperature in response to an actuation of the temperature adjustment actuator and to adjust the system setpoint temperature to be equal to the base setpoint temperature after the actuation of the temperature adjustment actuator.

20. The temperature control system of claim 1, wherein the heating and cooling system comprises a building management system, and the controller is adapted to be coupled to the building management system via a digital communication link.

21. A temperature control system for controlling a present temperature of a building having a heating and cooling system, the temperature control system comprising:
a wall-mountable temperature control device for adjusting a system setpoint temperature of the temperature control system to thus control the present temperature in the building, the temperature control device having a temperature adjustment actuator for adjusting a base setpoint temperature, a room temperature visual display for displaying a visual representation of the present temperature of the building, and a setpoint temperature visual display for displaying a visual representation of the system setpoint temperature, the room temperature visual display and the setpoint temperature visual display each comprising a linear array of light-emitting diodes arranged parallel to the temperature adjustment actuator, the temperature control device operable to transmit digital messages in response to actuations of the temperature adjustment actuator and to receive digital messages regarding the present temperature of the building and the base setpoint temperature;
a wireless temperature sensor adapted to be mounted remotely from the temperature control device and operable to transmit wireless digital messages regarding the present temperature of the building; and
a heating and cooling controller operable to receive the wireless digital messages from the wireless temperature sensor and to determine the present temperature of the building in response to the wireless digital message received from the wireless temperature sensor, the controller operable to adjust the one of the light-emitting diodes of the room temperature visual display that is illuminated to display the present temperature of the building in response to the received wireless digital message from the wireless temperature sensor, the controller adapted to be coupled in communication with the heating and cooling system for controlling the present temperature of the building in response to the present temperature and the system setpoint temperature, the heating and cooling controller operable to adjust the base setpoint temperature in response to the actuations of the temperature adjustment actuator, the heating and cooling controller operable to adjust the one of the light-emitting diodes of the setpoint temperature visual display that is illuminated to display the system setpoint temperature;

wherein the heating and cooling controller is operable to receive a digital message including an energy-savings preset and to determine a setback temperature in response to the energy-savings preset, the heating and cooling controller operable, in response to receiving the digital message, to increase the setpoint temperature to be equal to the base setpoint temperature plus the setback temperature when cooling the building and decrease the system setpoint temperature to be equal to the base setpoint temperature minus the setback temperature when heating the building so as to decrease the power consumption of the heating and cooling system, the heating and cooling controller operable to adjust the one of the light-emitting diodes of the setpoint temperature visual display that is illuminated to display the system setpoint temperature in response to adjustments of the base setpoint temperature or the setback temperature, wherein the heating and cooling controller does not adjust the setback temperature in response to adjustments of the base setback temperature.

* * * * *